US012701361B2

(12) United States Patent
Wang et al.

(10) Patent No.: US 12,701,361 B2
(45) Date of Patent: Aug. 4, 2026

(54) METHOD FOR DETERMINING ORIENTATION INFORMATION AND ELECTRONIC DEVICE

(71) Applicant: HUAWEI TECHNOLOGIES CO., LTD., Shenzhen (CN)

(72) Inventors: Qi Wang, Shenzhen (CN); Xiaoxian Li, Shenzhen (CN); Zhenguo Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 172 days.

(21) Appl. No.: 18/649,839

(22) Filed: Apr. 29, 2024

(65) Prior Publication Data

US 2024/0292153 A1 Aug. 29, 2024

Related U.S. Application Data

(63) Continuation of application No. PCT/CN2022/127499, filed on Oct. 25, 2022.

(30) Foreign Application Priority Data

Nov. 1, 2021 (CN) ......................... 202111285137.2

(51) Int. Cl.

| | |
|---|---|
| ***H04R 5/02*** | (2006.01) |
| ***G01S 5/18*** | (2006.01) |
| ***G06F 16/909*** | (2019.01) |
| ***H04L 9/40*** | (2022.01) |
| ***H04W 4/02*** | (2018.01) |

(Continued)

(52) U.S. Cl.
CPC ......... *H04R 5/02* (2013.01); *H04R 2205/024* (2013.01)

(58) Field of Classification Search
None
See application file for complete search history.

(56) References Cited

U.S. PATENT DOCUMENTS

| | | | | |
|---|---|---|---|---|
| 9,794,720 | B1 * | 10/2017 | Kadri | H04S 7/303 |
| 10,382,892 | B2 * | 8/2019 | Chen | H04W 4/026 |
| 2018/0084363 | A1 | 3/2018 | Kadri | |

(Continued)

FOREIGN PATENT DOCUMENTS

| | | | |
|---|---|---|---|
| CN | 107734630 | A | 2/2018 |
| CN | 108882139 | A | 11/2018 |

(Continued)

*Primary Examiner* — Qin Zhu
(74) *Attorney, Agent, or Firm* — Leydig, Voit & Mayer, Ltd.

(57) ABSTRACT

This application provides a method for determining orientation information and an electronic device. In the method, a first electronic device may determine, based on a received second sequence, whether a device sending a first sequence associated with the second sequence is a second electronic device. If the device sending the first sequence is the second electronic device, the first electronic device may determine orientation information of the second electronic device based on the first sequence. This helps determine an orientation of the second electronic device or an orientation of the first electronic device based on the orientation information, and prevent a user from manually participating in orientation configuration, thereby reducing operation complexity and improving user experience.

20 Claims, 20 Drawing Sheets

(51) Int. Cl.
*H04W 4/80* (2018.01)
*H04W 12/71* (2021.01)

(56) References Cited

U.S. PATENT DOCUMENTS

| | | | | |
|---|---|---|---|---|
| 2018/0192223 | A1 | 7/2018 | Satheesh et al. | |
| 2018/0317044 | A1 * | 11/2018 | Chen | G01S 5/02 |
| 2022/0078578 | A1 * | 3/2022 | Brumley | G01S 13/767 |
| 2022/0369113 | A1 * | 11/2022 | Motos | H04L 9/001 |
| 2023/0251345 | A1 * | 8/2023 | You | H04M 1/72412 345/1.3 |

FOREIGN PATENT DOCUMENTS

| | | | | | |
|---|---|---|---|---|---|
| CN | 110557740 | A | | 12/2019 | |
| CN | 111148214 | A | * | 5/2020 | H04W 64/006 |
| CN | 111193996 | A | * | 5/2020 | H04W 4/80 |
| CN | 111628916 | A | | 9/2020 | |
| CN | 113543310 | A | | 10/2021 | |
| EP | 4013073 | A1 | | 6/2022 | |
| WO | 2021029447 | A1 | | 2/2021 | |
| WO | WO-2021036835 | A1 | * | 3/2021 | H04W 8/005 |
| WO | WO-2022068705 | A1 | * | 4/2022 | H04M 1/72457 |

* cited by examiner

METHOD FOR DETERMINING ORIENTATION INFORMATION AND ELECTRONIC DEVICE

CROSS-REFERENCE TO RELATED APPLICATIONS

This application is a continuation of International Application No. PCT/CN2022/127499, filed on Oct. 25, 2022, which claims priority to Chinese Patent Application No. 202111285137.2, filed on Nov. 1, 2021. The disclosures of the aforementioned applications are hereby incorporated by reference in their entireties.

TECHNICAL FIELD

This application relates to the communication field, and more specifically, to a method for determining orientation information and an electronic device in the communication field.

BACKGROUND

In some scenarios, a plurality of electronic devices may collaborate to implement some functions. In a collaborative process of the plurality of electronic devices, if the plurality of electronic devices are in preset orientations, collaboration can be better completed. In the conventional technology, a user needs to manually participate in configuring orientations of a plurality of electronic devices, resulting in a relatively high requirement on the user and complex operations. For example, a large screen may play different audio signals by using a plurality of sound boxes, to implement a stereo effect. The user may set a sound channel of each sound box by performing an operation on a display interface of the large screen. The plurality of sound boxes play the different audio signals on the large screen, to implement the stereo effect. However, this process requires the user to perform manual setting and have knowledge of sound channel allocation, resulting in complex operations, and poor user experience.

SUMMARY

Embodiments of this application provide a method for determining orientation information and an electronic device, to reduce operation complexity and help improve user experience.

According to a first aspect, a method for determining orientation information is provided. The method is applicable to a first electronic device, and the method includes: receiving a first sequence; receiving a second sequence, where the first sequence is associated with the second sequence; determining, based on the second sequence, whether a device sending the first sequence is a second electronic device; and if it is determined, based on the second sequence, that the device sending the first sequence is the second electronic device, determining orientation information of the second electronic device based on the first sequence.

In the foregoing solution, the first electronic device may determine, based on the received second sequence, whether the device sending the first sequence associated with the second sequence is the second electronic device. If the device sending the first sequence is the second electronic device, the first electronic device may determine the orientation information of the second electronic device based on the first sequence. This helps determine an orientation of the second electronic device or an orientation of the first electronic device based on the orientation information, and prevent a user from manually participating in orientation configuration, thereby reducing operation complexity and improving user experience.

Optionally, the first electronic device may first receive the first sequence and then receive the second sequence, or first receive the second sequence and then receive the first sequence. An order in which the first electronic device receives the first sequence and the second sequence is not limited in this embodiment of this application.

Optionally, the first electronic device may be a large screen, and the second electronic device may be a sound box. The large screen may determine orientation information of the sound box, so that the large screen can allocate a sound channel to the sound box based on the orientation information of the sound box.

Optionally, the first electronic device may be a sound box, and the second electronic device may be a large screen. The sound box may determine orientation information of the large screen. Optionally, the sound box may send the determined orientation information of the large screen to the large screen, the large screen determines an angle of the large screen relative to the sound box and/or a distance between the large screen and the sound box based on the orientation information of the large screen that is determined by the sound box. The large screen allocates a sound channel to the sound box based on the angle of the large screen relative to the sound box and/or the distance between the large screen and the sound box.

Optionally, the first sequence is a sequence that can be learned of by the first electronic device and the second electronic device. Specifically, before receiving the first sequence, the second electronic device notifies the first electronic device that the second electronic device is to send the first sequence; or before receiving the first sequence, the first electronic device notifies the second electronic device that the second electronic device is to send the first sequence.

Optionally, that the first sequence is associated with the second sequence may be replaced with the following: There is a correspondence between the first sequence and the second sequence, and the first electronic device can determine the second sequence based on the first sequence. For example, the first electronic device may determine the second sequence based on the first sequence and the correspondence, and determine, based on the second sequence, whether the device sending the first sequence is the second electronic device.

Optionally, the orientation information of the second electronic device may indicate an angle of the second electronic device relative to the first electronic device, and/or a distance between the first electronic device and the second electronic device. Optionally, the orientation information of the second electronic device may indicate an angle of the second electronic device relative to the first electronic device, and/or first time information. The first time information is used to determine a distance between the first electronic device and the second electronic device.

Optionally, the angle of the second electronic device relative to the first electronic device and an angle of the first electronic device relative to the second electronic device are relative concepts. The angle of the second electronic device relative to the first electronic device is an angle of the second electronic device that uses the first electronic device as a reference. The angle of the first electronic device relative to the second electronic device is an angle of the first electronic device that uses the second electronic device as a reference.

Optionally, the receiving a first sequence includes: receiving an ultrasonic signal that includes the first sequence. The determining orientation information of the second electronic device based on the first sequence includes: determining the orientation information of the second electronic device based on the ultrasonic signal that includes the first sequence.

Optionally, the receiving a second sequence includes: receiving an ultrasonic signal that includes the second sequence.

Optionally, that the first sequence is associated with the second sequence may be that a time domain resource for receiving the first sequence is associated with a time domain resource for receiving the second sequence.

Optionally, that the first sequence is associated with the second sequence may be that a frequency domain resource for receiving the first sequence is associated with a frequency domain resource for receiving the second sequence.

In some possible implementations, that the first sequence is associated with the second sequence may be specifically: An interval between the time domain resource for receiving the first sequence and the time domain resource for receiving the second sequence is a preset time domain interval, and/or an interval between the frequency domain resource for receiving the first sequence and the frequency domain resource for receiving the second sequence is a preset frequency domain interval.

In the foregoing solution, after receiving the first sequence, the first electronic device may determine another time domain resource based on the time domain resource for receiving the first sequence and the preset time domain interval, and determine a sequence received on the another time domain resource as the second sequence; and/or after receiving the first sequence, the first electronic device may determine another frequency domain resource based on the frequency domain resource for receiving the first sequence and the preset frequency domain interval, and determine a sequence received on the another frequency domain resource as the second sequence.

In some possible implementations, the method further includes: sending a third sequence to the second electronic device. The determining, based on the second sequence, whether a device sending the first sequence is a second electronic device includes:

- if the second sequence is the same as the third sequence, determining that the device sending the first sequence is the second electronic device; or
- if the second sequence is different from the third sequence, determining that the device sending the first sequence is not the second electronic device.

In the foregoing solution, the first electronic device may send the third sequence to the second electronic device. If the second sequence received by the first electronic device from the second electronic device is the third sequence sent by the first electronic device to the second electronic device, it indicates that the first sequence associated with the second sequence is also sent by the first electronic device; or if the second sequence received by the first electronic device from the second electronic device is not the third sequence sent by the first electronic device to the second electronic device, it indicates that the first sequence associated with the second sequence is not sent by the second electronic device either.

In some possible implementations, the sending a third sequence to the second electronic device includes:

- receiving a first operation instruction; and
- sending the third sequence to the second electronic device in response to the first operation instruction.

In the foregoing solution, after receiving the first operation instruction input by the user, the first electronic device may send the third sequence to the second electronic device in response to the first operation instruction, that is, the first electronic device may send the third sequence to the second electronic device based on the user operation, so that the first electronic device does not blindly send the third sequence.

In some possible implementations, the method further includes: obtaining an identifier of the second electronic device. The determining, based on the second sequence, whether a device sending the first sequence is a second electronic device includes: if the second sequence is the identifier of the second electronic device, determining that the device sending the first sequence is the second electronic device; or if the second sequence is not the identifier of the second electronic device, determining that the device sending the first sequence is not the second electronic device.

In the foregoing solution, the first electronic device may obtain the identifier of the second electronic device, and the identifier of the second electronic device is associated with the first sequence. If the second sequence is the identifier of the second electronic device, the first electronic device determines that the device sending the first sequence is the second electronic device.

Optionally, the second electronic device may broadcast a first Bluetooth signal, where the first Bluetooth signal includes the identifier of the second electronic device, and the first electronic device may obtain the identifier of the second electronic device from the first Bluetooth signal.

In some possible implementations, before the receiving a first sequence, the method further includes: receiving a third sequence from the second electronic device.

The determining, based on the second sequence, whether a device sending the first sequence is a second electronic device includes:

- if the second sequence is the same as the third sequence, determining that the device sending the first sequence is the second electronic device; or
- if the second sequence is different from the third sequence, determining that the device sending the first sequence is not the second electronic device.

In the foregoing solution, the second electronic device may send the third sequence to the first electronic device, that is, the second electronic device allocates the third sequence to the first electronic device. If the second electronic device needs to send the first sequence to the first electronic device, the second electronic device may send the first sequence and the second sequence (the third sequence is used as the second sequence) to the first electronic device. If the second sequence received by the first electronic device is the third sequence sent by the second electronic device, it indicates that the second electronic device sends the first sequence to the first electronic device. This avoids a case in which the first electronic device cannot learn whether the first sequence is sent by the second electronic device.

Optionally, if the second sequence is the same as the third sequence, it is determined that the first sequence is sent by the second electronic device to the first electronic device but is not sent to another electronic device; or if the second sequence is different from the third sequence, it is determined that the first sequence is not sent to the first electronic device, but is sent to another electronic device.

In some possible implementations, the method further includes:

sending a fourth sequence by using a first speaker; and receiving the fourth sequence by using a first microphone at a first moment.

The determining orientation information of the second electronic device based on the first sequence includes:

determining an angle of the second electronic device relative to the first electronic device based on the first sequence;

determining first time information based on a second moment at which the first sequence is received and the first moment, where the orientation information includes the angle of the second electronic device relative to the first electronic device and the first time information; and sending the orientation information to the second electronic device.

In the foregoing solution, the first electronic device may determine the first time information based on the first moment at which the fourth sequence sent by using the first speaker of the first electronic device is received and the second moment at which the first sequence is received, and the first electronic device may determine the angle of the second electronic device relative to the first electronic device based on the first sequence, and send the determined first time information and the angle of the second electronic device relative to the first electronic device to the second electronic device as the orientation information.

Optionally, after determining that the device sending the first sequence is the second electronic device, the first electronic device sends a fourth sequence by using a first speaker, that is, the first electronic device determines that the device sending the first sequence is the second electronic device triggers sending the fourth sequence by using the first speaker. If the first electronic device determines that the device sending the first sequence is not the second electronic device, the first electronic device does not send the fourth sequence.

Optionally, the first electronic device sends the fourth sequence by using the speaker after a preset time period after determining that the device sending the first sequence is the second electronic device. In other words, if the first electronic device determines that the device sending the first sequence is the second electronic device, the first electronic device sends the fourth sequence by using the first speaker after the preset time period.

In some possible implementations, the method further includes: sending the third sequence by using the first speaker, where the fourth sequence is associated with the third sequence.

In the foregoing solution, after the first electronic device sends the third sequence by using the first speaker, if the third sequence is the second sequence sent by the second electronic device to the first electronic device, the second electronic device may determine that a device sending the fourth sequence is the first electronic device, and the second electronic device needs to determine the orientation of the first electronic device.

Optionally, the first electronic device may first send the third sequence and then send the fourth sequence, or first send the fourth sequence and then send the third sequence. An order in which the first electronic device sends the third sequence and the fourth sequence is not limited in this embodiment of this application.

Optionally, the fourth sequence is a sequence that can be learned of by the first electronic device and the second electronic device. Specifically, before receiving the fourth sequence, the first electronic device notifies the second electronic device that the first electronic device is to send the fourth sequence; or before receiving the fourth sequence, the second electronic device notifies the first electronic device that the first electronic device is to send the fourth sequence.

Optionally, that the fourth sequence is associated with the third sequence may be replaced with the following: There is a correspondence between the fourth sequence and the third sequence, and the first electronic device can determine the third sequence based on the fourth sequence. For example, after sending the fourth sequence, the first electronic device may determine, based on the fourth sequence and the correspondence, to send the third sequence.

Optionally, that the third sequence is associated with the fourth sequence may be that a time domain resource for sending the third sequence is associated with a time domain resource for sending the fourth sequence.

Optionally, that the third sequence is associated with the fourth sequence may be that a frequency domain resource for sending the third sequence is associated with a frequency domain resource for sending the fourth sequence.

In some possible implementations, that the third sequence is associated with the fourth sequence is specifically: An interval between the time domain resource for sending the third sequence and the time domain resource for sending the fourth sequence is a preset time domain interval, and/or an interval between the frequency domain resource for sending the third sequence and the frequency domain resource for sending the fourth sequence is a preset frequency domain interval.

In the foregoing solution, the first electronic device may determine another time domain resource based on the time domain resource for sending the fourth sequence and the preset time domain interval, and send the third sequence on the another time domain resource; and/or the first electronic device may determine another frequency domain resource based on the frequency domain resource for sending the fourth sequence and the preset frequency domain interval, and send the third sequence on the another frequency domain resource.

In some possible implementations, the method further includes:

receiving a fifth sequence; and receiving the second sequence, where the fifth sequence is associated with the second sequence.

The determining an angle of the second electronic device relative to the first electronic device based on the first sequence includes:

if the third sequence is the same as the second sequence, determining that a device sending the fifth sequence is the second electronic device; and determining the angle of the second electronic device relative to the first electronic device based on the first sequence and the fifth sequence.

In the foregoing solution, the second electronic device may send the first sequence and the fifth sequence. If the second sequence associated with the first sequence is the third sequence, and the second sequence associated with the fifth sequence is the third sequence, the first electronic device may determine that the first sequence and the fifth sequence are sent by the second electronic device. The first electronic device may determine the angle of the second electronic device relative to the first electronic device based on the first sequence and the fifth sequence. In other words, the first electronic device may determine the angle of the second electronic device relative to the first electronic device by using the first sequence. In this case, the first electronic device may include two microphones, and the first electronic device may determine the angle of the second electronic device relative to the first electronic device based on a difference between sampling points of the first sequence received by using the two microphones. Alternatively, the first electronic device may determine the angle of the second electronic device relative to the first electronic device by using the first sequence and the fifth sequence. In this case, the second electronic device may respectively send the first sequence and the fifth sequence by using two different speakers, and the first electronic device may determine the angle of the second electronic device relative to the first electronic device based on a difference between sampling points of the first sequence and the fifth sequence that are respectively sent by using the two different speakers.

Optionally, the first electronic device may first receive the fifth sequence and then receive the second sequence, or first receive the second sequence and then receive the fifth sequence. An order in which the first electronic device receives the fifth sequence and the second sequence is not limited in this embodiment of this application.

Optionally, the fifth sequence is a sequence that can be learned of by the first electronic device and the second electronic device. Specifically, before receiving the fifth sequence, the second electronic device notifies the first electronic device that the second electronic device is to send the fifth sequence; or before receiving the fifth sequence, the first electronic device notifies the second electronic device that the second electronic device is to send the fifth sequence.

Optionally, that the fifth sequence is associated with the second sequence may be replaced with the following: There is a correspondence between the fifth sequence and the second sequence, and the first electronic device can determine the second sequence based on the fifth sequence. For example, the first electronic device may determine the second sequence based on the fifth sequence and the correspondence, and determine, based on the second sequence, whether the device sending the fifth sequence is the second electronic device.

Optionally, that the fifth sequence is associated with the second sequence may be that a time domain resource for receiving the fifth sequence is associated with a time domain resource for receiving the second sequence.

Optionally, that the fifth sequence is associated with the second sequence may be that a frequency domain resource for receiving the fifth sequence is associated with a frequency domain resource for receiving the second sequence.

In some possible implementations, that the fifth sequence is associated with the second sequence is specifically: An interval between the time domain resource for receiving the fifth sequence and the time domain resource for receiving the second sequence is a preset time domain interval, and/or an interval between the frequency domain resource for receiving the fifth sequence and the frequency domain resource for receiving the second sequence is a preset frequency domain interval.

In the foregoing solution, the first electronic device may determine another time domain resource based on the time domain resource for receiving the fifth sequence and the preset time domain interval, and receive the second sequence on the another time domain resource; and/or the first electronic device may determine another frequency domain resource based on the frequency domain resource for receiving the fifth sequence and the preset frequency domain interval, and receive the second sequence on the another frequency domain resource.

In some possible implementations, the method further includes: determining a sound channel of the second electronic device based on the orientation information of the second electronic device, where the second electronic device is a sound box; and sending an audio signal to the second electronic device based on the sound channel of the second electronic device.

In the foregoing solution, the first electronic device may determine the sound channel of the sound box based on the orientation information of the sound box, and send the audio signal to the sound box based on the sound channel of the sound box. In a stereoscopic surround sound scenario, the first electronic device may be a large screen. The large screen may allocate different sound channels to sound boxes in different orientations, and send different audio signals to all the sound boxes based on the different sound channels of the sound boxes. Each sound box may play an audio signal from the large screen, implementing stereoscopic surround sound effect. In this case, the user does not need to manually set a sound channel of each sound box, thereby improving user experience.

In some possible implementations, the method further includes:

receiving a first Bluetooth signal broadcast by the second electronic device; and determining, based on the first Bluetooth signal and a first ultrasonic signal, whether the second electronic device and the first electronic device are in same space, where the first ultrasonic signal is an ultrasonic signal for sending the first sequence.

The determining a sound channel of the second electronic device based on the orientation information of the second electronic device includes: if the second electronic device and the first electronic device are in the same space, determining the sound channel of the second electronic device based on the orientation information of the second electronic device.

In the foregoing solution, the first electronic device may determine, based on the first Bluetooth signal and the first ultrasonic signal for sending the first sequence, whether the second electronic device and the first electronic device are in the same space. If the second electronic device and the first electronic device are in the same space, the first electronic device may determine the sound channel of the second electronic device based on the orientation information of the second electronic device. In this case, the first electronic device may send an audio signal to the second electronic device based on the sound channel of the second electronic device, so that the first electronic device does not blindly send the audio signal to the second electronic device. If the second electronic device and the first electronic device are not in the same space, the first electronic device still determines the sound channel of the second electronic device based on the orientation of the second electronic device, and sends an audio signal to the second electronic device based on the sound channel of the second electronic device. As a result, stereoscopic surround sound effect may not be implemented, or formed stereoscopic surround sound effect is poor.

Optionally, the determining orientation information of the second electronic device based on the first sequence includes: if the second electronic device and the first electronic device are in the same space, determining the orientation information of the second electronic device based on the first sequence. In other words, if the first electronic device determines that the second electronic device and the first electronic device are in the same space, the first electronic device further determines the orientation information of the second electronic device; or if the first electronic device determines that the second electronic device and the first electronic device are not in the same space, the first electronic device does not determine the orientation information of the second electronic device.

In some possible implementations, the receiving a first sequence includes: receiving N sequences, where the N received sequences include the first sequence, and N is a positive integer greater than 1.

The method further includes: determining a sequence with best signal quality from the N received sequences as the first sequence.

In the foregoing solution, the first electronic device may determine the sequence with best signal quality from the N received sequences as the first sequence, so that reception accuracy can be ensured. The first electronic device may determine the second sequence associated with the first sequence, so that the first electronic device may determine, based on the second sequence, that the device sending the first sequence is the second electronic device.

According to a second aspect, a method for determining orientation information is provided. The method is applicable to a second electronic device and includes: sending a first sequence to a first electronic device; and sending a second sequence to the first electronic device, where the first sequence is associated with the second sequence, the second sequence is used by the first electronic device to determine an electronic device sending the first sequence, and the first sequence is used by the first electronic device to determine orientation information of the second electronic device.

In the foregoing solution, the second electronic device may send the first sequence and the second sequence. The first electronic device may determine, based on the received second sequence, whether the device sending the first sequence associated with the second sequence is the second electronic device. If the device sending the first sequence is the second electronic device, the first electronic device may determine the orientation information of the second electronic device based on the first sequence. This helps determine an orientation of the second electronic device or an orientation of the first electronic device based on the orientation information, and prevent a user from manually participating in orientation configuration, thereby improving user experience.

In some possible implementations, that the first sequence is associated with the second sequence is specifically:

- an interval between a time domain resource for sending the first sequence and a time domain resource for sending the second sequence is a preset time domain interval, and/or an interval between a frequency domain resource for sending the first sequence and a frequency domain resource for sending the second sequence is a preset frequency domain interval; and/or
- in some possible implementations, before the sending a second sequence to the first electronic device, the method further includes:

receiving the second sequence from the first electronic device; or in some possible implementations, the method further includes: sending the second sequence to the first electronic device.

In some possible implementations, the sending a first sequence to a first electronic device includes: sending the first sequence by using a second speaker.

The method further includes:

- receiving the first sequence by using a second microphone at a third moment;
- receiving a fourth sequence at a fourth moment;
- determining second time information based on the third moment and the fourth moment;
- receiving the orientation information from the first electronic device, where the orientation information includes an angle of the second electronic device relative to the first electronic device and first time information; and
- determining a distance between the second electronic device and the first electronic device based on the first time information and the second time information.

In the foregoing solution, the second electronic device may send the first sequence by using the second speaker of the second electronic device, receive the first sequence at the third moment, determine the second time information based on the third moment at which the first sequence sent by using the speaker of the second electronic device is received and the fourth moment at which the fourth sequence sent by the first electronic device is received, and determine the distance between the second electronic device and the first electronic device based on the second time information and the first time information that is from the first electronic device.

In some possible implementations, the method further includes: determining a sound channel of the first electronic device based on the distance between the second electronic device and the first electronic device and the angle of the second electronic device relative to the first electronic device, where the first electronic device is a sound box; and sending an audio signal to the first electronic device based on the sound channel of the first electronic device.

In the foregoing solution, the second electronic device may determine the sound channel of the first electronic device based on the distance between the second electronic device and the first electronic device and the angle of the second electronic device relative to the first electronic device, and send the audio signal to the first electronic device based on the sound channel of the first electronic device, to implement stereoscopic surround sound effect.

In some possible implementations, the method further includes: receiving a third sequence from the first electronic device, where the third sequence associated with the fourth sequence; and if the third sequence is the same as the second sequence, determining that a device sending the fourth sequence is the first electronic device.

In the foregoing solution, if the third sequence is the same as the second sequence, the second electronic device determines that the device sending the fourth sequence is the first electronic device, so that the second electronic device may determine the orientation of the first electronic device.

In some possible implementations, that the third sequence is associated with the fourth sequence is specifically: An interval between a time domain resource for receiving the third sequence and a time domain resource for receiving the fourth sequence is a preset time domain interval, and/or an interval between a frequency domain resource for receiving the third sequence and a frequency domain resource for receiving the fourth sequence is a preset frequency domain interval.

In some possible implementations, the sending a second sequence to the first electronic device includes: sending the second sequence to the first electronic device by using the second speaker.

The method further includes: sending the second sequence to the first electronic device by using a third speaker; and sending a fifth sequence to the first electronic device by using the third speaker, where the fifth sequence is associated with the second sequence.

In the foregoing solution, the second electronic device may send the first sequence and the second sequence by using the second speaker, and then send the second sequence and the fifth sequence by using the third speaker. The first electronic device determines, based on the second sequence sent by using the second speaker, that the device sending the first sequence is the second electronic device, and determines, based on the second sequence sent by using the third speaker, that a device sending the fifth sequence is the second electronic device. The first electronic device may determine, based on the first sequence and the fifth sequence, the angle of the second electronic device relative to the first electronic device.

In some possible implementations, a spacing between the second speaker and the third speaker is greater than a preset distance.

In the foregoing solution, the spacing between the two speakers of the second electronic device is greater than the preset distance. This helps the first electronic device determine the angle of the second electronic device relative to the first electronic device based on the first sequence and the fifth sequence.

Optionally, the spacing between the second speaker and the third speaker may be preset, and the second electronic device may send the spacing between the second speaker and the third speaker to the first electronic device.

In some possible implementations, that the fifth sequence is associated with the second sequence is specifically: An interval between a time domain resource for sending the fifth sequence and a time domain resource for sending the second sequence is a preset time domain interval, and/or an interval between a frequency domain resource for sending the fifth sequence and a frequency domain resource for sending the second sequence is a preset frequency domain interval.

In some possible implementations, the sending a first sequence to a first electronic device includes: respectively sending a plurality of first sequences to the first electronic device by using a plurality of speakers, where the plurality of speakers are in one-to-one correspondence with the plurality of first sequences.

The sending a second sequence to the first electronic device includes: respectively sending a plurality of second sequences to the first electronic device by using a plurality of speakers. The plurality of speakers are in one-to-one correspondence with the plurality of second sequences. A first sequence and a second sequence that are sent by using a same speaker are associated.

In the foregoing solution, the second electronic device may respectively send the plurality of first sequences by using the plurality of different speakers, and respectively send the plurality of second sequences by using the plurality of speakers, and a first sequence and a second sequence that are sent by using the same speaker are associated. The first electronic device may determine a first sequence with best signal quality in the plurality of first sequences, and determine, by using a second sequence associated with the first sequence, whether the device sending the first sequence is the second electronic device. In this case, if a specific speaker of the second electronic device is relatively close to the first electronic device, or transmission quality between a specific speaker and the first electronic device is the best, signal quality of a pair of associated first sequence and second sequence sent by the second electronic device by using the speaker is the best. This helps improve signal quality of receiving the first sequence and the second sequence by the first electronic device.

Optionally, the second electronic device may respectively send a plurality of fifth sequences by using a plurality of speakers, and respectively send a plurality of second sequences by using the plurality of speakers. A fifth sequence and a second sequence that are sent by using a same speaker are associated.

Optionally, the second electronic device may respectively send a plurality of third sequences by using a plurality of speakers, and respectively send a plurality of fourth sequences by using the plurality of speakers. One third sequence and one fourth sequence that are sent by using a same speaker are associated.

It may be understood that, for beneficial effects of the second aspect, refer to the descriptions of the first aspect. To avoid repetition, details are not described.

According to a third aspect, this application provides an apparatus. The apparatus is included in an electronic device, and the apparatus has a function of implementing behavior of the first electronic device according to any one of the first aspect or the possible implementations of the first aspect. The function may be implemented by hardware, or may be implemented by hardware executing corresponding software. The hardware or software includes one or more modules or units corresponding to the foregoing function, for example, a determining module or unit, or a transceiver module or unit.

Optionally, the apparatus may be the foregoing first electronic device.

According to a fourth aspect, this application provides an apparatus. The apparatus is included in an electronic device, and the apparatus has a function of implementing behavior of the second electronic device according to any one of the second aspect or the possible implementations of the second aspect. The function may be implemented by hardware, or may be implemented by hardware executing corresponding software. The hardware or software includes one or more modules or units corresponding to the foregoing function, for example, a determining module or unit, or a transceiver module or unit.

Optionally, the apparatus may be the foregoing second electronic device.

According to a fifth aspect, this application provides an apparatus. The apparatus includes a processor. The processor is coupled to the memory, the memory is configured to store a computer program or instructions, and the processor is configured to execute the computer program or the instructions stored in the memory, so that the method according to any one of the first aspect or the possible implementations of the first aspect is performed.

For example, the processor is configured to execute the computer program or the instructions stored in the memory, so that the apparatus performs the method according to any one of the first aspect or the possible implementations of the first aspect.

Optionally, the apparatus includes one or more processors.

Optionally, the apparatus may further include a memory coupled to the processor.

Optionally, the apparatus may include one or more memories.

Optionally, the memory may be integrated with the processor, or the memory and the processor are disposed separately.

Optionally, the apparatus may further include a transceiver.

Optionally, the apparatus may be the foregoing first electronic device.

According to a sixth aspect, this application provides an apparatus. The apparatus includes a processor. The processor is coupled to the memory, the memory is configured to store a computer program or instructions, and the processor is configured to execute the computer program or the instructions stored in the memory, so that the method according to any one of the second aspect or the possible implementations of the second aspect is performed.

For example, the processor is configured to execute the computer program or the instruction stored in the memory, so that the apparatus performs the method according to any one of the second aspect or the possible implementations of the second aspect.

Optionally, the apparatus includes one or more processors.

Optionally, the apparatus may further include a memory coupled to the processor.

Optionally, the apparatus may include one or more memories.

Optionally, the memory may be integrated with the processor, or the memory and the processor are disposed separately.

Optionally, the apparatus may further include a transceiver.

Optionally, the apparatus may be the foregoing second electronic device.

According to a seventh aspect, this application provides an electronic device, including one or more processors, a memory, a plurality of applications, and one or more computer programs. The one or more computer programs are stored in the memory, and the one or more computer programs include instructions. When the instructions are executed by the electronic device, the electronic device is enabled to perform the method for determining the orientation information according to any one of the first aspect or the possible implementations of the first aspect, or the method for determining the orientation information according to any embodiment of this application.

Optionally, the electronic device may further include a touch display screen and/or a camera, and the touch display screen includes a touch-sensitive surface and a display.

According to an eighth aspect, this application provides an electronic device, including one or more processors, a memory, a plurality of applications, and one or more computer programs. The one or more computer programs are stored in the memory, and the one or more computer programs include instructions. When the instructions are executed by the electronic device, the electronic device is enabled to perform the method for determining the orientation information according to any one of the second aspect or the possible implementations of the second aspect, or the method for determining the orientation information according to any embodiment of this application.

Optionally, the electronic device may further include a touch display screen and/or a camera, and the touch display screen includes a touch-sensitive surface and a display.

According to a ninth aspect, this application provides a computer-readable storage medium, including computer instructions. When the computer instructions are run on an electronic device, the electronic device is enabled to perform the method for determining the orientation information according to any one of the foregoing aspects or the possible implementations of the foregoing aspects, or the method for determining the orientation information according to any embodiment of this application.

According to a tenth aspect, this application provides a computer program product. When the computer program product runs on an electronic device, the electronic device is enabled to perform the method for determining the orientation information according to any one of the first aspect or the possible implementations of the first aspect, or the method for determining the orientation information according to any embodiment of this application.

According to an eleventh aspect, this application provides an apparatus, including a unit configured to perform the method according to any embodiment of this application.

DESCRIPTION OF EMBODIMENTS

The technical solutions according to embodiments of this application are clearly described in the following with reference to the accompanying drawings. In the descriptions of embodiments of this application, unless otherwise specified, "/" indicates "or". For example, A/B may indicate A or B. The term "and/or" in this specification only describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are only intended for a purpose of description, and should not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

Figure 1:
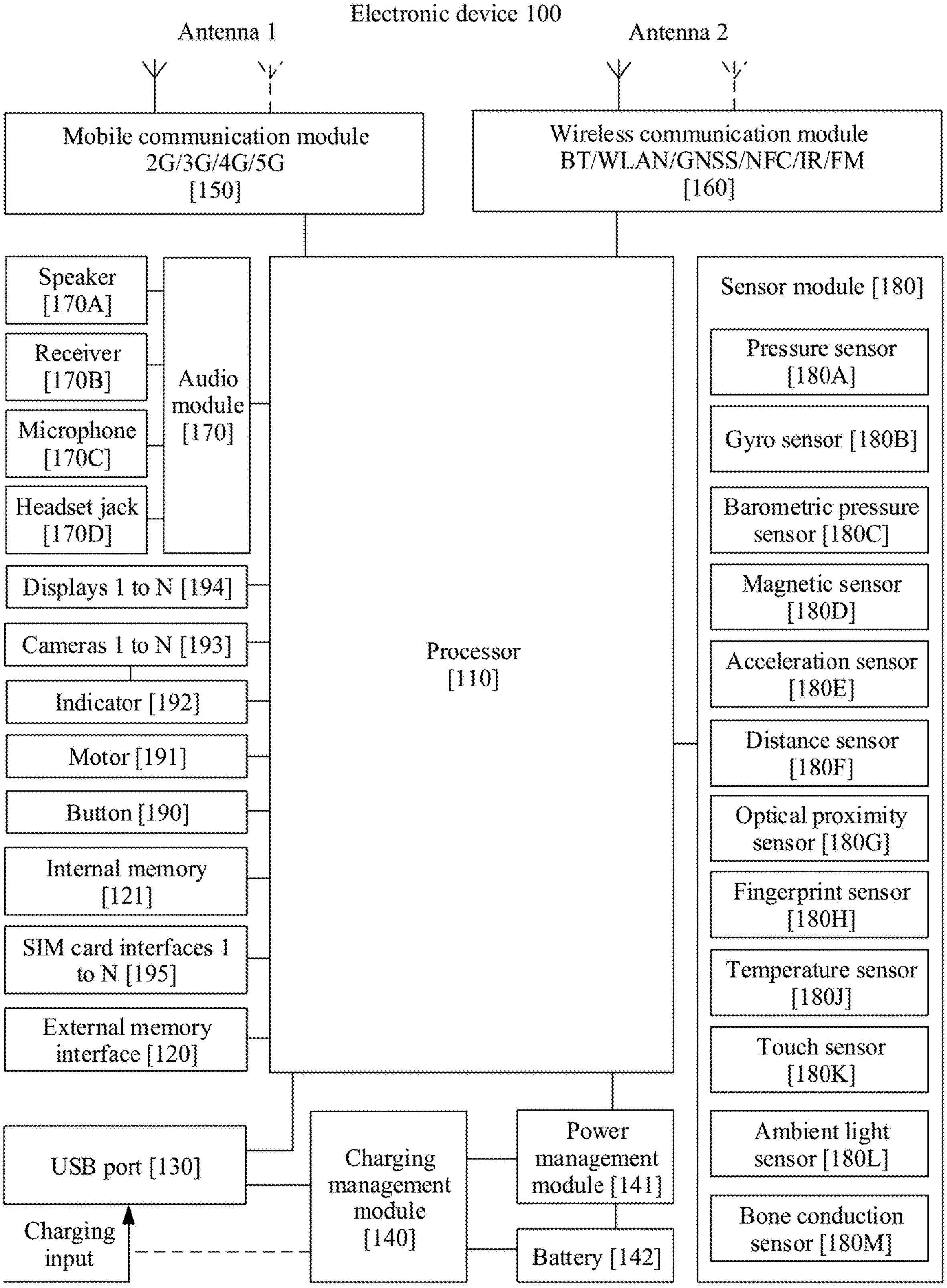
FIG. 1 is a schematic block diagram of a structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (USB) port 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, or the like.

It may be understood that the structure shown in this embodiment of this application does not constitute a specific limitation on the electronic device 100. In some other embodiments of this application, the electronic device 100 may include more or fewer components than those shown in the figure, combine some components, split some components, or have different component arrangements. The components shown in the figure may be implemented by hardware, software, or a combination of software and hardware. For example, if the electronic device 100 is a sound box, the electronic device 100 may include a processor 110, an internal memory 121, an external memory interface 120, a power management module 141, a mobile communication module 150, a wireless communication module 160, and an audio module 170.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural network processing unit (NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data that has been recently used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The I2C interface is a bidirectional synchronous serial bus, including a serial data line (SDA) and a serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured for audio communication. In some embodiments, the processor 110 may include a plurality of groups of I2S buses. The processor 110 may be coupled to the audio module 170 through the I2S bus to implement communication between the processor 110 and the audio module 170. In some embodiments, the audio module 170 may transfer an audio signal to the wireless communication module 160 through the I2S interface to implement a function of answering calls through a Bluetooth headset.

The PCM interface may also be configured for audio communication, sampling, quantizing, and encoding an analog signal. In some embodiments, the audio module 170 and the wireless communication module 160 may be coupled through a PCM bus interface. In some embodiments, the audio module 170 may alternatively transfer an audio signal to the wireless communication module 160 through the PCM interface to implement a function of answering calls through a Bluetooth headset. Both the I2S interface and the PCM interface may be configured for audio communication.

The UART interface is a universal serial data bus configured for asynchronous communication. The bus may be a bidirectional communication bus. The bus converts to-be-transmitted data between serial communication and parallel communication. In some embodiments, a UART interface is generally configured to connect the processor 110 and the wireless communication module 160. For example, the processor 110 communicates with a Bluetooth module in the wireless communication module 160 through the UART interface, to implement a Bluetooth function. In some embodiments, the audio module 170 may transfer an audio signal to the wireless communication module 160 through the UART interface to implement a function of playing music through a Bluetooth headset.

The MIPI interface may be configured to connect the processor 110 and peripheral components such as the display 194 and the camera 193. The MIPI interface includes a camera serial interface (CSI), a display serial interface (DSI), or the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured by software. The GPIO interface may be configured as a control signal or as a data signal. In some embodiments, the GPIO interface may be configured to connect the camera 193, the display 194, the wireless communication module 160, the audio module 170, the sensor module 180, and the like to the processor 110. The GPIO interface may also be configured as an I2C interface, an I2S interface, a UART interface, an MIPI interface, or the like.

The USB port 130 is an interface conforming to the USB standard specification, and specifically, may be a Mini USB port, a Micro USB port, a USB Type C port, or the like. The USB port 130 may be configured to be connected to the charger to charge the electronic device 100, or may be configured to transmit data between the electronic device 100 and a peripheral device, or may be configured to connect to a headset to play audio through the headset. The interface may alternatively be configured to connect to another electronic device, such as an augmented reality (AR) device.

It may be understood that an interface connection relationship between the modules that is shown in this embodiment of this application is merely an example for description, and does not constitute a limitation on a structure of the electronic device 100. In some other embodiments of this application, the electronic device 100 may alternatively use an interface connection manner different from that in the foregoing embodiment, or use a combination of a plurality of interface connection manners.

The charging management module 140 is configured to receive charging input from a charger. The charger may be a wireless charger or a wired charger. In some embodiments of wired charging, the charging management module 140 may receive a charging input of the wired charger through the USB port 130. In some embodiments of wireless charging, the charging management module 140 may receive a wireless charging input by using a wireless charging coil of the electronic device 100. The charging management module 140 may further supply power to the electronic device 100 by using the power management module 141 while charging the battery 142.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be provided in the processor 110. In some other embodiments, the power management module 141 and the charging management module 140 may alternatively be provided in a same device.

A wireless communication function of the electronic device 100 may be implemented through the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that is applied to the electronic device 100, including 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then, the demodulator transmits the demodulated low-frequency baseband signal to the baseband processor for processing. The low-frequency baseband signal is processed by the baseband processor and then transmitted to the application processor. The application processor outputs a sound signal through an audio device (not limited to the speaker 170A, the receiver 170B, and the like), or displays an image or a video through the display 194. In some embodiments, the modem processor may be an independent device. In some other embodiments, the modem processor may be independent of the processor 110, and is disposed in a same device as the mobile communication module 150 or another functional module.

The wireless communication module 160 may provide a wireless communication solution that is applied to the electronic device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communication module 160 may be one or more components integrating at least one communication processor module. The wireless communication module 160 receives an electromagnetic wave through the antenna 2, performs frequency modulation and filtering processing on the electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include a global system for mobile communication (GSM), a general packet radio service (GPRS), code division multiple access (CDMA), wideband code division multiple access (WCDMA), time division-code division multiple access (TD-SCDMA), long term evolution (LTE), a fifth-generation wireless communication system (5G), BT, the GNSS, the WLAN, the NFC, the FM, the IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display 194, the application processor, and the like. The GPU is a microprocessor for image processing and is connected to the display 194 and the application processor. The GPU is configured to perform mathematical and geometric computation for graphic rendering. The processor 110 may include one or more GPUs that execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194. N is a positive integer greater than 1.

The electronic device 100 may implement a photographing function through the ISP, the camera 193, the video codec, the GPU, the display 194, the application processor, and the like.

The ISP is configured to process data fed back by the camera 193. For example, during photographing, a shutter is opened, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (CCD), or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193. N is a positive integer greater than 1.

The digital signal processor is configured to process a digital signal, and may process another digital signal in addition to the digital image signal. For example, when the electronic device 100 selects a frequency point, the digital signal processor is configured to perform Fourier transformation or the like on frequency point energy.

The video codec is configured to compress or decompress a digital video. The electronic device 100 may support one or more types of video codecs. In this case, the electronic device 100 may play or record videos in a plurality of encoding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transmission mode between human brain neurons, and may further continuously perform self-learning. Applications such as intelligent cognition of the electronic device 100, for example, image recognition, facial recognition, speech recognition, and text understanding, can be implemented by using the NPU.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (for example, a sound playing function or an image playing function), and the like. The data storage region may store data (for example, an audio signal and a phone book) and the like created when the electronic device 100 is used. In addition, the internal memory 121 may include a high-speed random access memory, or may include a nonvolatile memory, for example, at least one magnetic disk storage device, a flash memory, or a universal flash storage (UFS).

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into analog audio signal output, and is further configured to convert analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

The speaker 170A, also referred to as a "loudspeaker", is configured to convert an audio electrical signal into a sound signal. The electronic device 100 may listen to music or answer a hands-free call by using the speaker 170A. In some embodiments, the speaker 170A is configured to send an ultrasonic signal. In some embodiments, the electronic device 100 may include a plurality of speakers. For example, the electronic device 100 includes a second speaker and a third speaker. A distance between the second speaker and the third speaker is greater than a preset distance. For example, the preset distance is 10 cm or 8 cm.

The receiver 170B, also referred to as an "earpiece", is configured to convert an electrical audio signal into a sound signal. When a call is answered or a voice message is received through the electronic device 100, the receiver 170B may be put close to a human ear to listen to a voice.

The microphone 170C, also referred to as a "mike" or a "microphone", is configured to convert a sound signal into an electrical signal. When making a call or sending a voice information, a user may make a sound near the microphone 170C through the mouth of the user, to input the sound signal to the microphone 170C. The electronic device 100 may be provided with at least one microphone 170C. In some other embodiments, two microphones 170C may be disposed in the electronic device 100, to collect sound signals and further implement a noise reduction function. In some other embodiments, three, four, or more microphones 170C may alternatively be disposed in the electronic device 100, to collect a sound signal, reduce noise, identify a sound source, implement a directional recording function, and the like. In some embodiments, the two microphones 170C disposed in the electronic device 100 may receive an ultrasonic signal sent by using a speaker of another electronic device. Optionally, a distance between the two microphones 170C in the electronic device 100 is greater than a preset distance. For example, the preset distance is 2 cm, 4 cm, 6 cm, 8 cm, or 10 cm.

The headset jack 170D is configured to connect to a wired headset. The headset jack 170D may be the USB port 130, or may be a 3.5 mm open mobile terminal platform (OMTP) standard interface or cellular telecommunications industry association of the USA (CTIA) standard interface.

The pressure sensor 180A is configured to sense a pressure signal, and convert the pressure signal into an electrical signal. In some embodiments, the pressure sensor 180A may be disposed on the display 194. There are a plurality of types of pressure sensors 180A, for example, a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may calculate a touch location based on a detection signal of the pressure sensor 180A.

The gyro sensor 180B may be configured to determine a motion posture of the electronic device 100. In some embodiments, a rotation angle of the electronic device 100 may be detected by using the gyro sensor 180B. In some embodiments, angular velocities of electronic device 100 around three axes (which are x, y, and z axes) may be determined by using the gyro sensor 180B. The g 180B may be configured to implement image stabilization during shooting. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may also be used in a navigation scenario and a somatic game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect opening and closing of a flip cover leather case by using the magnetic sensor 180D. In some embodiments, when the electronic device 100 is a flip machine, the electronic device 100 may detect opening and closing of the flip cover based on the magnetic sensor 180D. Further, a feature, like automatic unlocking when the cover is flipped open, is set based on a detected opening or closing state of the leather case or a detected opening or closing state of the cover.

The acceleration sensor 180E may detect magnitudes of accelerations of the electronic device 100 in all directions (usually on three axes). When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance through infrared or laser. In some embodiments, in a shooting scenario, the electronic device 100 may measure a distance through the distance sensor 180F, to implement quick focusing.

The optical proximity sensor 180G may include, for example, a light-emitting diode (LED) and a light detector, such as a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically perform screen-off for power saving. The optical proximity sensor 180G may also be used in a leather case mode or a pocket mode to automatically unlock or lock the screen.

The ambient light sensor 180L is configured to sense luminance of ambient light. The electronic device 100 may adaptively adjust brightness of the display 194 based on the sensed ambient light brightness. The ambient light sensor 180L may also be configured to automatically adjust white balance during shooting. The ambient light sensor 180L may further cooperate with the optical proximity sensor 180G to detect whether the electronic device 100 is in a pocket, to prevent an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to measure temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of a processor near the temperature sensor 180J, to reduce power consumption and implement thermal protection. In some other embodiments, when the temperature is less than another threshold, the electronic device 100 heats the battery 142 to avoid abnormal shutdown of the electronic device 100 caused by a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 constitute a touchscreen, which is also referred to as a "touch screen". The touch sensor 180K is configured to detect a touch operation on or near the touch sensor. The touch sensor may transfer the detected touch operation to the application processor to determine a type of a touch event. A visual output related to the touch operation may be provided on the display 194. In some other embodiments, the touch sensor 180K may alternatively be disposed on a surface of the electronic device 100 at a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may further be in contact with a human pulse and receive a blood pressure beating signal. In some embodiments, the bone conduction sensor 180M may alternatively be disposed in the headset, to obtain a bone conduction headset. The audio module 170 may obtain a voice signal by parsing a vibration signal of a vibrating bone of a vocal-cord part obtained by the bone conduction sensor 180M, to implement a voice function. The application processor may parse heart rate information based on the blood pressure pulse signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to user setting and function control of the electronic device 100.

The motor 191 may generate a vibration prompt. The motor 191 may be configured to produce an incoming call vibration prompt and a touch vibration feedback. For example, touch operations performed on different applications (for example photographing and audio play) may correspond to different vibration feedback effects. For touch operations performed on different areas of the display 194, the motor 191 may also correspond to different vibration feedback effects. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or different types. The SIM card interface 195 is compatible to different types of SIM cards. The SIM card interface 195 may also be compatible with an external storage card. The electronic device 100 interacts with a network through the SIM card, to implement functions such as talking and data communication. In some embodiments, the electronic device 100 uses an eSIM, that is, an embedded SIM card. The eSIM card may be embedded into the electronic device 100, and cannot be separated from the electronic device 100.

It should be noted that any electronic device mentioned in embodiments of this application may include more or fewer modules in the electronic device 100.

A software system of the electronic device 100 may use a layered architecture, an event-driven architecture, a microkernel architecture, a micro service architecture, or a cloud architecture. An embodiment of this application uses an Android system of a layered architecture as an example, to illustrate a software structure of the electronic device 100.

Figure 2:
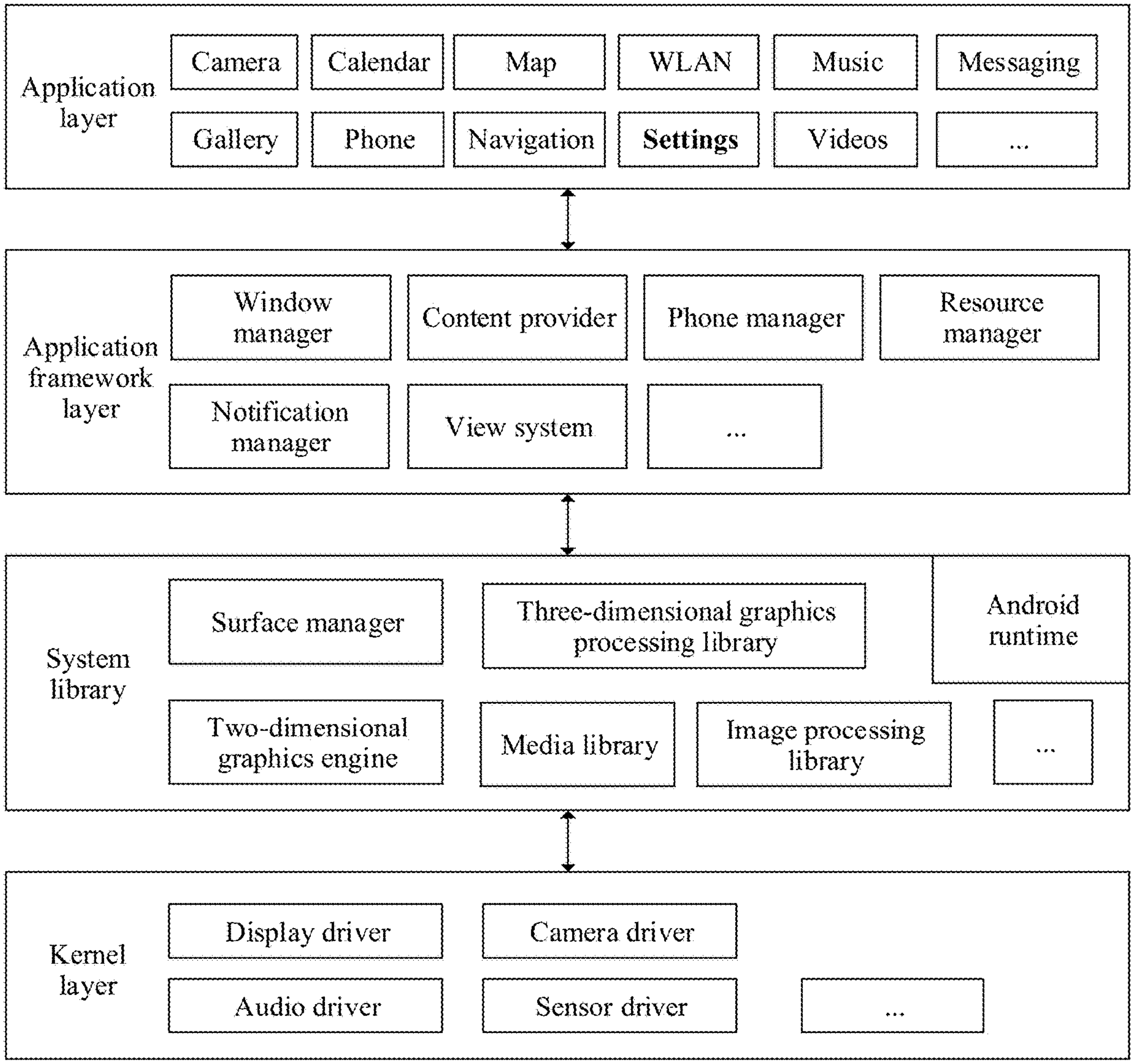
FIG. 2 is a schematic diagram of a software architecture of an electronic device according to an embodiment of this application.

FIG. 2 is a block diagram of a software structure of an electronic device 100 according to an embodiment of this application. In a layered architecture, software is divided into several layers, and each layer has a clear role and task. The layers communicate with each other through a software interface. In some embodiments, an Android system is divided into four layers: an application layer, an application framework layer, an Android runtime and a system library, and a kernel layer from top to bottom. The application layer may include a series of application packages.

As shown in FIG. 2, the application packages may include applications such as camera, gallery, calendar, phone, map, navigation, WLAN, settings, music, video, and messaging may be installed at the application layer.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, capture a screen, and the like.

The content providers are configured to store and retrieve data and make the data accessible to applications. The data may include a video, an image, audio, calls that are made and answered, a browsing history and bookmarks, an address book, and the like.

The view system includes visual controls, such as a control for displaying text, a control for displaying pictures, and the like. The view system may be configured to build an application. A display interface may be composed of one or more views. For example, a display interface including a short message service message notification icon may include a view for displaying text and a view for displaying a picture.

The phone manager is used to provide a communication function of the electronic device 100, for example, management of a call status (including answering, declining, or the like).

The resource manager provides, to the application, various resources such as a localized character string, an icon, a picture, a layout file, and a video file.

The notification manager enables an application to display notification information in a status bar, and may be configured to convey a notification message that may automatically disappear after a short pause without requiring user interaction. For example, the notification manager is configured to notify download completion, provide a message notification, and the like. The notification manager may alternatively be a notification that appears in a top status bar of the system in a form of a graph or a scroll bar text, for example, a notification of an application running in the background or a notification that appears on the screen in a form of a dialog window. For example, text information is displayed in the status bar, an announcement is given, the electronic device vibrates, or an indicator light blinks.

The Android runtime includes a kernel library and a virtual machine. The Android runtime is responsible for scheduling and managing an Android system.

The kernel library includes two parts: a function to be invoked by a java language, and a kernel library of Android.

The application layer and the application framework layer run on the virtual machine. The virtual machine executes Java files at the application layer and the application framework layer as binary files. The virtual machine is used to perform functions such as object lifecycle management, stack management, thread management, security and exception management, and garbage collection.

The system library may include a plurality of functional modules, for example, a surface manager, a media library, a three-dimensional graphics processing library (for example, an OpenGL ES), a two-dimensional graphics engine (for example, an SGL), and an image processing library.

The surface manager is configured to: manage a display subsystem, and provide fusion of 2D and 3D layers for a plurality of applications.

The media library supports playback and recording of various common audio and video formats, as well as still image files, and the like. The media library may support a plurality of audio and video encoding formats, for example, MPEG-4, H.264, MP3, AAC, AMR, JPG, and PNG.

The three-dimensional graphics processing library is used to implement three-dimensional graphics drawing, image rendering, compositing, layer processing, and the like. The 2D graphics engine is a drawing engine for 2D drawing.

The kernel layer is a layer between hardware and software. The kernel layer includes at least a display driver, a camera driver, an audio driver, and a sensor driver.

In some scenarios, a plurality of electronic devices may collaborate to implement some functions. In a collaborative process of the plurality of electronic devices, if the plurality of electronic devices are in preset orientations, collaboration can be better completed. In a conventional technology, a user needs to manually participate in configuring orientations of a plurality of electronic devices, resulting in a relatively high requirement on the user and a complex operation.

For example, when a plurality of electronic devices at a user's home are networked, a primary electronic device needs to know an orientation of each electronic device, so that better networking can be implemented.

Figure 3:
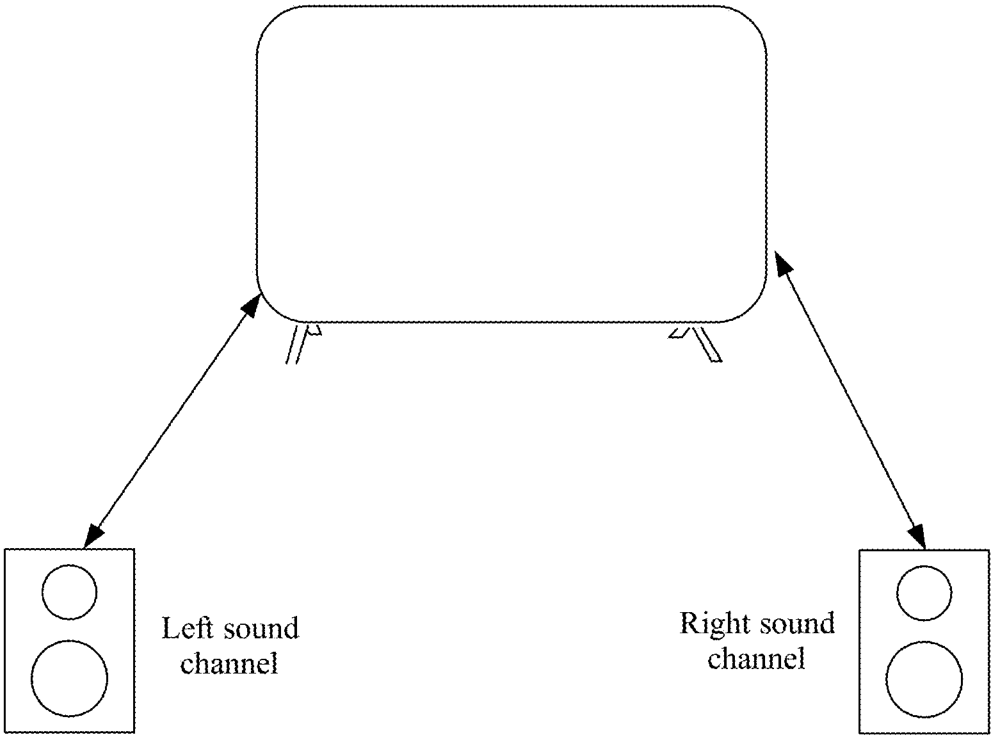
FIG. 3 is a schematic diagram of a scenario between a sound box and a large screen according to an embodiment of this application.

For another example, a large screen may play different audio signals by using a plurality of sound boxes, to implement stereo effect. For example, the large screen may be a television, a computer, or a projector. The user may set a sound channel corresponding to each sound box by performing an operation on a display interface of the large screen. The plurality of sound boxes play the different audio signals from the large screen, to implement the stereo effect. However, in this process, the user needs to perform manual setting, and the user needs to have knowledge of allocating the sound channel. This operation is complex, and user experience is poor. As shown in FIG. 3, the user needs to allocate a left sound channel to a left sound box and allocate a right sound channel to a right sound box on the display interface of the large screen. Specifically, an identifier of the left sound box may be displayed on the large screen, the user allocates the left sound channel to the left sound box based on the identifier of the left sound box, the display interface of the large screen may display an identifier of the right sound box, and the user allocates the right sound channel to the right sound box based on the identifier of the right sound box.

The following specifically describes a manner in which the user sets the sound channel.

Figure 4:
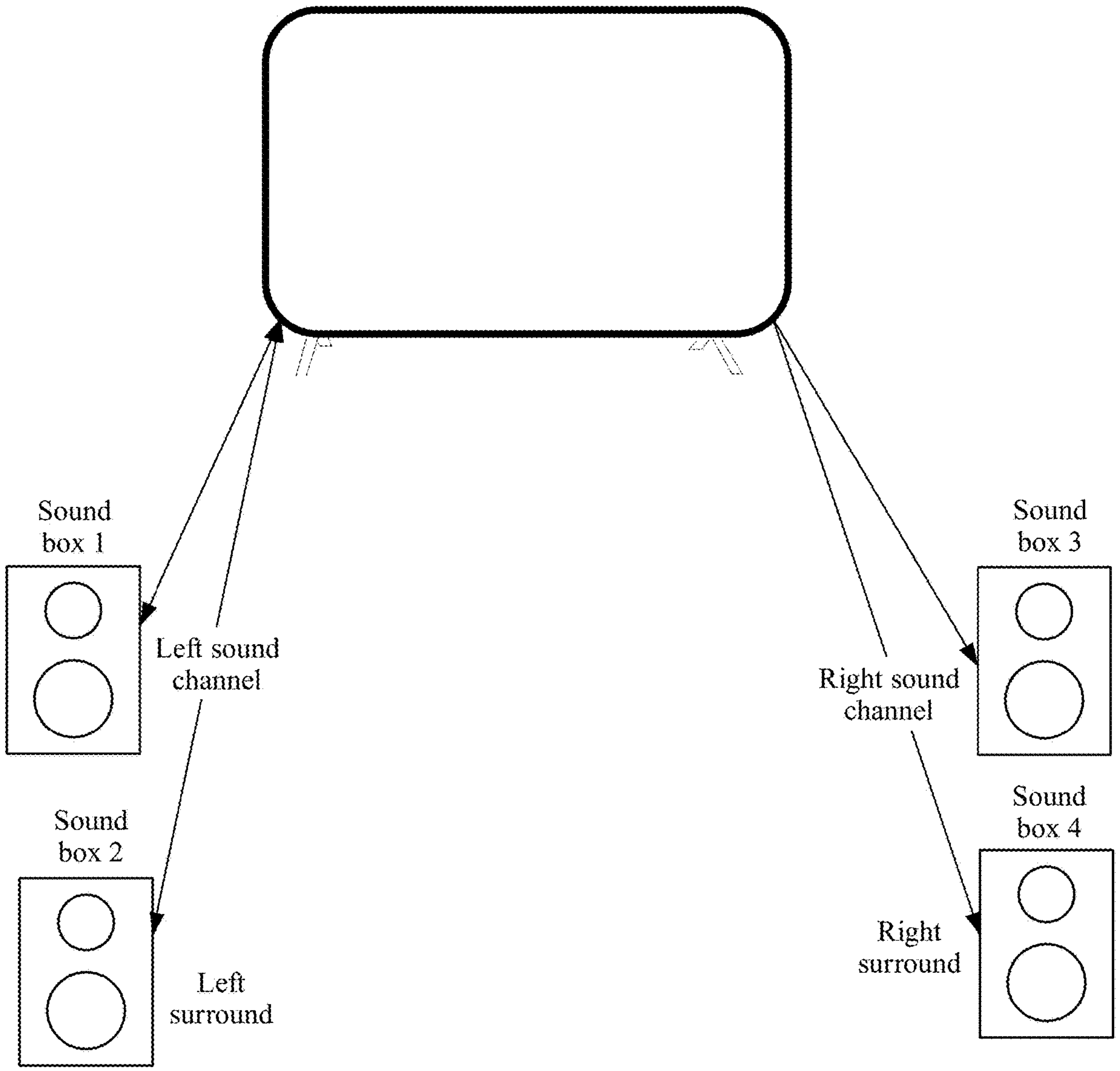
FIG. 4 is a schematic diagram of another scenario between a sound box and a large screen according to an embodiment of this application.
Figure 5:
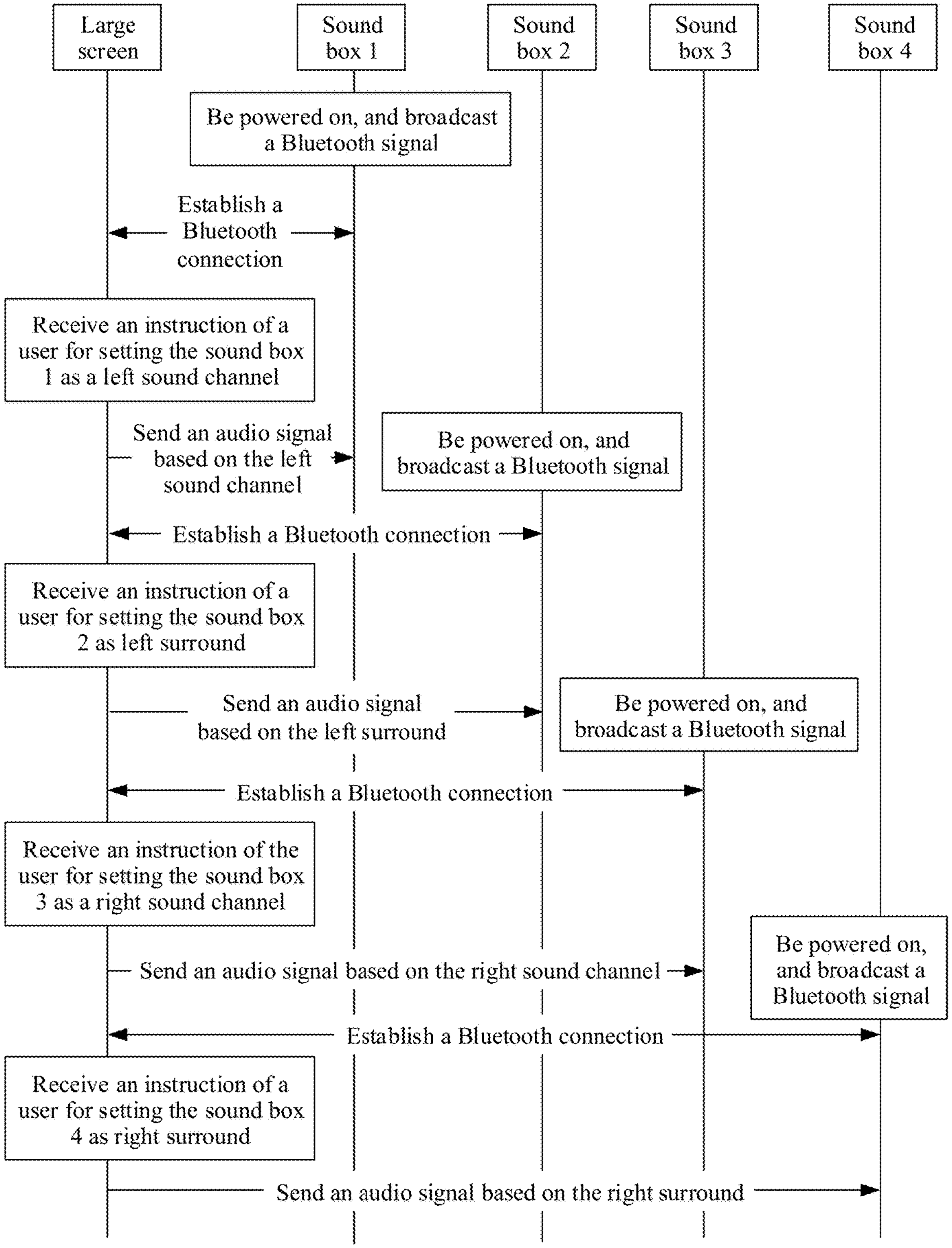
FIG. 5 shows a method in which a user participates in sound channel allocation configuration according to an embodiment of this application.
Figure 6:
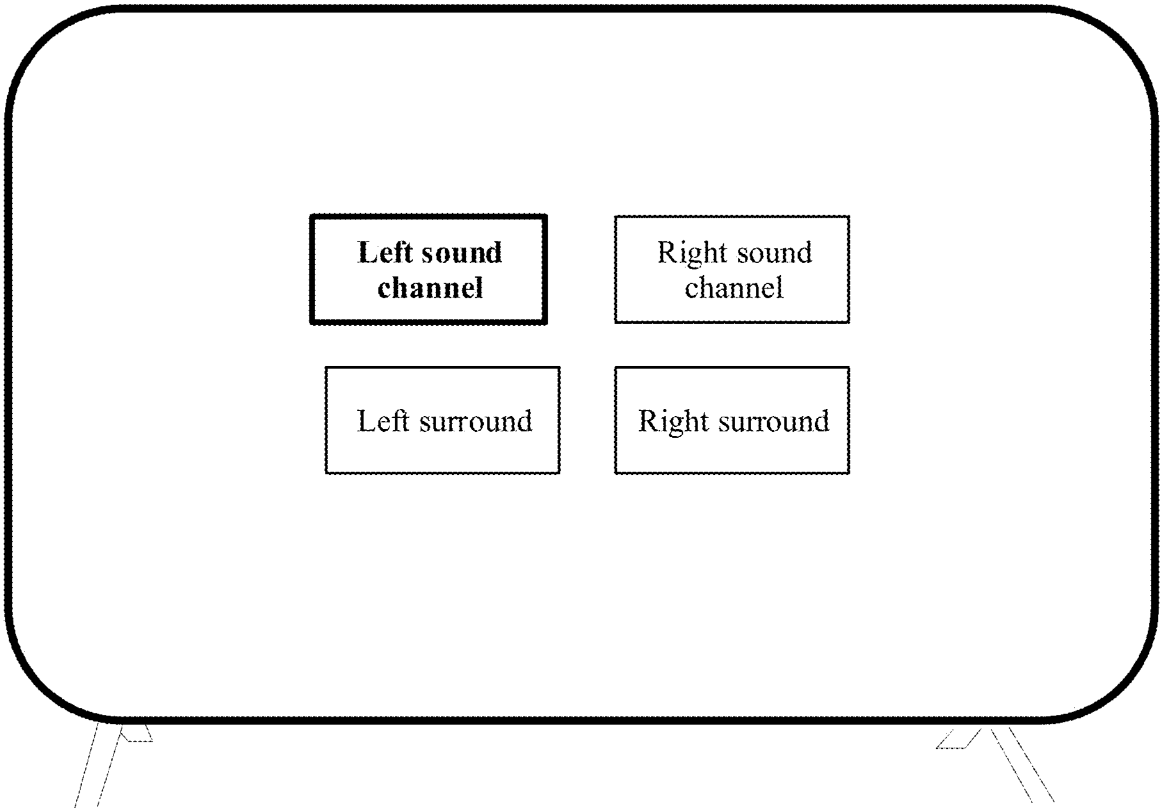
FIG. 6 is a schematic diagram of a user setting interface according to an embodiment of this application.

As shown in FIG. 4, there are four sound boxes around the large screen: a sound box 1, a sound box 2, a sound box 3, and a sound box 4. The user manually places the four sound boxes. As shown in FIG. 5, the sound box 1 is powered on, and the sound box 1 broadcasts a Bluetooth signal. After the large screen finds the Bluetooth signal broadcast by the sound box 1, the found sound box 1 is displayed on the display interface of the large screen. The user clicks to establish a connection, and in response to the operation of the user, the large screen establishes a Bluetooth connection to the sound box 1. The user sets the sound box 1 as the left sound channel on the display interface of the large screen based on a position of sound box 1, and the large screen receives an instruction of the user for setting the sound box 1 as the left sound channel. For example, as shown in FIG. 6, the user selects a left sound channel by using a remote control to complete sound channel setting of the sound box 1. The large screen sends an audio signal to the sound box 1 by using the established Bluetooth connection based on the left sound channel set by the user for the sound box 1. The sound box 2 is powered on, and the sound box 2 broadcasts a Bluetooth signal. After the large screen finds the Bluetooth signal broadcast by the sound box 2, the found sound box 2 is displayed on the display interface of the large screen. The user clicks to establish a connection, and in response to the operation of the user, the large screen establishes a Bluetooth connection to the sound box 2. The user sets the sound box 2 as left surround on the display interface of the large screen based on a position of sound box 2, and the large screen receives an instruction of the user for setting the sound box 2 as the left surround. For example, the user selects left surround shown in FIG. 6 by using the remote control to complete sound channel setting of the sound box 2. The large screen sends an audio signal to the sound box 2 by using the established Bluetooth connection based on the left surround set by the user for the sound box 2. The sound box 3 is powered on, and the sound box 3 broadcasts a Bluetooth signal. After the large screen finds the Bluetooth signal broadcast by the sound box 3, the found sound box 3 is displayed on the display interface of the large screen. The user clicks to establish a connection, and in response to the operation of the user, the large screen establishes a Bluetooth connection to the sound box 3. The user sets the sound box 3 as the right sound channel on the display interface of the large screen based on a position of sound box 3, and the large screen receives an instruction of the user for setting the sound box 3 as the right sound channel. For example, the user selects a right sound channel shown in FIG. 6 by using the remote control to complete sound channel setting of the sound box 3. The large screen sends an audio signal to the sound box 3 based on the right sound channel set by the user for the sound box 3. The sound box 4 is powered on, and the sound box 4 broadcasts a Bluetooth signal. After the large screen finds the Bluetooth signal broadcast by the sound box 4, the found sound box 4 is displayed on the display interface of the large screen. The user clicks to establish a connection, and in response to the operation of the user, the large screen establishes a Bluetooth connection to the sound box 4. The user sets the sound box 4 as right surround on the display interface of the large screen based on a position of sound box 4, and the large screen receives an instruction of the user for setting the sound box 4 as the right surround. For example, the user selects right surround shown in FIG. 6 by using the remote control to complete sound channel setting of the sound box 4. The large screen sends an audio signal to the sound box 4 by using the established Bluetooth connection based on the right surround set by the user for the sound box 4. In other words, the user needs to sequentially turn on each sound box, and set a sound channel for each sound box based on a relative position relationship between each sound box and the large screen. This operation is complex, and user experience is poor. Especially if there are many sound boxes, the user needs to perform a plurality of operations, and user experience is poor. Alternatively, in some embodiments, the four sound boxes may be simultaneously powered on, and the user may allocate sound channels to the four sound boxes respectively on the display interface of the large screen. However, in this scenario, the display interface of the large screen needs to simultaneously display identifiers of the four sound boxes, the user needs to lean of identifiers of sound boxes at different positions, and the user needs to set a sound channel of each sound box based on a position of each sound box. In other words, there is a relatively high requirement on the user, and the user needs to know identifiers of different sound boxes at different positions, to set different sound channels for the sound boxes at the different positions. In addition, the user also needs to set a plurality of sound channels, resulting in poor user experience.

In this embodiment of this application, a second electronic device may send a first sequence and a second sequence. The first sequence is a known sequence. Because the first sequence is associated with the second sequence, the first electronic device determines, based on the received second sequence, whether an electronic device sending the first sequence is the second electronic device. If the electronic device sending the first sequence is the second electronic device, the first electronic device may determine orientation information of the second electronic device based on the first sequence. Therefore, the user does not need to set an orientation of the second electronic device, and user experience can be improved. Especially if there are a relatively large quantity of electronic devices, user experience can be further improved.

Figure 7:
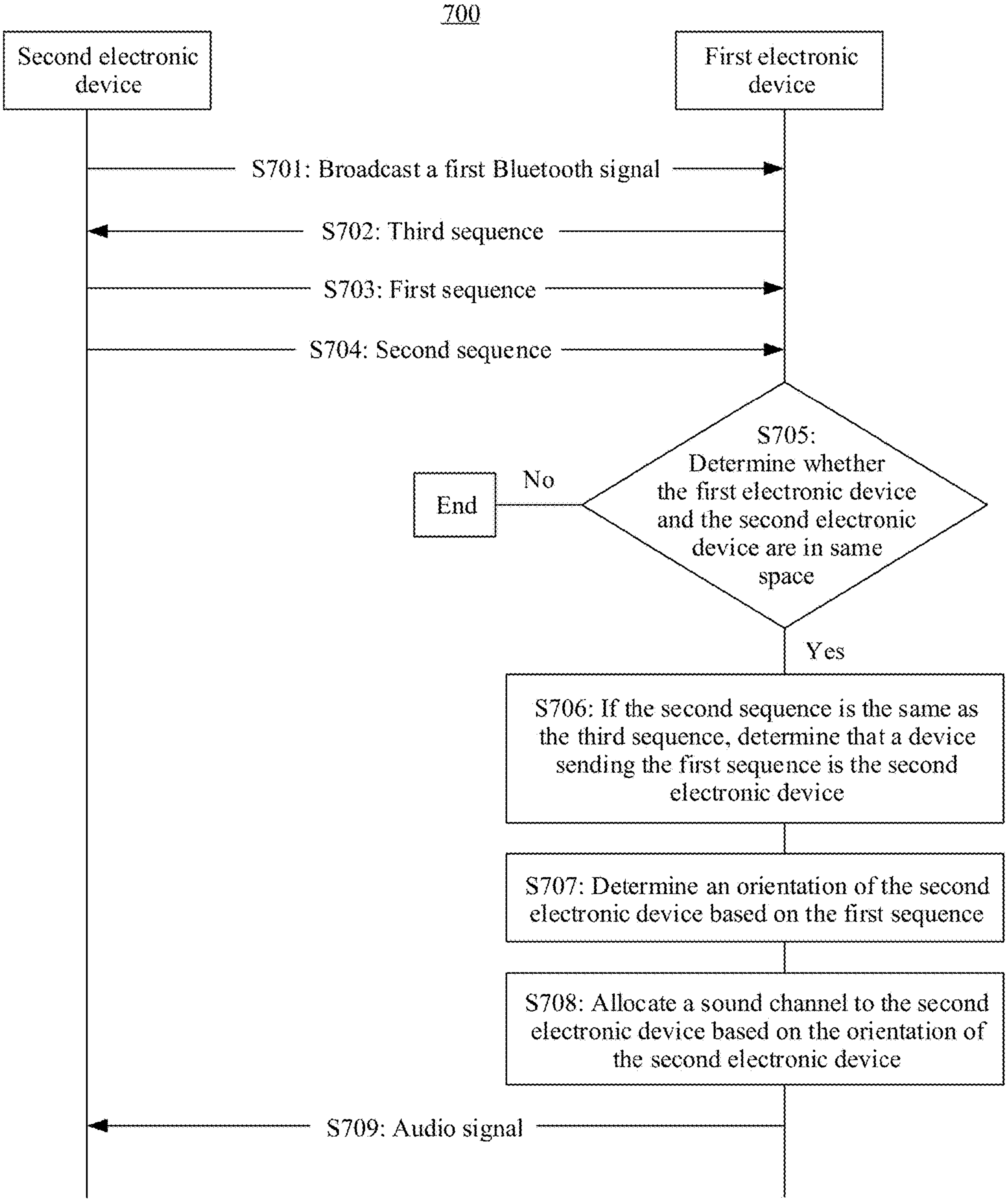
FIG. 7 is a schematic diagram of a method for determining an orientation according to an embodiment of this application.

With reference to an embodiment in FIG. 7, the following describes a method 700 for determining an orientation according to an embodiment of this application.

S701: A second electronic device broadcasts a first Bluetooth signal, and a first electronic device receives the first Bluetooth signal broadcast by the second electronic device.

Optionally, after being powered on, the second electronic device may broadcast the first Bluetooth signal. After the first electronic device receives the first Bluetooth signal broadcast by the second electronic device, it indicates that the first electronic device finds the second electronic device.

Optionally, the first Bluetooth signal includes an identifier of the second electronic device. Optionally, the identifier of the second electronic device may be a Bluetooth media access control (MAC) address of the second electronic device, and the Bluetooth MAC address of the second electronic device is used to uniquely identify the second electronic device.

Optionally, after receiving the first Bluetooth signal, the first electronic device may establish a Bluetooth channel with the second electronic device. The Bluetooth channel established between the first electronic device and the second electronic device is not confirmed by the user. Therefore, the Bluetooth channel existing between the first electronic device and the second electronic device may be understood as an insecure Bluetooth channel.

Optionally, after receiving the first Bluetooth signal, the first electronic device may establish a Bluetooth channel with the second electronic device. The Bluetooth channel established between the first electronic device and the second electronic device may be confirmed by authorization of the user. Therefore, the Bluetooth channel existing between the first electronic device and the second electronic device may be understood as a secure Bluetooth channel.

Optionally, the first Bluetooth signal in S701 may be replaced with another signal, for example, may be replaced with a Wi-Fi signal.

S702: The first electronic device sends a third sequence to the second electronic device, and the second electronic device receives the third sequence from the first electronic device.

Optionally, S702 includes: The first electronic device may send the third sequence to the second electronic device by using a Wi-Fi channel, and the second electronic device receives the third sequence from the first electronic device by using the Wi-Fi channel. In this case, the first Bluetooth signal sent by the second electronic device in S701 may be replaced with a Wi-Fi signal.

Optionally, S702 includes: The first electronic device may send the third sequence to the second electronic device by using a cellular channel, and the second electronic device receives the third sequence from the first electronic device by using the cellular channel. In this case, the first Bluetooth signal sent by the second electronic device in S701 may be replaced with a cellular signal.

Optionally, S702 includes: The first electronic device may send the third sequence to the second electronic device by using a ZigBee channel, and the second electronic device receives the third sequence from the first electronic device by using the ZigBee channel. In this case, the first Bluetooth signal sent by the second electronic device in S701 may be replaced with a ZigBee signal.

Based on S701, optionally, S702 includes: The first electronic device may send the third sequence to the second electronic device by using a Bluetooth channel, and the second electronic device receives the third sequence from the first electronic device by using the Bluetooth channel. Optionally, the Bluetooth channel may be a secure Bluetooth channel or an insecure Bluetooth channel.

If the first electronic device sends the third sequence to the second electronic device by using the Bluetooth channel, S702 may be triggered in either of the following two manners.

Figure 8:
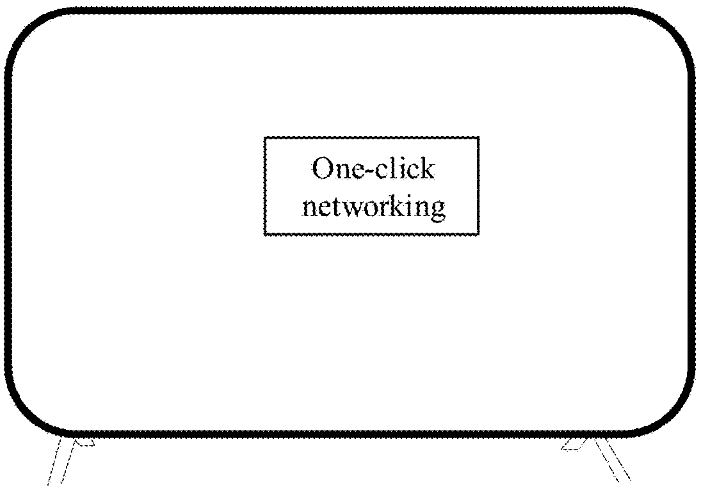
FIG. 8 is a schematic diagram of networking setting according to an embodiment of this application.

Manner 1: The first electronic device receives a first operation instruction, and performs S702 in response to the first operation instruction. Optionally, after receiving the first Bluetooth signal and receiving the first operation instruction input by the user, the first electronic device performs S702, that is, after finding the second electronic device and receiving the first operation instruction input by the user, the first electronic device may perform S702. As shown in FIG. 8, the first operation instruction input by the user is that the user clicks "one-click networking" of the first electronic device. "One-click networking" in FIG. 8 may be replaced with "networking", or may be replaced with "allocating a sound channel" in a stereo surround sound scenario formed by a plurality of sound boxes, or certainly may be replaced with other existing content, for example, an option of "setting" in a "one-click networking" application shown in FIG. 8. This is not limited in this embodiment of this application.

Manner 2: In S701, the first electronic device receives the first Bluetooth signal broadcast by the second electronic device, and triggers the first electronic device to send the third sequence to the second electronic device in S702. In other words, after receiving the first Bluetooth signal broadcast by the second electronic device, the first electronic device triggers the first electronic device to send the third sequence to the second electronic device that broadcasts the first Bluetooth signal.

It should be noted that, if the first electronic device sends the third sequence to the second electronic device by using another channel, a trigger manner for triggering the first electronic device to send the third sequence to the second electronic device is similar to a trigger manner for triggering the first electronic device to send the third sequence to the second electronic device by using a Bluetooth channel. To avoid repetition, details are not described.

For example, the third sequence may be a token, that is, the third sequence is a sequence allocated by the first electronic device to the second electronic device, and is also referred to as a token allocated by the first electronic device to the second electronic device. When sending a first sequence to the first electronic device, the second electronic device also needs to send the third sequence allocated by the first electronic device, so that the first electronic device can identify the second electronic device.

Optionally, a length of the third sequence is a preset value. For example, the preset value is 16 bits.

S703: The second electronic device sends the first sequence, and the first electronic device receives the first sequence.

S702 triggers S703. In other words, after receiving the third sequence, the second electronic device triggers the second electronic device to send the first sequence.

Optionally, the second electronic device sends the first sequence by using a signal used for measurement. For example, the second electronic device may send the first sequence by using an ultrasonic signal, or send the first sequence by using a sound wave signal.

Optionally, the second electronic device and the first electronic device may learn of the first sequence in advance. For example, it may be specified that the first sequence is a frequency modulated continuous wave (FMCW) sequence, or a Zadoff-Chu sequence.

Optionally, the second electronic device may notify the first electronic device of the first sequence in advance by using a Bluetooth channel. For example, after S701, the first electronic device may establish a Bluetooth channel with the second electronic device. The second electronic device may notify the first electronic device of the first sequence by using the Bluetooth channel established after S701. In other words, the second electronic device notifies the first electronic device that the second electronic device sends the first sequence.

Optionally, the first electronic device may notify the second electronic device of the first sequence in advance by using a Bluetooth channel. For example, after S701, the first electronic device may establish a Bluetooth channel with the second electronic device. The first electronic device may notify the second electronic device of the first sequence by using the Bluetooth channel established after S701. In other words, the first electronic device notifies the second electronic device to send the first sequence.

In other words, for the first electronic device, the first electronic device may perform a correlation operation based on the first sequence, to determine the first sequence from at least one sequence. For example, the second electronic device sends the first sequence, and another electronic device also sends one sequence. The first electronic device receives two sequences. Because the first electronic device knows that the second electronic device sends the first sequence, the first electronic device performs the correlation operation on the received two sequences by using the first sequence, and the first electronic device determines that a sequence with a highest correlation is the first sequence sent by the second electronic device.

S704: The second electronic device sends a second sequence, and the first electronic device receives the second sequence, where the first sequence is associated with the second sequence, and the second sequence is the third sequence in S702.

In other words, the second electronic device sends, to the first electronic device, the third sequence that is sent by the first electronic device to the second electronic device. S702 triggers S704.

Figure 9:
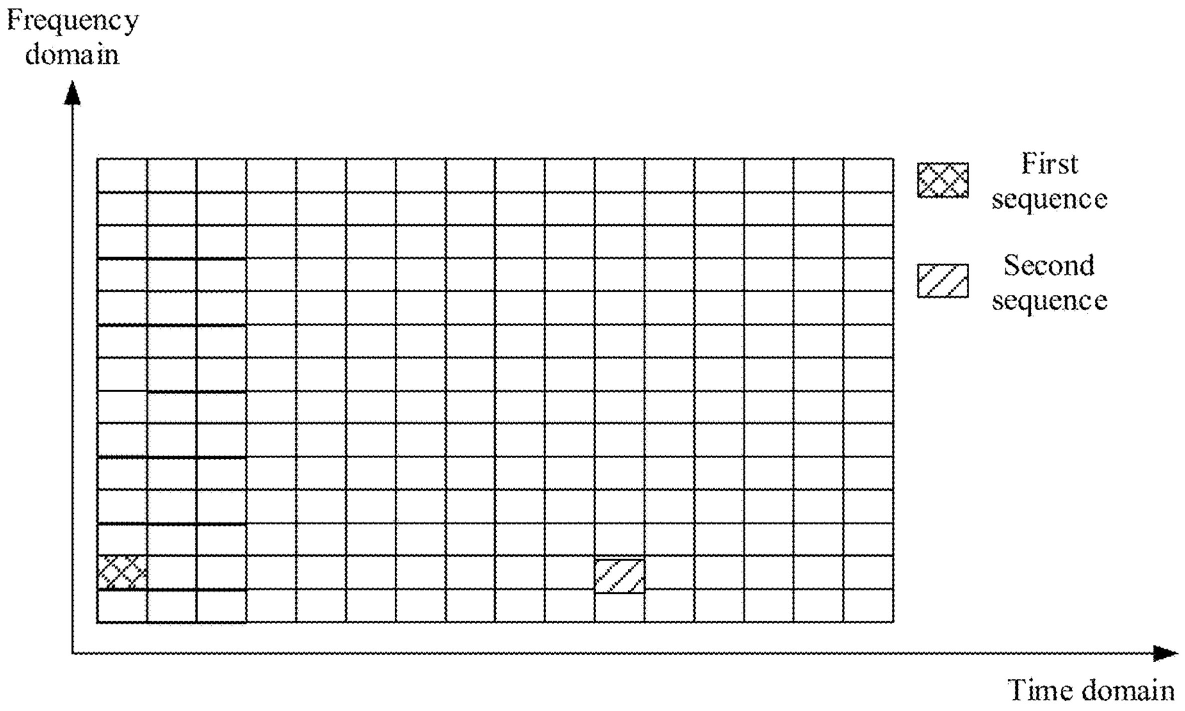
FIG. 9 is a schematic diagram of time domain resources for sending both a first sequence and a second sequence according to an embodiment of this application.

Optionally, that the first sequence is associated with the second sequence may be: A time domain resource for sending the first sequence by the second electronic device is associated with a time domain resource for sending the second sequence by the second electronic device, and a time domain resource for receiving the first sequence by the first electronic device is associated with a time domain resource for receiving the second sequence by the first electronic device. Optionally, that a time domain resource for sending the first sequence by the second electronic device is associated with a time domain resource for sending the second sequence by the second electronic device may be understood as: An interval between the time domain resource for sending the first sequence by the second electronic device and the time domain resource for sending the second sequence by the second electronic device is a preset time domain interval. That a time domain resource for receiving the first sequence by the first electronic device is associated with a time domain resource for receiving the second sequence by the first electronic device may be understood as: An interval between the time domain resource for receiving the first sequence by the first electronic device and the time domain resource for receiving the second sequence by the first electronic device is a preset time domain interval. In other words, the second electronic device sends the first sequence and the second sequence based on the preset time domain interval, and the first electronic device receives the first sequence and the second sequence based on the preset time domain interval. For example, the second electronic device sends the first sequence on a first time domain resource, the second electronic device determines a second time domain resource based on the first time domain resource and the preset time domain interval, and sends the second sequence on the second time domain resource. The first electronic device receives the first sequence on a third time domain resource. The first electronic device determines a fourth time domain resource based on the third time domain resource and the preset time domain interval, and receives the second sequence on the fourth time domain resource. If the first time domain resource is the same as the third time domain resource, it indicates that there is no transmission delay. If the first time domain resource is different from the third time domain resource, a difference between the third time domain resource and the first time domain resource is a transmission delay. Because the second electronic device determines the second time domain resource based on the first time domain resource and the preset time domain interval, and the first electronic device determines the fourth time domain resource based on the third time domain resource and the preset time domain interval, a difference between the fourth time domain resource and the second time domain resource is equal to the difference between the third time domain resource and the first time domain resource, that is, a transmission delay of the second sequence may be the same as a transmission delay of the first sequence. In other words, a time domain interval between the first time domain resource and the second time domain resource is the preset time domain interval. A frequency domain resource for sending the first sequence by the second electronic device and a frequency domain resource for sending the second sequence by the second electronic device may be the same or different. As shown in FIG. 9, the time domain interval between the first time domain resource and the second time domain resource is 10 symbols, and the frequency domain resource for sending the first sequence by the second electronic device and the frequency domain resource for sending the second sequence by the second electronic device are the same. In other words, the second electronic device sends the first sequence and the second sequence based on the preset time domain interval. After receiving the first sequence, the first electronic device determines the fourth time domain resource based on the third time domain resource for receiving the first sequence and the preset time domain interval, and parses whether a sequence received on the fourth time domain resource is the third sequence sent to the second electronic device in S702. If the sequence received on the fourth time domain resource is the third sequence sent to the second electronic device, it indicates that a device sending the first sequence is the second electronic device. For example, in FIG. 9, the second electronic device sends the first sequence on a first symbol, and the preset time domain interval is 10 symbols. Therefore, the second electronic device sends the second sequence on an 11th symbol. Due to a transmission delay, after receiving the first sequence on a second symbol, the first electronic device determines a 12th symbol based on the interval of 10 symbols. The first electronic device parses whether a sequence received on the 12th symbol is the third sequence sent to the second electronic device in S702. If the sequence received on the 12th symbol is the third sequence sent to the second electronic device, it indicates that the device sending the first sequence is the second electronic device.

Figure 10:
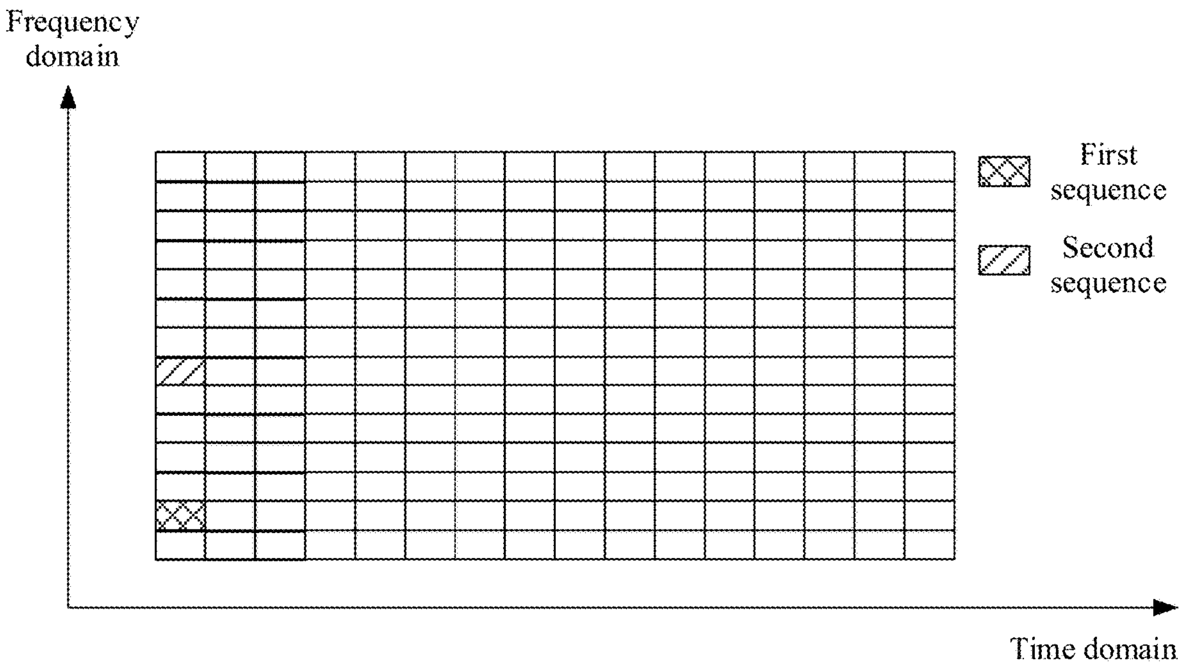
FIG. 10 is a schematic diagram of frequency domain resources for sending both a first sequence and a second sequence according to an embodiment of this application.

Optionally, that the first sequence is associated with the second sequence may be: A frequency domain resource for sending the first sequence by the second electronic device is associated with a frequency domain resource for sending the second sequence by the second electronic device, and a frequency domain resource for receiving the first sequence by the first electronic device is associated with a frequency domain resource for receiving the second sequence by the first electronic device. Optionally, that a frequency domain resource for sending the first sequence by the second electronic device is associated with a frequency domain resource for sending the second sequence by the second electronic device may be understood as: An interval between the frequency domain resource for sending the first sequence by the second electronic device and the frequency domain resource for sending the second sequence by the second electronic device is a preset frequency domain interval. That a frequency domain resource for receiving the first sequence by the first electronic device is associated with a frequency domain resource for receiving the second sequence by the first electronic device may be understood as: An interval between the frequency domain resource for receiving the first sequence by the first electronic device and the frequency domain resource for receiving the second sequence by the first electronic device is a preset frequency domain interval. In other words, the second electronic device sends the first sequence and the second sequence based on the preset frequency domain interval, and the first electronic device receives the first sequence and the second sequence based on the preset frequency domain interval. For example, the second electronic device sends the first sequence on a first frequency domain resource, the second electronic device determines a second frequency domain resource based on the first frequency domain resource and the preset frequency domain interval, and sends the second sequence on the second frequency domain resource. The first electronic device receives the first sequence on a third frequency domain resource. The first electronic device determines the second frequency domain resource based on the first frequency domain resource and the preset frequency domain interval, and receives the second sequence on the second frequency domain resource. In other words, a frequency domain interval between the first frequency domain resource and the second frequency domain resource is the preset frequency domain interval. A time domain resource for sending the first sequence by the second electronic device and a time domain resource for sending the second sequence by the second electronic device may be the same or different. As shown in FIG. 10, the frequency domain interval between the first frequency domain resource and the second frequency domain resource is 5 tones, and the time domain resource for sending the first sequence by the second electronic device and the time domain resource for sending the second sequence by the second electronic device are the same. In other words, in S704, the second electronic device sends the first sequence and the second sequence based on the preset frequency domain interval. After receiving the first sequence, the first electronic device determines the second frequency domain resource based on the first frequency domain resource for receiving the first sequence and the preset frequency domain interval, and parses whether a sequence received on the second frequency domain resource is the third sequence sent to the second electronic device in S702. If the sequence received on the second frequency domain resource is the third sequence sent to the second electronic device, it indicates that a device sending the first sequence is the second electronic device. For example, in FIG. 10, the second electronic device sends the first sequence on a second tone (from bottom to top), and the preset frequency domain interval is five tones. Therefore, the second electronic device sends the second sequence on a seventh tone. After receiving the first sequence on a second tone, the first electronic device determines the seventh tone based on the preset interval of five tones. The first electronic device parses whether a sequence received on the seventh tone is the third sequence in S702.

Figure 11:
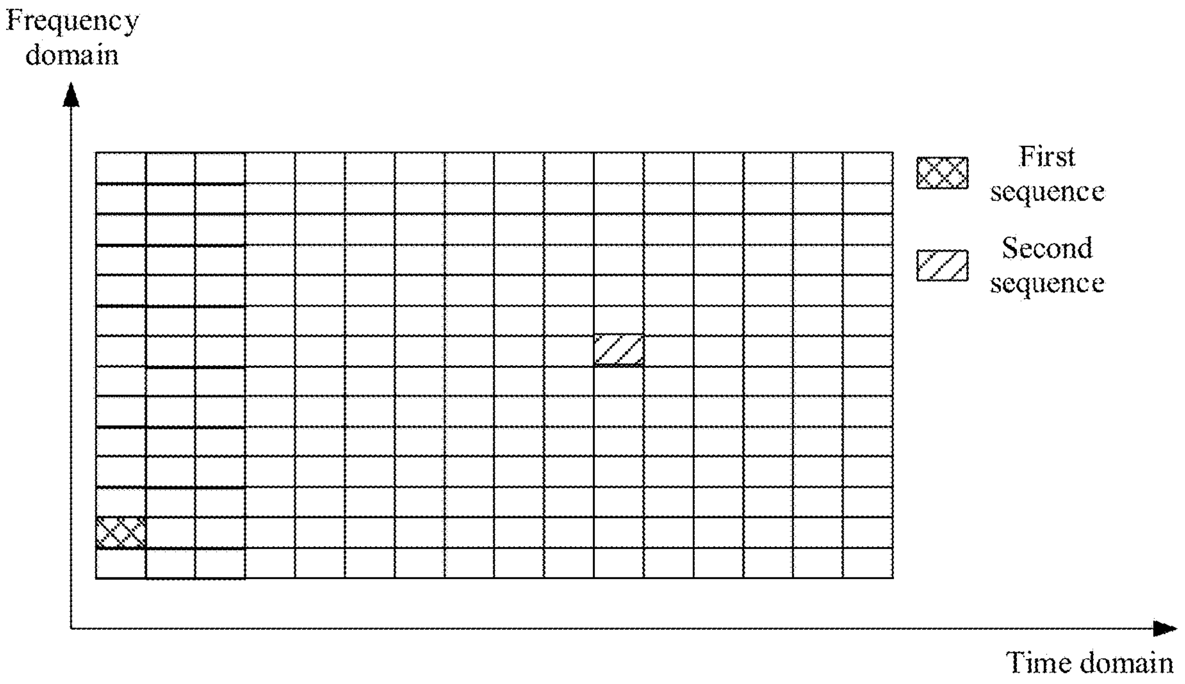
FIG. 11 is a schematic diagram of time-frequency resources for sending both a first sequence and a second sequence according to an embodiment of this application.

Optionally, that the first sequence is associated with the second sequence may be: Both a time domain resource and a frequency domain resource for sending the first sequence by the second electronic device is associated with both a time domain resource and a frequency domain resource for sending the second sequence by the second electronic device, and both a time domain resource and a frequency domain resource for receiving the first sequence by the first electronic device is associated with both a time domain resource and a frequency domain resource for receiving the second sequence by the first electronic device. Optionally, that both a time domain resource and a frequency domain resource for sending the first sequence by the second electronic device is associated with both a time domain resource and a frequency domain resource for sending the second sequence by the second electronic device may be understood as: An interval between the time domain resource for sending the first sequence by the second electronic device and the time domain resource for sending the second sequence by the second electronic device is a preset time domain interval; an interval between the frequency domain resource for sending the first sequence by the second electronic device and the frequency domain resource for sending the second sequence by the second electronic device is a preset frequency domain interval. That both a time domain resource and a frequency domain resource for receiving the first sequence by the first electronic device is associated with both a time domain resource and a frequency domain resource for receiving the second sequence by the first electronic device may be understood as: An interval between the time domain resource for receiving the first sequence by the first electronic device and the time domain resource for receiving the second sequence by the first electronic device is a preset time domain interval; an interval between the frequency domain resource for receiving the first sequence by the first electronic device and the frequency domain resource for receiving the second sequence by the first electronic device is a preset frequency domain interval. In other words, the time domain interval between a first time domain resource for sending the first sequence by the second electronic device and a second time domain resource for sending the second sequence is the preset time domain interval, and the frequency domain interval between a first frequency domain resource for sending the first sequence by the second electronic device and a second frequency domain resource for sending the second sequence is the preset frequency domain interval. As shown in FIG. 11, the frequency domain interval between the first frequency domain resource and the second frequency domain resource is six tones, and the time domain interval between the first time domain resource and the second time domain resource is 10 symbols.

Optionally, the preset time domain interval may be specified or determined through negotiation between the first electronic device and the second electronic device.

Optionally, the preset frequency domain interval may be specified or determined through negotiation between the first electronic device and the second electronic device.

Optionally, for different types of second electronic devices, preset time domain intervals and/or preset frequency domain intervals may be different. Optionally, the second electronic device may send the preset time domain interval and/or the preset frequency domain interval to the first electronic device by using a Bluetooth channel, or the second electronic device may include the preset time domain interval and/or the preset frequency domain interval to a first Bluetooth signal broadcast in S701. Optionally, after the first electronic device receives the first Bluetooth signal broadcast by the second electronic device in S701, the first electronic device determines the preset time domain interval and/or the preset frequency domain interval based on the identifier of the second electronic device in the first Bluetooth signal. Different identifiers indicate different quantities of speakers of an electronic device. The first electronic device may determine a type of the second electronic device based on the identifier of the second electronic device, and determine a quantity of speakers of the second electronic device based on the type of the second electronic device. For example, the first electronic device may determine the preset time domain interval and/or the preset frequency domain interval based on the quantity of speakers of the second electronic device. A larger quantity of speakers of the second electronic device indicates a larger preset time domain interval and/or a larger preset frequency domain interval. A smaller quantity of speakers of the second electronic device indicates a smaller preset time domain interval and/or a smaller preset frequency domain interval. Because quantities of speakers of different types of second electronic devices are different, the preset time domain interval and/or the preset frequency domain interval may be related to the type of the second electronic device.

Optionally, if the interval between the frequency domain resource for sending the first sequence by the second electronic device and the frequency domain resource for sending the second sequence by the second electronic device is the preset frequency domain interval, S703 and S704 may be simultaneously performed. Optionally, the interval between the time domain resource for sending the first sequence by the second electronic device and the time domain resource for sending the second sequence by the second electronic device is the preset time domain interval, and S703 may be performed after S704, or S704 may be performed after S703.

Optionally, the second electronic device sends the third sequence received from the first electronic device in S702 as the second sequence to the first electronic device.

Optionally, the second electronic device may perform cyclic redundancy check (CRC), channel encoding, constellation modulation, and the like on the second sequence, to generate a first ultrasonic data frame, and send the first ultrasonic data frame to the first electronic device.

Optionally, if S703 is performed after S704, the first electronic device stores content received before S703. After the first electronic device receives the first sequence, the first electronic device determines the fourth time domain resource based on the third time domain resource for receiving the first sequence and the preset time domain resource interval, finds the fourth time domain resource in the received content stored by the first electronic device before S703, and determines a sequence received on the fourth time domain resource; and/or the first electronic device determines the second frequency domain resource based on the first frequency domain resource for receiving the first sequence and the preset frequency domain interval, finds the second frequency domain resource in the content stored by the first electronic device before S703, and determines a sequence received on the second frequency domain resource.

Optionally, if S703 is before S704, after the first electronic device first receives the first sequence in S703, the first electronic device determines the fourth time domain resource based on the third time domain resource for receiving the first sequence and the preset time domain interval, receives a sequence on the fourth time domain resource, and does not receive a sequence on another time domain resource, or discards a sequence on another time domain resource after receiving the sequence; and/or the first electronic device determines the second frequency domain resource based on the first frequency domain resource for receiving the first sequence and the preset frequency domain interval, and the first electronic device receives a sequence on the second frequency domain resource, and does not receive a sequence on another frequency domain resource, or discards a sequence on another frequency domain resource after receiving the sequence.

Optionally, an association relationship between the first sequence and the second sequence may be another association relationship. The association relationship between the first sequence and the second sequence is not limited in this embodiment of this application. For example, the second sequence may be negation of the first sequence, or the second sequence may be a shift of the first sequence.

Optionally, an association relationship between the first sequence and the second sequence may be preset, or may be determined through negotiation between the first electronic device and the second electronic device.

S705: The first electronic device determines, based on the first Bluetooth signal in S701 and the first sequence in S703, whether the first electronic device and the second electronic device are in same space. If the first electronic device and the second electronic device are in the same space, subsequent steps of the method 700 are performed. If the first electronic device and the second electronic device are not in the same space, the method 700 ends. The second electronic device sends the first sequence by using an ultrasonic signal.

Optionally, the first electronic device determines, based on a signal strength of the first Bluetooth signal and a signal strength of the ultrasonic signal for sending the first sequence, whether the first electronic device and the second electronic device are in the same space. Due to wall blocking, attenuation of the ultrasonic signal is far greater than attenuation of the Bluetooth signal. Therefore, if the signal strength of the first Bluetooth signal is far better than the signal strength of the ultrasonic signal for sending the first sequence, it indicates that the first electronic device and the second electronic device are not in the same space. Optionally, the first electronic device may determine, based on a difference between a signal strength of the first Bluetooth signal and a signal strength of the ultrasonic signal for sending the first sequence, whether the first electronic device and the second electronic device are in the same space.

For example, the signal strength of the first Bluetooth signal received by the first electronic device is $\rho_B$.

$$\rho_B = \frac{P_B W_B}{d^2}.$$

$P_B$ is a coefficient related to Bluetooth transmit power. The first electronic device can learn of $P_B$. $W_B$ is a Bluetooth attenuation coefficient caused by the wall blocking. d is a distance between the first electronic device to the second electronic device. The signal strength of the ultrasonic signal, received by the first electronic device, including the first sequence is $\rho_U$.

$$\rho_U = \frac{P_U W_U}{d^2}.$$

$P_U$ is a coefficient related to ultrasonic transmit power. The first electronic device can learn of $P_U$. $W_U$ is an ultrasonic attenuation coefficient caused by the wall blocking. When the first electronic device and the second electronic device are in one space, that is, there is no wall blocking between the first electronic device and the second electronic device, $W_B=1$. $W_U=1$. When the first electronic device and the second electronic device are not in one space, that is, there is wall blocking between the first electronic device and the second electronic device, attenuation of the ultrasonic wave is far greater than attenuation of the Bluetooth. Smaller $W_U$ indicates greater attenuation. Therefore, $W_U \ll W_B$. It can be learned that, the first electronic device may determine, by using a ratio $$\frac{\rho_B}{\rho_U}$$

of the signal strength of the received first Bluetooth signal to the signal strength of the received ultrasonic signal including the first sequence, whether the first electronic device and the second electronic device are in the one space.

$$\frac{\rho_B}{\rho_U} = \frac{P_B W_B}{P_U W_U},$$

that is, $$\frac{\rho_B}{\rho_U}$$

is not related to a distance between the first electronic device and the second electronic device, and $P_U$ ad $P_B$ are fixed values. Therefore, $$\frac{\rho_B}{\rho_U}$$

is related to $$\frac{W_B}{W_U}.$$

When there is no wall blocking between the first electronic device and the second electronic device, $W_B=1$. $W_U=1$.

$$\frac{\rho_B}{\rho_U} = \frac{P_B}{P_U}.$$

In other words, if the ratio of the signal strength of the first Bluetooth signal received by the first electronic device to the signal strength of the received ultrasonic signal including the first sequence is equal to $$\frac{P_B}{P_U},$$

it indicates that the first electronic device and the second electronic device are in one space. If $$\frac{\rho_B}{\rho_U} = \frac{P_B W_B}{P_U W_U} >> \frac{P_B}{P_U},$$

it indicates that the first electronic device and the second electronic device are not in one space. Optionally, the first electronic device may set a threshold σ, and the first electronic device may obtain σ through testing. When $$\frac{\rho_B}{\rho_U} > \sigma,$$

it indicates that there is wall blocking between the first electronic device and the second electronic device, and the first electronic device and the second electronic device are not in one space. When $$\frac{\rho_B}{\rho_U} \leq \sigma,$$

it indicates that there is no wall blocking between the first electronic device and the second electronic device, and the first electronic device and the second electronic device are in one space. Optionally, $$\sigma = \frac{P_B}{P_U}.$$

It may be understood that S705 is an optional step, that is, the first electronic device may not determine whether the first electronic device and the second electronic device are in the same space, and the first electronic device and the second electronic device are in the same space by default, or regardless of whether the first electronic device and the second electronic device are in the same space, the method in this embodiment of this application may still be performed. In other words, even if the first electronic device and the second electronic device are not in the same space, the first electronic device may still determine an orientation of the second electronic device. For example, the first electronic device may still allocate a sound channel to the second electronic device based on the determined orientation of the second electronic device.

It may be understood that, if S705 exists, an order of S705 and S704 may be not limited.

It may also be understood that, in S705, for ease of description, the first electronic device determines, by using the signal strength of the first Bluetooth signal in S701 and the signal strength of the ultrasonic signal including the first sequence in S703, whether the first electronic device and the second electronic device are in the same space. The first electronic device may further determine, based on a signal strength of another Bluetooth signal or another ultrasonic measurement signal or both that are sent by the second electronic device, whether the first electronic device and the second electronic device are in the same space. The second electronic device may send the another Bluetooth signal before, after, or simultaneously with sending the first Bluetooth signal. The second electronic device may send the another ultrasonic signal between, after, or simultaneously with sending the ultrasonic signal including the first sequence. For example, after being powered on, the second electronic device may send the another ultrasonic signal and the another Bluetooth signal. There may be a correspondence between the another ultrasonic signal and the another Bluetooth signal. The first electronic device may determine, based on a MAC address included in the another Bluetooth signal, that both a device sending the another ultrasonic signal and a device sending the another Bluetooth signal are the second electronic device. In other words, that the first electronic device determines whether the first electronic device and the second electronic device are in the same space not only based on the received ultrasonic signal including the first sequence and the received first Bluetooth signal, but also based on the another ultrasonic signal and/or the another Bluetooth signal.

Figure 12:
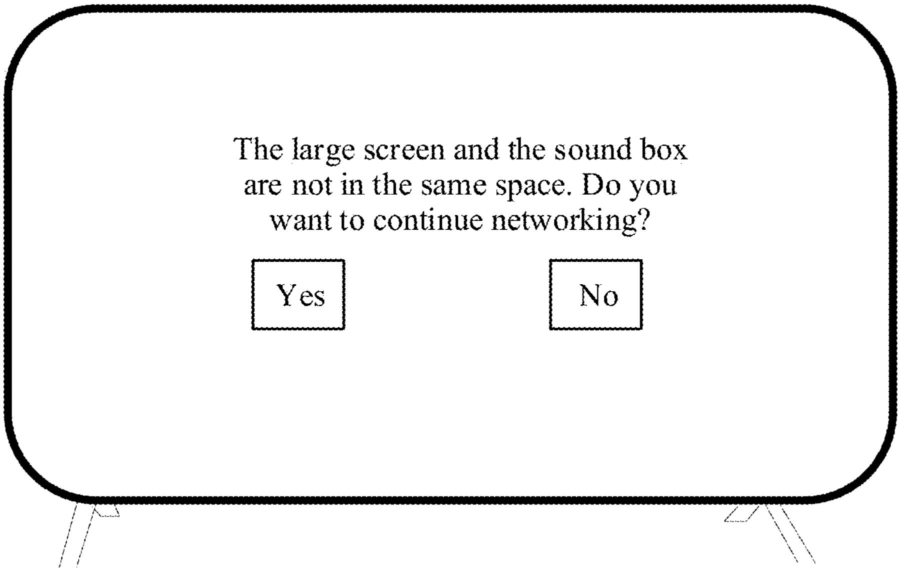
FIG. 12 is a schematic diagram of an interface for prompting a user whether networking is required according to an embodiment of this application.

Optionally, in a scenario in which the first electronic device determines, based on the signal strength of the another Bluetooth signal and the signal strength of the another ultrasonic signal that are sent by the second electronic device, whether the first electronic device and the second electronic device are in the same space, with reference to the manner 1 in S702, the second electronic device sends the another Bluetooth signal and the another ultrasonic signal before the first electronic device receives the first operation instruction. In other words, before the first electronic device receives the first operation instruction, if the first electronic device determines, based on the signal strength of the another Bluetooth signal and the signal strength of the another ultrasonic signal, that the first electronic device and the second electronic device are not in the same space, the first electronic device may output prompt information. The prompt information indicates that the first electronic device and the second electronic device are not in the same space, and whether networking still needs to be performed. After receiving an instruction for confirming to continue networking that is input by the user, the first electronic device continues to perform another step in the method 700. After the first electronic device receives a networking rejection instruction that is input by the user, the method 700 ends. For example, as shown in FIG. 12, the first electronic device is a large screen, the second electronic device is a sound box, and the prompt information output by the first electronic device is "The large screen and the sound box are not in the same space. Do you want to continue networking?" If the user clicks "Yes", another step of the method 700 continues to be performed; or if the user clicks "No", the method 700 ends.

Optionally, the signal strength of the first Bluetooth signal may be a Bluetooth received signal strength indication (RSSI) of the first Bluetooth signal. Optionally, the signal strength of the another Bluetooth signal may be an RSSI of the another Bluetooth signal.

If there are a plurality of second electronic devices, the first electronic device sends different third sequences to different second electronic devices. Therefore, after receiving the first sequence, the first electronic device needs to determine whether the received second sequence is the third sequence sent by the first electronic device to the second electronic device, and therefore S706 is performed.

S706: If the second sequence is the same as the third sequence that is sent by the first electronic device to the second electronic device in S702, the first electronic device determines that the device sending the first sequence is the second electronic device.

Optionally, if the second sequence is the third sequence that is sent by the first electronic device to the second electronic device in S702, the first electronic device determines that a device sending the first sequence and the second sequence is the second electronic device. In this case, the first electronic device may perform S707.

It should be noted that, after the first electronic device performs S702, for the second electronic device, after device receiving the third sequence in S702, the second electronic device sends the third sequence to the first electronic device in S704. For the first electronic device, the first electronic device learns that the first electronic device sends the third sequence to the second electronic device. In S704, before the first electronic device parse the second sequence, the first electronic device cannot learn whether the sequence is the third sequence. Therefore, a sequence from the second electronic device may be defined as the second sequence, and the first electronic device needs to determine whether the second sequence is the same as the third sequence.

Optionally, if the first electronic device determines that the device sending the first sequence is the second electronic device in S706, the first electronic device may also determine that an unencrypted Bluetooth channel established between the second electronic device and the first electronic device after S701 is secure, and the first electronic device and the second electronic device may transmit data by using the secure Bluetooth channel.

S707: The first electronic device determines the orientation of the second electronic device based on the first sequence.

Optionally, the orientation of the second electronic device determined by the first electronic device may be an angle of the second electronic device relative to the first electronic device, or may be the distance between the second electronic device and the first electronic device and an angle of the second electronic device relative to the first electronic device.

Optionally, the first electronic device may include two microphones, and the first electronic device may determine an angle of the second electronic device relative to the first electronic device based on a difference between sampling points of the first sequence received by using the two microphones.

Figure 13:
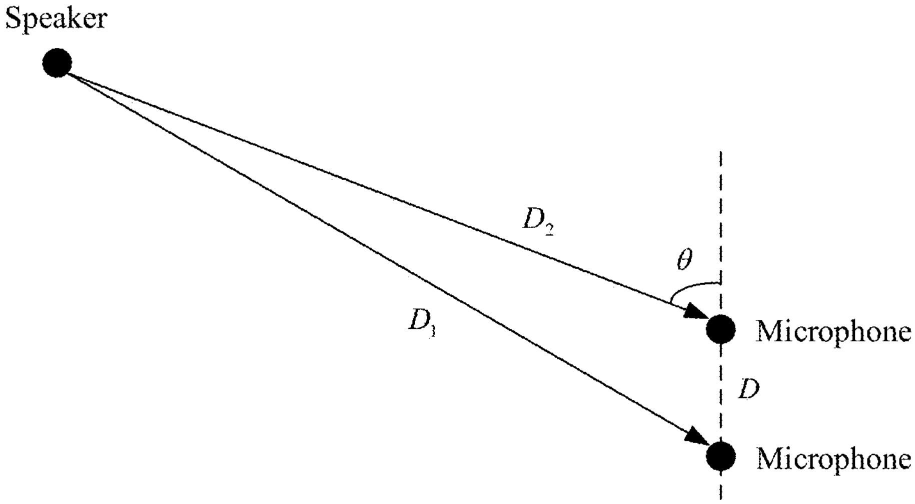
FIG. 13 to FIG. 15 are schematic diagrams of a principle for determining an angle of a second electronic device relative to a first electronic device according to an embodiment of this application.

The following describes a principle in which the first electronic device determines the angle of the second electronic device relative to the first electronic device by using the first sequence sent by the second electronic device. As shown in FIG. 13, the second electronic device may send the first sequence by using a speaker of the second electronic device, the two microphones of the first electronic device may receive the first sequence sent by using the speaker of the second electronic device, and the first electronic device may measure the angle of the second electronic device relative to the first electronic device by using a time difference between receiving the first sequence by using the two microphones. For example, a quantity of sampling points corresponding to the time difference between receiving the first sequence by using the two microphones of the first electronic device is $\tau^*$, and a distance between the two microphones of the first electronic device is D. Assuming that distances between the two speakers of the second electronic device and the two microphones of the first electronic device are respectively $D_1$ and $D_2$, the quantity of sampling points corresponding to the time difference between receiving the first sequence by using the two microphones is $$\tau^* = \frac{D_1 - D_2}{v} f_s,$$

where $f_s$ is a sampling rate of the second electronic device, and $v$ is a sound speed. In other words, the first electronic device can learn of $\tau^*$, $f_s$, and $v$. Therefore, $$D_1 - D_2 = \frac{v \cdot \tau^*}{f_s}.$$

The first electronic device may determine the angle $\theta$ of the second electronic device relative to the first electronic device based on $$D_1 - D_2 = \frac{v \cdot \tau^*}{f_s}$$

Figure 14:
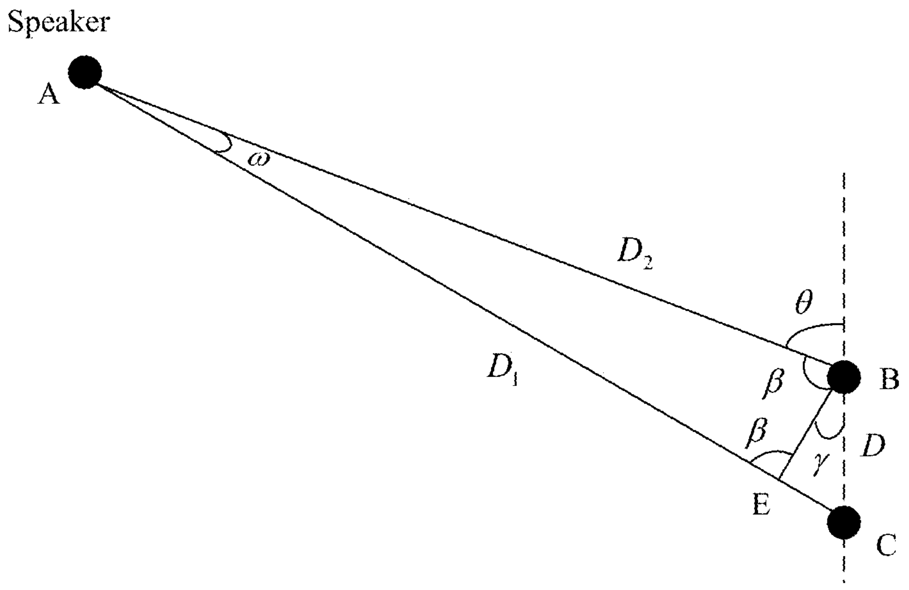

The following describes the principle of determining the angle $\theta$ of the second electronic device relative to the first electronic device based on $$D_1 - D_2 = \frac{v \cdot \tau^*}{f_s}$$

with reference to FIG. 14. As shown in FIG. 14, $D_1 > D_2$, $AC=D_1$, $AB=D_2$, $EC=D_1-D_2$, and $AE=D_2$. In other words, a triangle ABE is an isosceles triangle. Therefore, $\angle AEB=\angle ABE=\beta$. When $D_1$ and $D_2$ are far greater than D, that is, $\omega \approx 0$. Therefore, $\angle AEB=\angle ABE=\beta=90°$. Then, $\theta+\gamma \approx 90°$. It can be learned from a triangle relationship of the triangle that $$\frac{D_1 - D_2}{\sin\gamma} = \frac{D}{\sin(180° - \beta)} \approx D.$$

Therefore, $$\gamma = \arcsin\frac{D_1 - D_2}{D}.$$

-continued $$\theta = 90°-\gamma = 90° - \arcsin\frac{D_1 - D_2}{D} = 90° - \arcsin\frac{v\cdot\tau^*}{f_s\cdot D}.$$

In other words, if the speaker of the second electronic device and the two microphones of the first electronic device are in a same straight line, and the speaker of the second electronic device is above the two microphones of the first electronic device, $D_1-D_2=D$. Therefore, $\theta=0$.

Figure 15:
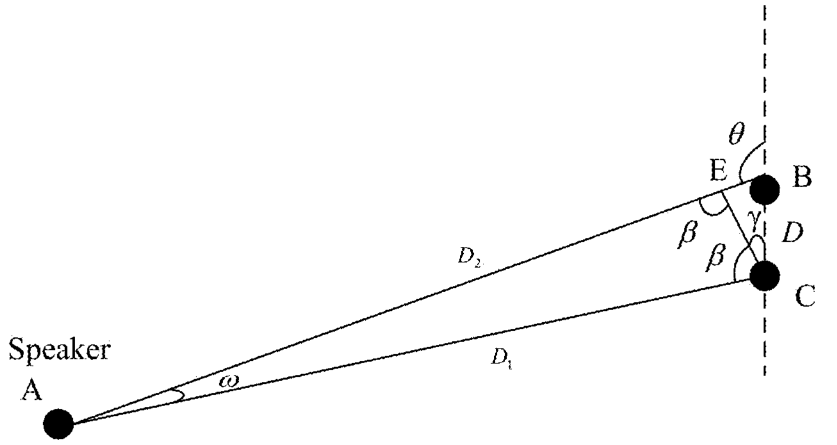

The following describes the principle of determining the angle $\theta$ of the second electronic device relative to the first electronic device based on $$D_1 - D_2 = \frac{v\cdot\tau^*}{f_s}$$

with reference to FIG. 15. As shown in FIG. 15, if $D_1<D_2$, $AC=D_1$, $AB=D_2$, $EB=D_2-D_1$, and $AE=D_1$. In other words, a triangle ACE is an isosceles triangle. Therefore, $\angle AEC=\angle ACE=\beta$. When $D_1$ and $D_2$ are far greater than D, that is, $\omega\approx 0$. Therefore, $\angle AEC=\angle ACE=\beta=90°$. Then, $\theta=90°+\gamma$. It can be learned from a triangle relationship of the triangle that $$\frac{D_2 - D_1}{\sin\gamma} = \frac{D}{\sin(180° - \beta)} \approx D.$$

Therefore, $$\gamma = \arcsin\frac{D_2 - D_1}{D}.$$

$$\theta = 90° + \gamma = 90° + \arcsin\frac{D_2 - D_1}{D} = 90° - \arcsin\frac{D_1 - D_2}{D} = 90° - \arcsin\frac{v\cdot\tau^*}{f_s\cdot D}.$$

In other words, if the speaker of the second electronic device and the two microphones of the first electronic device are in a same straight line, and the speaker of the second electronic device is below the two microphones of the first electronic device, $D_1-D_2=-D$. Therefore, $\theta=180°$.

It should be noted that the angle of the second electronic device relative to the first electronic device may be an angle formed by the speaker of the second electronic device and any one of the two microphones of the first electronic device. As shown in FIG. 13, the angle of the second electronic device relative to the first electronic device may be $\theta$. Optionally, the angle of the second electronic device relative to the first electronic device may alternatively be $\angle ACB$. A calculation manner of $\angle ACB$ is similar to a calculation manner of $\theta$. To avoid repetition, details are not described. Still as shown in FIG. 14, the angle of the second electronic device relative to the first electronic device may be $\theta$. Optionally, the angle of the second electronic device relative to the first electronic device may alternatively be $\angle ACB$. A calculation manner of $\angle ACB$ is similar to a calculation manner of $\theta$. To avoid repetition, details are not described.

It should be noted that the angle of the second electronic device relative to the first electronic device may be understood as an angle of the speaker of the second electronic device relative to a straight line in which two microphones of the first electronic device are located, namely, $\theta$ shown in FIG. 13 to FIG. 15.

The following describes three cases in which the first electronic device determines the distance between the second electronic device and the first electronic device by using the first sequence sent by the second electronic device.

Case 1: The first electronic device determines the distance between the second electronic device and the first electronic device based on a signal strength of the received first sequence. For example, the first electronic device determines the distance between the second electronic device and the first electronic device based on an average signal strength of the received first sequence. It is assumed that the distance between the second electronic device and the first electronic device is d, and the average signal strength of the first sequence is $\rho_U$.

$$\rho_U = \frac{\alpha}{d^2}.$$

Then, $$d = \sqrt{\alpha/\rho_U}\,.\ \alpha$$

is a constant coefficient. For example, $\alpha$ is related to ultrasonic transmit power, or $\alpha$ is related to both ultrasonic transmit power and blocking between the first electronic device and the second electronic device. For example, in a scenario in which the first electronic device determines whether the first electronic device and the second electronic device are in the same space in S705, $\alpha=P_U W_U$.

Case 2: The second electronic device sends a second Bluetooth signal simultaneously with sending the first sequence. After the first device receives the first sequence and the second Bluetooth signal, where a Bluetooth MAC address included in the second Bluetooth signal is a Bluetooth MAC address of the second electronic device, the first electronic device may determine, based on the Bluetooth MAC address of the second electronic device included in the second Bluetooth signal, that an electronic device sending the second Bluetooth signal is the second electronic device sending the first Bluetooth signal. The first electronic device determines the distance between the first electronic device and the second electronic device based on a difference between a moment of receiving the first sequence and a moment of receiving the second Bluetooth signal. It is assumed that the distance between the second electronic device and the first electronic device is d, the second electronic device sends the second Bluetooth signal and the first sequence at a moment T0, the first electronic device receives the second Bluetooth signal at a moment T1, and receives the first sequence at a moment T2, that is, for the first electronic device, T1 and T2 are known values, and T0 is an unknown value. In other words, a transmission period of the second Bluetooth signal is $T1-T0=d/c$, where c is a light speed, and $c=3\times10\hat{}8$ m/s. A transmission period of the first sequence is $T2-T0=d/v$, where v is a sound speed, and the sound speed v is usually around 340 m/s. Therefore, a transmission period difference between the first sequence and the second Bluetooth signal is $(T2-T0)-(T1-T0)=T2-T1=d/v-d/c$. Therefore, $d=(T2-T1)\ cv/(c-v)$. Alternatively, because c is relatively large, d/c is close to 0. Therefore, $T2-T1\approx d/v$, $d\approx(T2-T1)v$.

Case 3: If the first electronic device sends the third sequence by using the Bluetooth channel in S702, the first electronic device determines the distance between the first electronic device and the second electronic device by using the transmission period of the first sequence and a transmission period of the third sequence. Alternatively, the first electronic device determines the distance between the first electronic device and the second electronic device based on a difference between a moment of receiving the first sequence and a moment of sending the third sequence. It is assumed that the distance between the second electronic device and the first electronic device is d, the first electronic device sends the third sequence at a moment T3, the second electronic device receives the third sequence at a moment T4, the second electronic device sends the first sequence after a preset time interval T, and the first electronic device receives the first sequence at a moment T5. The transmission period of the third sequence is $T4-T3=d/c$, where c is a light speed, and $c=3\times10^8$ m/s. The transmission period of the first sequence is $T5-(T4+T)=d/v$, where v is a sound speed, and the sound speed v is usually around 340 m/s. In other words, the preset time interval T is known. For the first electronic device, T3, T, and T5 are known, and T4 is unknown. A sum of the transmission period of the first sequence and the transmission period of the third sequence is $(T5-(T4+T))+(T4-T3)=d/v+d/c$. Therefore, $d=vc(T5-T-T3)/(c+v)$. Alternatively, because c is relatively large, d/c is close to 0. Therefore, T4-T3 is close to 0, that is, T4 is close to T3. Therefore, $d/v=T5-(T4+T)\approx T5-(T3+T)$. Therefore, $d\approx(T5-(T3+T))v=(T5-T3-T)v$. T5−T3 is a difference between a moment at which the first electronic device receives the first sequence and a moment at which the first electronic device sends the third sequence.

Optionally, the second electronic device may be an audio device, and the second electronic device may play an audio signal from the first electronic device. Therefore, the first electronic device may allocate a sound channel to the second electronic device based on the orientation of the second electronic device. The method 700 may further include the following steps.

S708: The first electronic device allocates a sound channel to the second electronic device based on the orientation of the second electronic device.

Optionally, if the orientation of the second electronic device determined by the first electronic device may be the angle of the second electronic device relative to the first electronic device, the first electronic device allocates the sound channel to the first electronic device based on the angle of the second electronic device relative to the first electronic device.

Optionally, if the orientation of the second electronic device determined by the first electronic device may be both the distance between the second electronic device and the first electronic device and the angle of the second electronic device relative to the first electronic device, the first electronic device allocates the sound channel to the first electronic device based on the distance between the second electronic device and the first electronic device and the angle of the second electronic device relative to the first electronic device.

Optionally, if there are the plurality of second electronic devices, the first electronic device may allocate a sound channel to each second electronic device based on an angle of each second electronic device relative to the first electronic device. For example, if the first electronic device is a large screen, and two second electronic devices are two sound boxes, the large screen may allocate sound channels to the two sound boxes based on angles of the two sound boxes relative to the large screen. For example, if the large screen determines that the first sound box is 30 degrees to the left of the large screen, the large screen allocates a left sound channel to a first sound box; if the large screen determines that the second sound box is 45 degrees to the right of the large screen, the large screen allocates a right sound channel to a second sound box.

Optionally, if an orientation of each second electronic device may be the angle of each second electronic device relative to the first electronic device, the first electronic device may determine, based on the angle of each second electronic device relative to the first electronic device, a difference relationship between an angle of one second electronic device relative to the first electronic device and an angle of another second electronic device relative to the first electronic device. For example, the first electronic device is a large screen, the plurality of second electronic devices are four sound boxes, and the large screen may allocate sound channels to the four sound boxes based on angles of the four sound boxes relative to the large screen. Specifically, the large screen determines, based on the angles of the four sound boxes relative to the large screen, whether the four sound boxes are in the left or in the right of the large screen. Then, the large screen sets a sound box with a larger angle in the left as a left sound channel, sets a sound box with a smaller angle in the left as left surround, sets a sound box with a larger angle in the right as a right sound channel, and sets a sound box with a smaller angle in the right as right surround. For example, the large screen determines that both a sound box 1 and a sound box 2 are in the left of the large screen, where an angle of the sound box 1 relative to the large screen is greater than an angle of the sound box 2 relative to the large screen. Therefore, the large screen may allocate the left sound channel to the sound box 1 and allocate the left surround to the sound box 2.

Optionally, if the orientation of each second electronic device may be the angle of each second electronic device relative to the first electronic device, and a distance between each second electronic device and the first electronic device, the first electronic device may determine the orientation of each second electronic device relative to the first electronic device based on the angle of each second electronic device relative to the first electronic device and the distance between each second electronic device and the first electronic device. For example, the first electronic device may determine whether the second electronic device is in the left or in the right of the first electronic device, and a relative distance relationship between any two second electronic devices and the first electronic device. For example, the first electronic device is a large screen, and four second electronic devices are four sound boxes, and the large screen may allocate sound channels to the four sound boxes based on distances from the four sound boxes to the large screen and angles of the four sound boxes relative to the large screen. Specifically, the large screen determines, based on the angles of the four sound boxes relative to the large screen, whether the four sound boxes are in the left or in the right of the large screen. Then, the large screen sets a closer sound box in the left as a left sound channel, sets a farther sound box in the left as left surround, sets a closer sound box in the right as a right sound channel, and sets a farther sound box in the right as right surround. S709: The first electronic device sends an audio signal to the second electronic device based on the sound channel allocated to the second electronic device.

Specifically, the first electronic device may send different audio signals to devices of different sound channels, to form stereo surround sound effect. Therefore, the first electronic device sends the audio signal to the second electronic device based on the sound channel allocated to the second electronic device.

Optionally, the first electronic device determines, in S706, that the device sending the first sequence is the second electronic device, and then the first electronic device may also determine that the unencrypted Bluetooth channel established between the first electronic device and the second electronic device after S701 is secure. Therefore, in S709, the first electronic device may send the audio signal to the second electronic device by using the secure Bluetooth channel, and the second electronic device may play the audio signal from the first electronic device.

Therefore, in the foregoing method embodiment, the first electronic device may send the third sequence to the second electronic device. After receiving the third sequence, the second electronic device sends the first sequence and the second sequence to the first electronic device. Because there is the association relationship between the first sequence and the second sequence, the first electronic device may obtain the second sequence after receiving the known first sequence. The first electronic device determines, based on the second sequence, whether the device sending the first sequence is the first electronic device. If the second sequence is the third sequence sent by the first electronic device to the second electronic device, the first electronic device determines that the device sending the first sequence and the second sequence is the second electronic device. Therefore, the first electronic device may determine the orientation of the second electronic device by using the first sequence, to avoid a case in which the first electronic device cannot determine the orientation of the second electronic device, and prevent a user from manually participating in configuring the orientation of the second electronic device, thereby improving user experience. In a stereoscopic surround sound scenario, the first electronic device may allocate the sound channel to the second electronic device, the first electronic device may send the audio signal to the second electronic device based on the sound channel allocated by the second electronic device, and the second electronic device may play the audio signal from the first electronic device. In this case, the user does not need to manually allocate the sound channel to the second electronic device, thereby improving user experience. Especially if there are a large quantity of second electronic devices, the user does not need to perform a plurality of configuration operations, thereby improving user experience.

Figure 16:
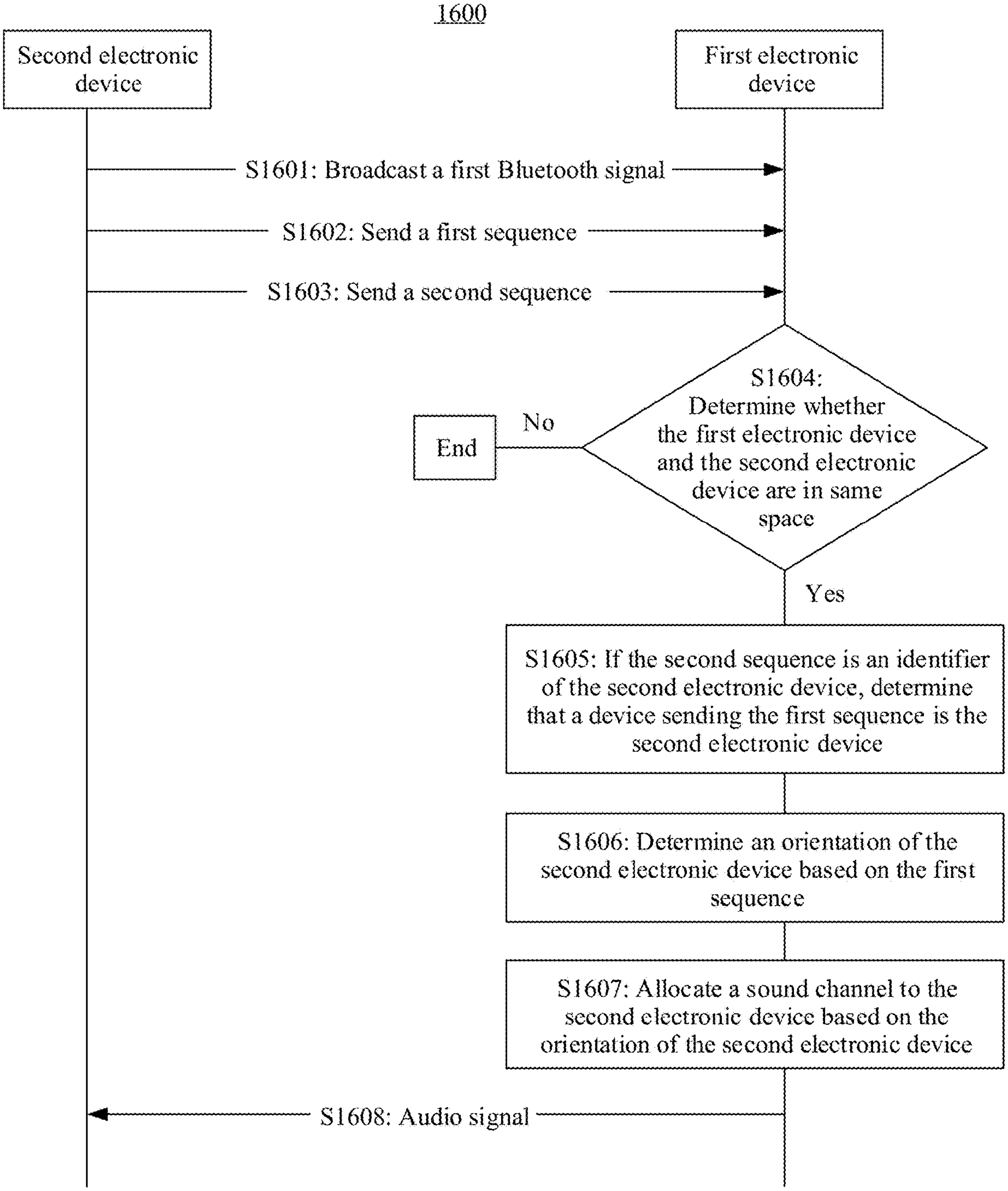
FIG. 16 is a schematic diagram of another method for determining an orientation according to an embodiment of this application.

In some embodiments, the first electronic device may not send the third sequence to the second electronic device, and the second sequence sent by the first electronic device may be the identifier of the second electronic device. The following describes a method 1600 with reference to FIG. 16. The method 1600 includes the following steps.

S1601: A second electronic device broadcasts a first Bluetooth signal, and a first electronic device receives the first Bluetooth signal broadcast by the second electronic device. The first Bluetooth signal includes an identifier of the second electronic device.

Optionally, after being powered on, the second electronic device may broadcast the first Bluetooth signal. After the first electronic device receives the first Bluetooth signal broadcast by the second electronic device, it indicates that the first electronic device finds the second electronic device.

Optionally, the identifier of the second electronic device may be a Bluetooth MAC address of the second electronic device, and the Bluetooth MAC address of the second electronic device is used to uniquely identify the second electronic device.

Optionally, after receiving the first Bluetooth signal, the first electronic device may establish a Bluetooth channel with the second electronic device. The Bluetooth channel existing between the first electronic device and the second electronic device is not confirmed by the user. Therefore, the Bluetooth channel existing between the first electronic device and the second electronic device may be understood as an insecure Bluetooth channel.

Optionally, after receiving the first Bluetooth signal, the first electronic device may establish a Bluetooth channel with the second electronic device. The Bluetooth channel established between the first electronic device and the second electronic device may be confirmed by authorization of the user. Therefore, the Bluetooth channel existing between the first electronic device and the second electronic device may be understood as a secure Bluetooth channel.

Optionally, the first Bluetooth signal in S1601 may be replaced with another signal, for example, may be replaced with a Wi-Fi signal. The Wi-Fi signal may include a Wi-Fi MAC address of the second electronic device.

S1602: The second electronic device sends the first sequence, and the first electronic device receives the first sequence.

Optionally, after being powered on, the second electronic device may perform S1602 to send the first sequence.

Optionally, after broadcasting the first Bluetooth signal, the second electronic device may send the first sequence, that is, S1601 may trigger S1602.

Optionally, the second electronic device and the first electronic device may learn of the first sequence in advance. For example, it may be specified that the first sequence is an FMCW sequence, or a Zadoff-Chu sequence.

Optionally, the second electronic device may notify the first electronic device of the first sequence in advance by using a Bluetooth channel. For example, after S1601, the first electronic device may establish a Bluetooth channel with the second electronic device. The second electronic device may notify the first electronic device of the first sequence by using the Bluetooth channel established after S1601. In other words, the second electronic device notifies the first electronic device that the second electronic device sends the first sequence.

Optionally, the first electronic device may notify the second electronic device of the first sequence in advance by using a Bluetooth channel. For example, after S1601, the first electronic device may establish a Bluetooth channel with the second electronic device. The first electronic device may notify the second electronic device of the first sequence by using the Bluetooth channel established after S1601. In other words, the first electronic device notifies the second electronic device to send the first sequence.

In other words, the first electronic device may perform a correlation operation based on the first sequence, to determine the first sequence from at least one sequence. For example, the second electronic device sends the first sequence, and another electronic device also sends one sequence. The first electronic device receives two sequences. Because the first electronic device knows that the second electronic device sends the first sequence, the first electronic device performs the correlation operation on the received two sequences by using the first sequence, and the first electronic device determines that a sequence with a highest correlation is the first sequence sent by the second electronic device.

S1603: The second electronic device sends a second sequence, and the first electronic device receives the second sequence, where the first sequence is associated with the second sequence, and the second sequence is the identifier of the second electronic device.

Optionally, if the identifier of the second electronic device is a Bluetooth MAC address of the second electronic device, the first sequence is the Bluetooth MAC address of the second electronic device.

Optionally, if the identifier of the second electronic device is a Wi-Fi MAC address of the second electronic device, the first sequence is the Wi-Fi MAC address of the second electronic device.

For an association relationship between the first sequence and the second sequence, refer to the description of S704 in the method 700. To avoid repetition, details are not described again.

S1604 is the same as S705.

S1605: If the second sequence in S1603 is the same as the identifier of the second electronic device, the first electronic device determines that a device sending the first sequence is the second electronic device.

Optionally, before S1605, the first electronic device may obtain a third sequence that identifies the second electronic device.

Optionally, if the second sequence is the identifier of the second electronic device included in the first Bluetooth signal in S1601, the first electronic device determines that a device sending the first sequence and the second sequence is the second electronic device. In this case, the first electronic device may perform S1606.

Optionally, if the first electronic device determines that the device sending the first sequence is the second electronic device in S1605, the first electronic device may also determine that an unencrypted Bluetooth channel established between the second electronic device and the first electronic device after S1601 is secure, and the first electronic device and the second electronic device may transmit data by using the secure Bluetooth channel.

S1606 to S1608 are respectively the same as S707 to S709.

Therefore, in the foregoing method embodiment, the second electronic device may send the first sequence and the second sequence to the first electronic device. Because there is the association relationship between the first sequence and the second sequence, the first electronic device may obtain the second sequence after receiving the known first sequence. The first electronic device determines, based on the second sequence, whether the device sending the first sequence is the first electronic device. If the second sequence is the identifier sent by the second electronic device, the first electronic device determines that the device sending the first sequence and the second sequence is the second electronic device. Therefore, the first electronic device may determine an orientation of the second electronic device by using the first sequence, to avoid a case in which the first electronic device cannot determine the orientation of the second electronic device, and prevent a user from manually participating in configuring the orientation of the second electronic device, thereby improving user experience. In a stereoscopic surround sound scenario, the first electronic device may allocate the sound channel to the second electronic device, the first electronic device may send the audio signal to the second electronic device based on the sound channel allocated by the second electronic device, and the second electronic device may play the audio signal from the first electronic device. In this case, the user does not need to manually allocate the sound channel to the second electronic device, thereby improving user experience. Especially if there are a large quantity of second electronic devices, the user does not need to perform a plurality of configuration operations, thereby improving user experience.

Figure 17:
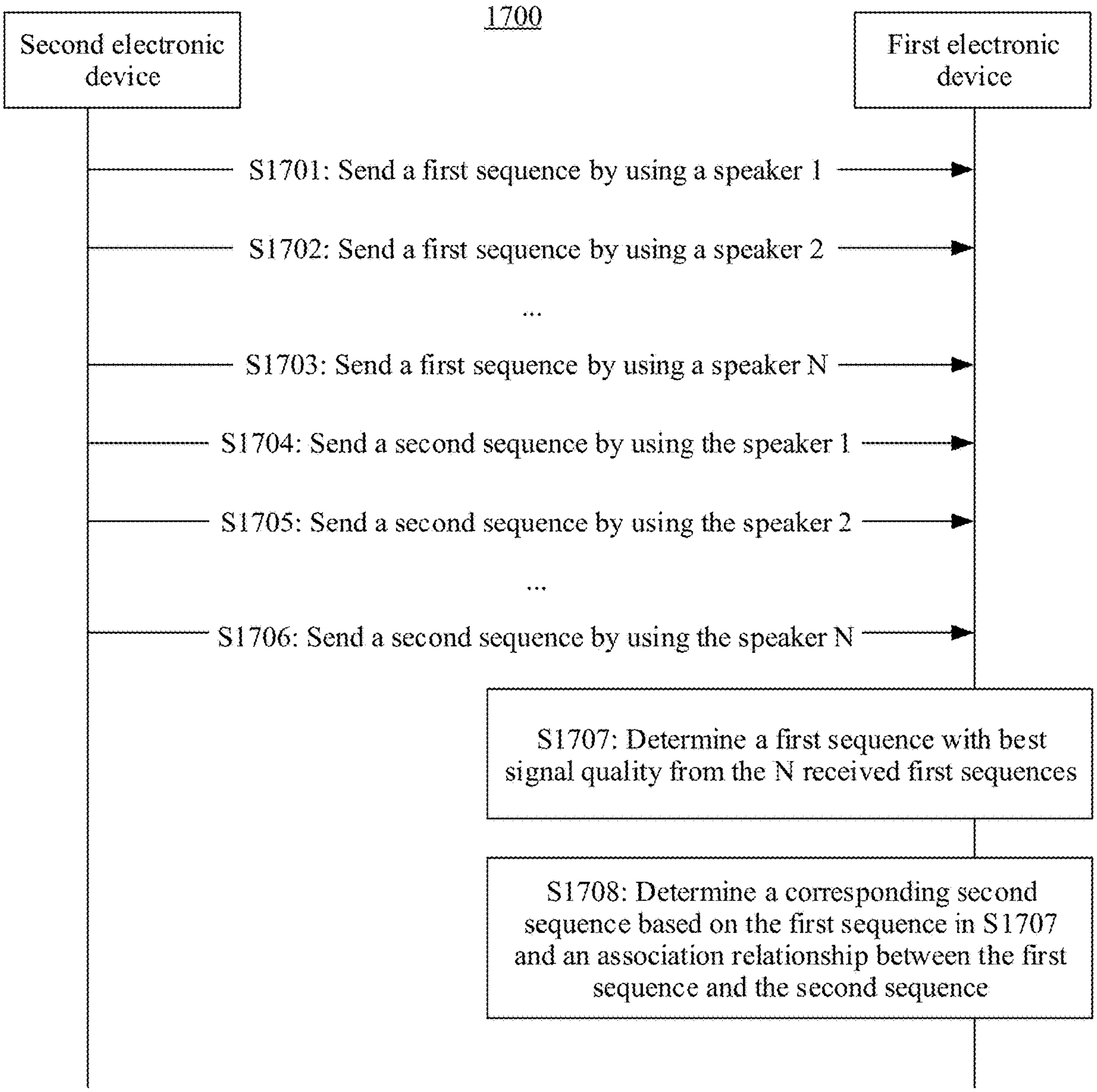
FIG. 17 is a schematic diagram of a method in which a second electronic device sends a first sequence and a second sequence by using a plurality of speakers according to an embodiment of this application.

In some embodiments, the second electronic device may include a plurality of speakers. The second electronic device may respectively send a plurality of first sequences by using the plurality of speakers, or the second electronic device may respectively send a plurality of second sequences by using the plurality of speakers. A first sequence and a second sequence that are sent by using a same speaker are associated. The first electronic device may determine a first sequence with best signal quality from the plurality of received first sequences, and determine an associated second sequence based on the received first sequence. The first sequence and the second sequence are consistent with those in the method 700 or the method 1600. Main descriptions in the following are that the second electronic device sends a plurality of first sequences by using the plurality of speakers, and sends a plurality of second sequences by using the plurality of speakers. As shown in FIG. 17, it is assumed that the second electronic device has N speakers, where N is an integer greater than 1. A method 1700 includes the following steps.

S1701: A second electronic device sends a first sequence by using a speaker 1, and a first electronic device receives the first sequence.

It may be understood that for a step before S1701, refer to S701 and S702, or refer to S1601.

Optionally, S1701 includes: The second electronic device sends the first sequence at a resource position 1 by using the speaker 1, and the first electronic device receives the first sequence at the resource position 1.

S1702: The second electronic device sends the first sequence at a resource position 2 by using a speaker 2, and the first electronic device receives the first sequence at the resource position 2.

Optionally, S1702 includes: The second electronic device sends the first sequence at a resource position 2 by using a speaker 2, and the first electronic device receives the first sequence at the resource position 2.

S1703: The second electronic device sends the first sequence at a resource position N by using a speaker N, and the first electronic device receives the first sequence at the resource position N.

Optionally, S1703 includes: The second electronic device sends the first sequence at a resource position N by using a speaker N, and the first electronic device receives the first sequence at the resource position N.

S1704: The second electronic device sends a second sequence by using the speaker 1, and the first electronic device receives the second sequence.

Optionally, S1704 includes: The second electronic device sends the second sequence at a resource position N+1 by using the speaker 1, and the first electronic device receives the second sequence at the resource position N+1.

Optionally, the first sequence sent in S1701 is associated with the second sequence sent in S1704.

Optionally, that the first sequence sent in S1701 is associated with the second sequence sent in S1704 may be: An interval between the resource position 1 and the resource position N+1 is a preset interval 1. For example, if the resource position 1 and the resource position N+1 are time domain resources, the interval between the resource position 1 and the resource position N+1 is a preset time domain interval, that is, in this case, the preset interval 1 is the preset time domain interval. For another example, if the resource position 1 and the resource position N+1 are frequency domain resources, the interval between the resource position 1 and the resource position N+1 is a preset frequency domain interval, that is, in this case, the preset interval 1 is the preset frequency domain interval. For another example, if the resource position 1 is a time-frequency domain resource and the resource position N+1 is a time-frequency domain resource, a time domain resource interval between the resource position 1 and the resource position N+1 is a preset time domain interval, and a frequency domain resource interval is a preset frequency domain interval. In other words, in this case, the preset interval 1 is the preset time domain interval and the preset frequency domain interval.

Optionally, if the method 1700 may be combined with the method 700, the second sequence in S1704 is the third sequence in S702.

Optionally, if the method 1700 may be combined with the method 1600, the second sequence in S1704 is an identifier of the second electronic device.

In other words, the second electronic device separately sends one first sequence and one second sequence by using the speaker 1, and an interval between resource positions for sending the first sequence and the second sequence is the preset interval 1.

S1705: The second electronic device sends a second sequence by using the speaker 2, and the first electronic device receives the second sequence.

Optionally, S1705 includes: The second electronic device sends the second sequence at a resource position N+2 by using the speaker 2, and the first electronic device receives the second sequence at the resource position N+2.

Optionally, the first sequence sent in S1702 is associated with the second sequence sent in S1705.

Optionally, that the first sequence sent in S1702 is associated with the second sequence sent in S1704 may be: An interval between the resource position 2 and the resource position N+2 is a preset interval 2. For example, if the resource position 2 and the resource position N+2 are time domain resources, the interval between the resource position 2 and the resource position N+2 is a preset time domain interval, that is, in this case, the preset interval 2 is the preset time domain interval. For another example, if the resource position 2 and the resource position N+2 are frequency domain resources, the interval between the resource position 2 and the resource position N+2 is a preset frequency domain interval, that is, in this case, the preset interval 2 is the preset frequency domain interval. For another example, if the resource position 2 is a time-frequency domain resource and the resource position N+2 is a time-frequency domain resource, a time domain resource interval between the resource position 2 and the resource position N+2 is a preset time domain interval, and a frequency domain resource interval is a preset frequency domain interval. In other words, in this case, the preset interval 2 is the preset time domain interval and the preset frequency domain interval.

Optionally, the preset interval 1 is equal to the preset interval 2.

Optionally, if the method 1700 may be combined with the method 700, each of the second sequence in S1705 and the second sequence in S1704 is the third sequence in S702.

Optionally, if the method 1700 may be combined with the method 1600, each of the second sequence in S1705 and the second sequence in S1704 is the identifier of the second electronic device.

In other words, the second electronic device separately sends one first sequence and one second sequence by using the speaker 2, and an interval between resource positions for sending the first sequence and the second sequence is the preset interval 2.

S1706: The second electronic device sends a second sequence by using the speaker N, and the first electronic device receives the second sequence.

Optionally, S1706 includes: The second electronic device sends an ultrasonic data frame N at a resource position 2N by using the speaker N, and the first electronic device receives the ultrasonic data frame N at the resource position 2N.

Optionally, the first sequence sent in S1703 is associated with the second sequence sent in S1706.

Optionally, that the first sequence sent in S1703 is associated with the second sequence sent in S1706 may be: An interval between the resource position N and the resource position 2N is a preset interval N. For example, if the resource position N and the resource position 2N are time domain resources, the interval between the resource position N and the resource position 2N is a preset time domain interval, that is, in this case, the preset interval N is the preset time domain interval. For another example, if the resource position N and the resource position 2N are frequency domain resources, the interval between the resource position N and the resource position 2N is a preset frequency domain interval, that is, in this case, the preset interval N is the preset frequency domain interval. For another example, if the resource position Nis a time-frequency domain resource and the resource position 2N is a time-frequency domain resource, a time domain resource interval between the resource position N and the resource position 2N is a preset time domain interval, and a frequency domain resource interval is a preset frequency domain interval. In other words, in this case, the preset interval N is the preset time domain interval and the preset frequency domain interval.

Optionally, the preset interval 1, the preset interval 2, . . . , and the preset interval N are equal.

Optionally, if the method 1700 may be combined with the method 700, each of the second sequence in S1706, the second sequence in S1705, and the second sequence in S1704 is the third sequence in S702.

Optionally, if the method 1700 may be combined with the method 1600, each of the second sequence in S1706, the second sequence in S1705, and the second sequence in S1704 is the identifier of the second electronic device.

In other words, the second electronic device separately sends one first sequence and one second sequence by using the speaker N, and an interval between resource positions for sending the first sequence and the second sequence is the preset interval N.

S1707: The first electronic device determines a first sequence with best signal quality from the N received first sequences in S1701 to S1703.

Optionally, in S1701 to S1703, the second electronic device respectively sends ultrasonic signals by using the N speakers, where the ultrasonic signal includes the first sequence. In this way, the first electronic device may determine an ultrasonic signal with best signal quality based on signal quality of the N ultrasonic signals in S1707, and determine the received ultrasonic signal with best signal quality as the first sequence in S1707.

For example, in the scenario of the method 1700, for example, the first sequence received in S1702 is a first sequence with best signal quality.

S1708: The first electronic device determines a corresponding second sequence based on the first sequence in S1707 and an association relationship between the first sequence and the second sequence.

Optionally, if a resource position for sending the first sequence is associated with a resource position for sending the second sequence, the first electronic device determines a second resource position based on a first resource position for receiving the first sequence and the preset interval, and determines the second sequence received at the second resource position. For example, in S1707, it is determined that the first sequence received in S1702 is a first sequence with best signal quality. Because the first sequence in S1702 corresponds to the second sequence in S1705, the second sequence in S1705 is the second sequence determined in S1708.

Optionally, the second electronic device includes the N speakers. The first electronic device and the second electronic device may obtain N association relationships. One association relationship corresponds to one speaker. The first electronic device and the second electronic device may learn of the N association relationships in advance. For example, the first electronic device learns of the identifier of the second electronic device, determines a type of the second electronic device based on the identifier of the second electronic device, determines a quantity of speakers of the second electronic device based on the type of the second electronic device, and determines an association relationship based on the quantity of speakers of the second electronic device.

Optionally, the preset interval 1, the preset interval 2, . . . , and the preset interval N may be preset, and the first electronic device and the second electronic device can learn of the preset interval 1, the preset interval 2, . . . , and the preset interval N.

Optionally, the resource position 1, the resource position 2, . . . , and the resource position N may be associated or not associated.

Optionally, the resource position N+1, the resource position N+2, . . . , and the resource position 2N may be associated or may not be associated.

Optionally, the second electronic device may include M speakers, where M is greater than N. In other words, if the second electronic device includes a plurality of speakers, the second electronic device may send each ultrasonic data frame of each of the N first sequences and the N second sequences by using some of the plurality of speakers.

Figure 18:
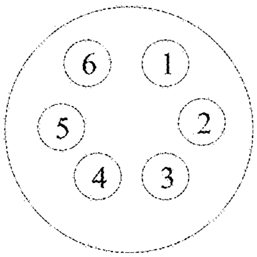
FIG. 18 is a schematic diagram of a speaker according to an embodiment of this application.

Optionally, the N speakers in the method 1700 may be N speaker groups, that is, the second electronic device may simultaneously send the first sequence by using at least one speaker included in one speaker group. In this way, the first electronic device receives the first sequence obtained through signal superposition, and a gain may be increased. Alternatively, the second electronic device may simultaneously send the second sequence by using at least one speaker included in one speaker group. In this way, the first electronic device receives the superposed second sequence, and a gain may be increased. For example, as shown in FIG. 18, the second electronic device includes six speakers, a speaker 1 and a speaker 2 form one group, a speaker 3 and a speaker 4 form one group, and a speaker 5 and a speaker 6 form one group. In this case, N in the method 1700 is 3.

Optionally, if the method 1700 may be combined with the method 700, for steps after the first electronic device determines the first sequence in S1707 and the second sequence in S1708, refer to S705 to S709. To avoid repetition, details are not described.

Optionally, if the method 1700 may be combined with the method 1600, for steps after the first electronic device determines the first sequence in S1707 and the second sequence in S1708, refer to S1604 to S1608. To avoid repetition, details are not described.

Figure 19:
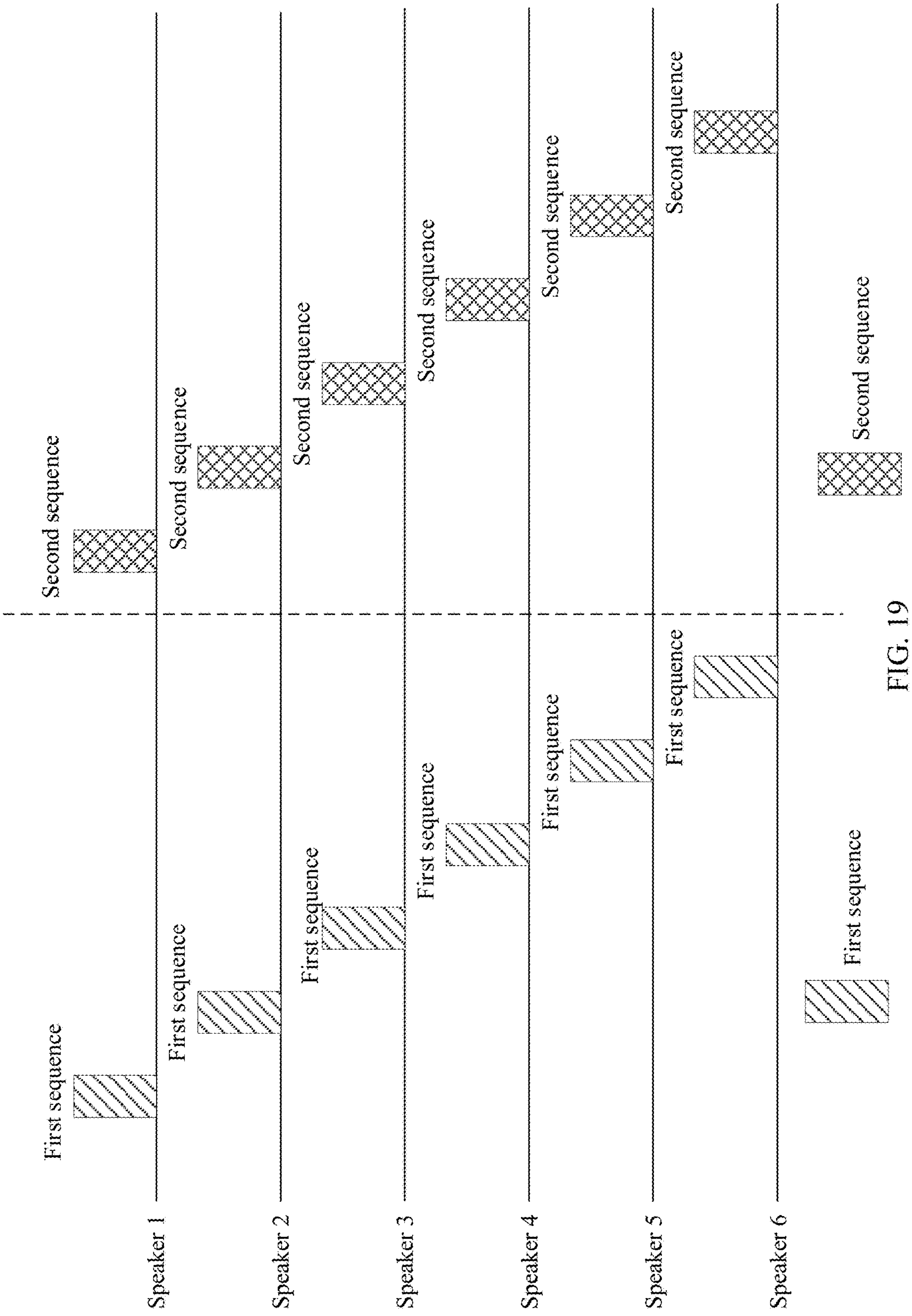
FIG. 19 is a schematic diagram in which a second electronic device sends a first sequence and a second sequence by using a plurality of speakers according to an embodiment of this application.

Optionally, S1701, S1702, and S1703 are performed before S1704, S1705, and S1706, that is, the second electronic device may respectively send N second sequences after sending N first sequences by using the N speakers. In this case, after the first electronic device receives the N first sequences, if the first electronic device determines a first sequence with best signal quality before the second sequence in S1704, the first electronic device receives a second sequence corresponding to the received first sequence, and does not need to receive the remaining second sequences. As shown in FIG. 18, it is assumed that the second electronic device has six speakers, and numbers of the six speakers are respectively a speaker 1, a speaker 2, a speaker 3, a speaker 4, a speaker 5, and a speaker 6. As shown in FIG. 19, the second electronic device first sends six first sequences, and then sends six second sequences. The second electronic device sends one first sequence and one second sequence by using the speaker 1, sends one first sequence and one second sequence by using the speaker 2, sends one first sequence and one second sequence by using the speaker 3, sends one first sequence and one second sequence by using the speaker 4, sends one first sequence and one second sequence by using the speaker 5, and sends one first sequence and one second sequence by using the speaker 6. In this case, after receiving the six first sequences, the first electronic device determines a first sequence with best signal quality from the six received first sequences, and a time domain interval between the first sequence and the second sequence sent by using one speaker is the preset time domain interval. Then, the first electronic device determines another time domain position based on a time domain position of the received first sequence with best signal quality and the preset time domain interval. The first electronic device directly receives a second sequence on the another time domain position. For example, before S1704, the first electronic device determines that the first sequence in S1702 is the received first sequence with best signal quality. The first electronic device determines the resource position N+2 based on the resource position 2 of the first sequence in S1702 and the preset time domain interval. The first electronic device receives only a second sequence at the resource position N+2. In other words, the first electronic device may receive only the second sequence in S1705, and does not receive a second sequence in another step, or discards a second sequence in another step. This helps reduce signaling overheads.

Certainly, S1704, S1705, and S1706 may be performed before S1701, S1702, and S1703, that is, the second electronic device may respectively send N first sequences after sending N second sequences by using the N speakers.

Figure 20:
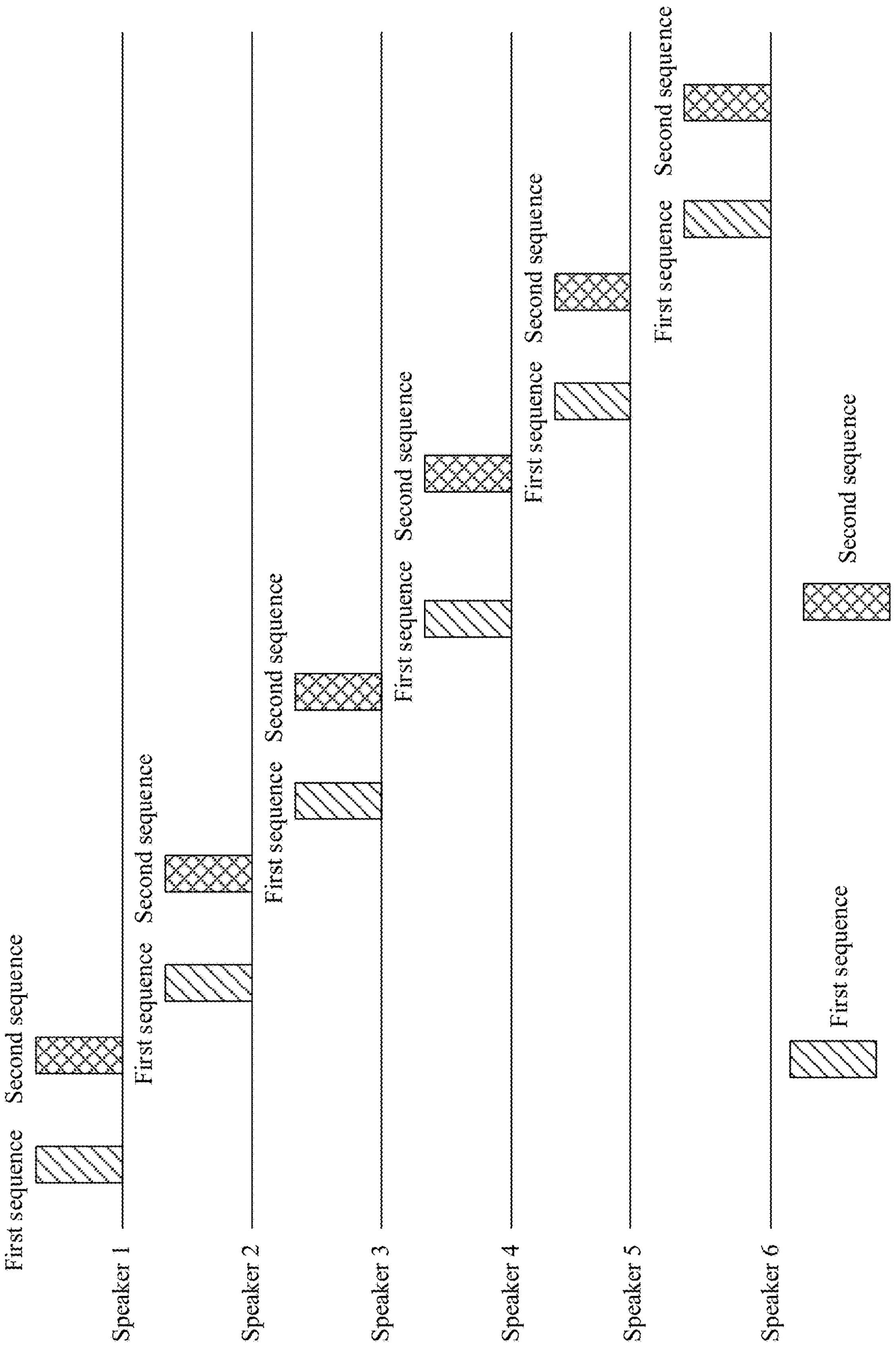
FIG. 20 is another schematic diagram in which a second electronic device sends a first sequence and a second sequence by using a plurality of speakers according to an embodiment of this application.

Optionally, S1701 is performed before S1704, S1702 is performed before S1705, and S1703 is performed before S1606. In other words, the second electronic device may separately send one ultrasonic measurement signal and one ultrasonic data frame by using one speaker, and then send one first sequence and one second sequence by using another speaker. After receiving the N first sequences and the N second sequences, the first electronic device needs to store resource positions of the N received first sequences and the N received second sequences. After the first electronic device determines a received first sequence with best signal quality based on signal quality of the N received first sequences, the first electronic device needs to determine, based on a resource position for receiving the first sequence, and saved resource positions for receiving the N first sequences and resource positions for receiving the N second sequences, a resource position corresponding to the resource position for receiving the first sequence, and determine a second sequence at the corresponding resource position as the second sequence corresponding to the received first sequence received. For example, in the scenario of six speakers shown in FIG. 18, the second electronic device sends both the six first sequences and the six second sequences, as shown in FIG. 20. The second electronic device first sends one first sequence and one second sequence by using the speaker 1, sends one first sequence and one second sequence by using the speaker 2, send one first sequence and one second sequence by using the speaker 3, sends one first sequence and one second sequence by using the speaker 4, sends one first sequence and one second sequence by using the speaker 5, and then sends one first sequence and one second sequence by using the speaker 6.

Optionally, S1704 is performed before S1701, S1705 is performed before S1702, and S1706 is performed before S1703. In other words, the second electronic device may send one sequence after sending one second sequence by using one speaker.

It should be noted that, the foregoing examples in FIG. 19 and FIG. 20 use a manner of sending the first sequence and the second sequence in time domain for description. A sending manner in frequency domain is similar to the sending manner in time domain. To avoid repetition, details are not described.

Figure 21:
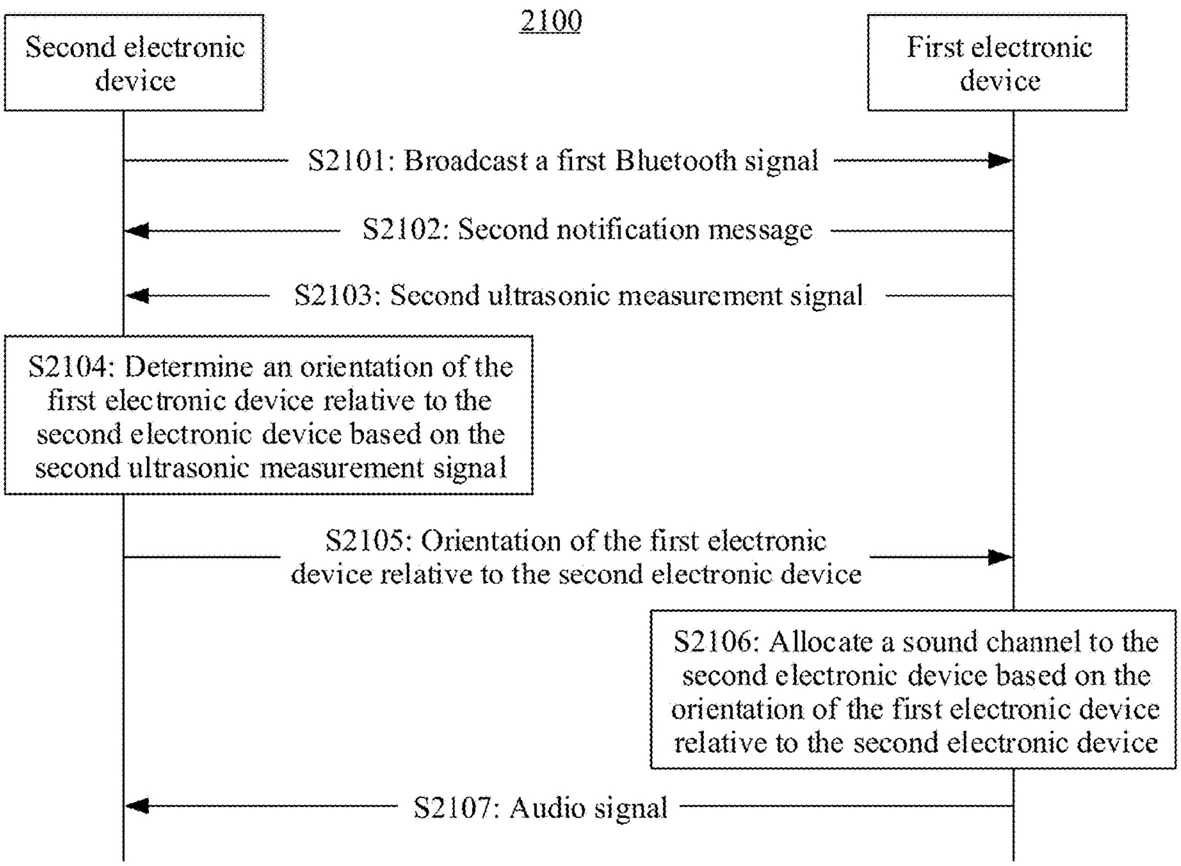
FIG. 21 is a schematic diagram of still another method for determining an orientation according to an embodiment of this application.

In the foregoing embodiment, the first electronic device determines the orientation of the second electronic device. In some embodiments, the second electronic device may also determine an orientation of the first electronic device. With reference to FIG. 21, the following describes a method for determining an orientation provided in an embodiment of this application. The method 2100 shown in FIG. 21 includes the following steps.

S2101: A second electronic device broadcasts a first Bluetooth signal, and a first electronic device receives the first Bluetooth signal broadcast by the second electronic device.

Optionally, after being powered on, the second electronic device may broadcast the first Bluetooth signal.

Optionally, the first Bluetooth signal includes an identifier of the second electronic device. Optionally, the identifier of the second electronic device may be a Bluetooth MAC address of the second electronic device, and the Bluetooth MAC address of the second electronic device is used to uniquely identify the second electronic device.

After the first electronic device receives the first Bluetooth signal broadcast by the second electronic device, it indicates that the first electronic device finds the second electronic device, and a display interface of the first electronic device may display the found second electronic device. After the user clicks a connection, the first electronic device establishes a Bluetooth channel with the second electronic device. In other words, the Bluetooth channel established between the first electronic device and the second electronic device is confirmed through authorization by a user. If the user confirms through authorization that the first electronic device establishes the Bluetooth channel with the second electronic device, it may be understood that the user wants to perform networking. Therefore, the first electronic device may perform S2102.

Optionally, similar to the method 1600, the second electronic device may further send a first notification message to the first electronic device by using the Bluetooth channel. The first notification message is used to notify that the second electronic device is to send a first ultrasonic measurement signal. After sending the first notification message, the second electronic device may send the first ultrasonic measurement signal. The first electronic device may receive the first ultrasonic measurement signal. The first electronic device determines, based on the first ultrasonic measurement signal and the first Bluetooth signal, whether the first electronic device and the second electronic device are in same space. If the first electronic device and the second electronic device are in the same space, S2102 is performed.

A principle in which the first electronic device determines, based on the first ultrasonic measurement signal and the first Bluetooth signal, whether the first electronic device and the second electronic device are in the same space is similar to the principle in which the first electronic device determines, based on the first Bluetooth signal and the first sequence, whether the first electronic device and the second electronic device are in the same space in S705. To avoid repetition, details are not described.

S2102: The first electronic device sends a second notification message to the second electronic device by using the Bluetooth channel. The second notification message is used to notify that the first electronic device is to send a second ultrasonic measurement signal.

Optionally, the second ultrasonic measurement signal may be an ultrasonic measurement signal that is agreed in advance to be learned of by both the first electronic device and the second electronic device.

Optionally, the second electronic device and the first electronic device may learn of the second ultrasonic measurement signal in advance. For example, it may be specified that the second ultrasonic measurement signal is a frequency-modulated continuous wave FMCW sequence or a Zadoff-Chu sequence.

Optionally, the first electronic device may notify the second electronic device of the second ultrasonic measurement signal in advance by using the Bluetooth channel. For example, before S2102, the first electronic device may notify the second electronic device of the second ultrasonic measurement signal by using the Bluetooth channel. In other words, the first electronic device notifies the second electronic device that an ultrasonic measurement signal sent by the first electronic device is the second ultrasonic measurement signal.

Optionally, the second electronic device may notify the first electronic device of the second ultrasonic measurement signal in advance by using the Bluetooth channel. For example, before S2102, the second electronic device may notify the first electronic device to send the second ultrasonic measurement signal. In other words, the second electronic device notifies the first electronic device that the second ultrasonic measurement signal is sent.

In other words, for the second electronic device, the second ultrasonic measurement signal is a known measurement signal, and the second electronic device may perform a correlation operation based on the second ultrasonic measurement signal, to determine the second ultrasonic measurement signal in at least one ultrasonic measurement signal. For example, the first electronic device sends the second ultrasonic measurement signal, and another electronic device also sends one ultrasonic measurement signal.

The second electronic device receives two ultrasonic measurement signals. Because the second electronic device knows that the first electronic device sends the second ultrasonic measurement signal, the second electronic device performs the correlation operation on the two received ultrasonic measurement signals by using the second ultrasonic measurement signal, and the second electronic device determines that an ultrasonic measurement signal with a highest correlation is the second ultrasonic measurement signal sent by the second electronic device.

S2103: The first electronic device sends the second ultrasonic measurement signal, and after receiving the second notification message, the second electronic device receives the second ultrasonic measurement signal.

The second electronic device may receive the second ultrasonic measurement signal by using two microphones.

S2104: The second electronic device determines an orientation of the first electronic device relative to the second electronic device based on the second ultrasonic measurement signal.

Optionally, the orientation of the first electronic device determined by the second electronic device may be an angle of the first electronic device relative to the second electronic device, or may be a distance between the first electronic device and the second electronic device and an angle of the first electronic device relative to the second electronic device. Alternatively, the orientation of the first electronic device relative to the second electronic device determined by the second electronic device may be an angle of the second electronic device relative to the first electronic device, or may be a distance between the first electronic device and the second electronic device and an angle of the second electronic device relative to the first electronic device.

Optionally, the second electronic device may include the two microphones, and the second electronic device may determine the angle of the first electronic device relative to the second electronic device based on a difference between sampling points of the second ultrasonic measurement signal received by using the two microphones. For a principle in which the second electronic device determines the angle of the first electronic device relative to the second electronic device by using the second ultrasonic measurement signal sent by the first electronic device, refer to the descriptions in FIG. 13. To avoid repetition, details are not described.

Optionally, the first electronic device may send the second ultrasonic measurement signal by using one speaker, and send a third ultrasonic measurement signal by using another speaker. The second electronic device determines the angle of the second electronic device relative to the first electronic device based on a difference between sampling points of the second ultrasonic measurement signal and the third ultrasonic measurement signal that are sent by using the two speakers of the first electronic device. Optionally, the first electronic device may simultaneously send the second ultrasonic measurement signal and the third ultrasonic measurement signal by using the two speakers respectively. Optionally, the first electronic device may sequentially send the second ultrasonic measurement signal and the third ultrasonic measurement signal by using the two speakers. If the first electronic device sequentially sends the second ultrasonic measurement signal and the third ultrasonic measurement signal by using the two speakers, the first electronic device may send a time difference between the second ultrasonic measurement signal and the third ultrasonic measurement signal to the second electronic device.

Figure 22:
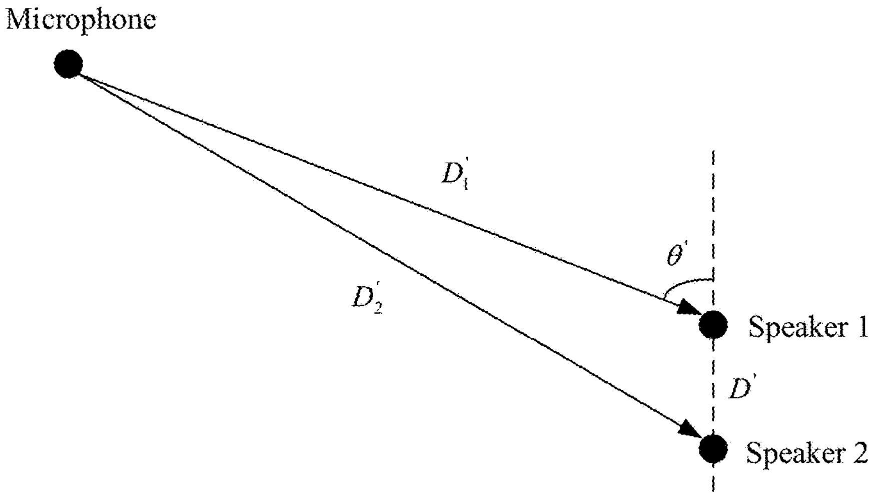
FIG. 22 is a schematic diagram of a position relationship between a speaker and a microphone according to an embodiment of this application.

For example, as shown in FIG. 22, the first electronic device includes a speaker 1 and a speaker 2. The first electronic device sends the second ultrasonic measurement signal and the third ultrasonic measurement signal by using the speaker 1 and the speaker 2. The second electronic device may determine the angle of the second electronic device relative to the first electronic device based on a difference between sampling points of the second ultrasonic measurement signal and the third ultrasonic measurement signal that are received by using the microphone/speakers. If the first electronic device respectively sends the second ultrasonic measurement signal and the third ultrasonic measurement signal by using the speaker 1 and the speaker 2, the second electronic device determines the time difference between the received second ultrasonic measurement signal and the received third ultrasonic measurement signal, and determines the difference between the sampling points based on the time difference and a sampling rate. If the first electronic device sends the second ultrasonic measurement signal, and then sends the third ultrasonic measurement signal, and the time difference between sending the second ultrasonic measurement signal and sending the third ultrasonic measurement signal is $\Delta t_1$, and a time difference between receiving the second ultrasonic measurement signal and receiving the third ultrasonic measurement signal by the second electronic device is $\Delta t_2$, the second electronic device determines a quantity of sampling points from $\Delta t_2$ to $\Delta t_1$ based on a sampling rate, namely, the difference between the sampling points. In FIG. 22, a distance between the speaker 1 and the speaker 2 is D', a distance between the speaker 1 of the first electronic device and the microphone of the second electronic device is $D'_1$, and a distance between the speaker 2 of the first electronic device and the microphone of the second electronic device is $D'_2$. D' is a preset value that can be learned of by the second electronic device, or D' is sent by the first electronic device to the second electronic device. $D'_1$ and $D'_2$ are unknown. Similar to the principle shown in FIG. 13, the second electronic device may determine the angle θ' of the second electronic device relative to the first electronic device based on the difference between the sampling points between the received second ultrasonic measurement signal and the received third ultrasonic measurement signal. To avoid repetition, details are not described.

Optionally, the two speakers of the first electronic device may be a left speaker and a right speaker. Optionally, a distance between the two speakers of the first electronic device is greater than a preset distance. For example, the preset distance may be 10 cm. In other words, in a process in which the second electronic device determines the angle of the first electronic device relative to the second electronic device, the second electronic device may determine the angle of the first electronic device relative to the second electronic device by using the difference between the sampling points of the second ultrasonic measurement signal received by using the two microphones, or the second electronic device may determine the angle of the second electronic device relative to the first electronic device by using the difference between the sampling points of the second ultrasonic measurement signal and the third ultrasonic measurement signal that are respectively sent by using the two speakers of the first electronic device. For example, the first electronic device may be a large screen, and the second electronic device may be a sound box. Because a size of the sound box is relatively small, it is difficult to dispose two microphones on the sound box, and ensure that a distance between the two microphones is greater than a preset distance. Therefore, the large screen may respectively send the second ultrasonic measurement signal and the third ultrasonic measurement signal by using two speakers, and the sound box may determine an angle of the sound box relative to the large screen based on a difference between sampling points of the second ultrasonic measurement signal and the third ultrasonic measurement signal that are respectively sent by using the two speakers of the large screen.

For measuring, by the second electronic device, the distance between the first electronic device relative and the second electronic device based on the second ultrasonic measurement signal, refer to the three cases of the principle in which the first electronic device measures the distance between the first electronic device and the second electronic device based on the first sequence in S707. To avoid repetition, details are not described.

S2105: The second electronic device sends the orientation of the first electronic device relative to the second electronic device to the first electronic device.

Optionally, the second electronic device may send the orientation of the first electronic device relative to the second electronic device to the first electronic device by using the Bluetooth channel.

Similar to the method 700, the orientation of the first electronic device relative to the second electronic device may be the angle of the first electronic device relative to the second electronic device, or may be the distance between the first electronic device and the second electronic device and the angle of the first electronic device relative to the second electronic device.

Optionally, the second electronic device may be an audio device, and the second electronic device may play an audio signal from the first electronic device. Therefore, the first electronic device may allocate a sound channel to the second electronic device based on the orientation of the second electronic device. The method 2100 may further include the following steps.

S2106: The first electronic device allocates a sound channel to the second electronic device based on the orientation of the first electronic device relative to the second electronic device.

Specifically, for S2106, refer to the description of S708. To avoid repetition, details are not described.

S2107: The first electronic device sends an audio signal to the second electronic device based on the sound channel allocated to the second electronic device.

Specifically, for S2107, refer to the description of S709. To avoid repetition, details are not described.

In other words, in the method 700 and the method 1600, because there are a relatively large quantity of second electronic devices or there are also a relatively large quantity of types of second electronic device, first sequences of different second electronic devices may be the same or may be different. Therefore, after receiving a first sequence, the first electronic device cannot uniquely determine the second electronic device. Therefore, in the method 700, the first electronic device may allocate a unique third sequence to the second electronic device in advance. If the second sequence returned by the second electronic device is the third sequence allocated by the first electronic device, the first electronic device may uniquely determine the second electronic device. In the method 1600, if the second sequence returned by the second electronic device is an identifier of the second electronic device, the first electronic device may uniquely determine the second electronic device. Then, the first electronic device may position the second electronic device based on the first sequence. Especially in a stereo surround sound scenario, the first electronic device may be a large screen, and the second electronic device may be a sound box. The large screen can learn that one or more sound boxes may send the first sequence. If the large screen cannot uniquely determine the sound box after receiving the first sequence, after detecting the first Bluetooth signal sent by the sound box 1, the large screen may determine that the sound box 1 is found, and therefore allocate the third sequence to the sound box 1. The association relationship exists between the first sequence and the second sequence that are sent by the sound box 1. If the large screen determines that the second sequence is the same as the third sequence, the large screen may determine that the first sequence is sent by the sound box. Therefore, the sound box may be positioned by using the first sequence. In the method 1600, the first electronic device may uniquely determine the second electronic device based on whether the second sequence returned by the second electronic device is the identifier of the second electronic device. In the method 2100, the second electronic device may determine the orientation of the first electronic device. Because the second electronic device cannot uniquely determine that the second ultrasonic measurement signal is sent by the first electronic device, the first electronic device may first send the second notification message before sending the second ultrasonic measurement signal, indicating that the first electronic device is to send the second ultrasonic measurement signal. After receiving the second notification message, the second electronic device may determine that the second ultrasonic measurement signal to be received is sent by the first electronic device, but not sent by another electronic device.

For example, in the foregoing method embodiment, the first electronic device may be a large screen, and the second electronic device is a sound box.

Figure 23A:
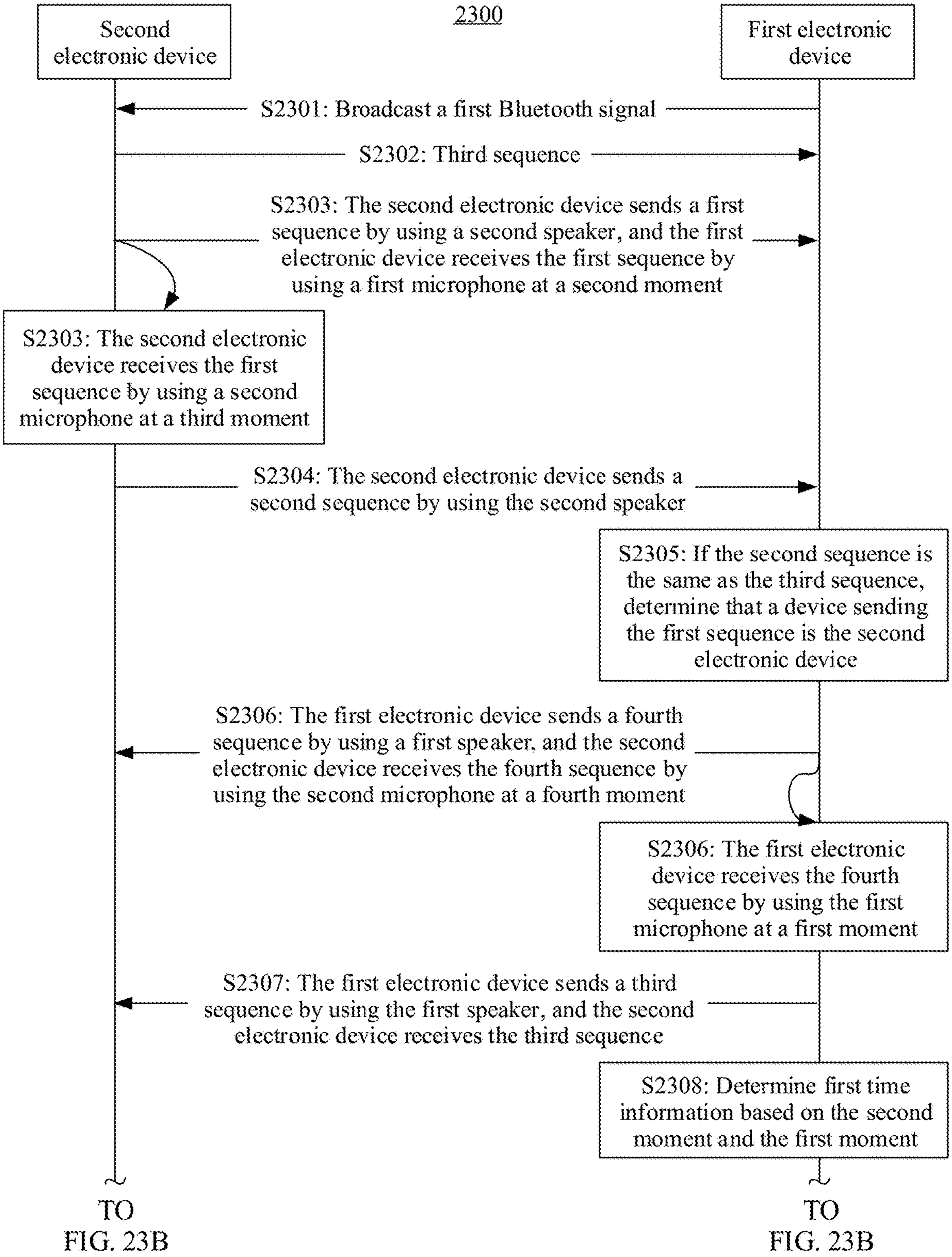
FIG. 23A and FIG. 23B are a schematic diagram of still another method for determining an orientation according to an embodiment of this application.
Figure 23B:
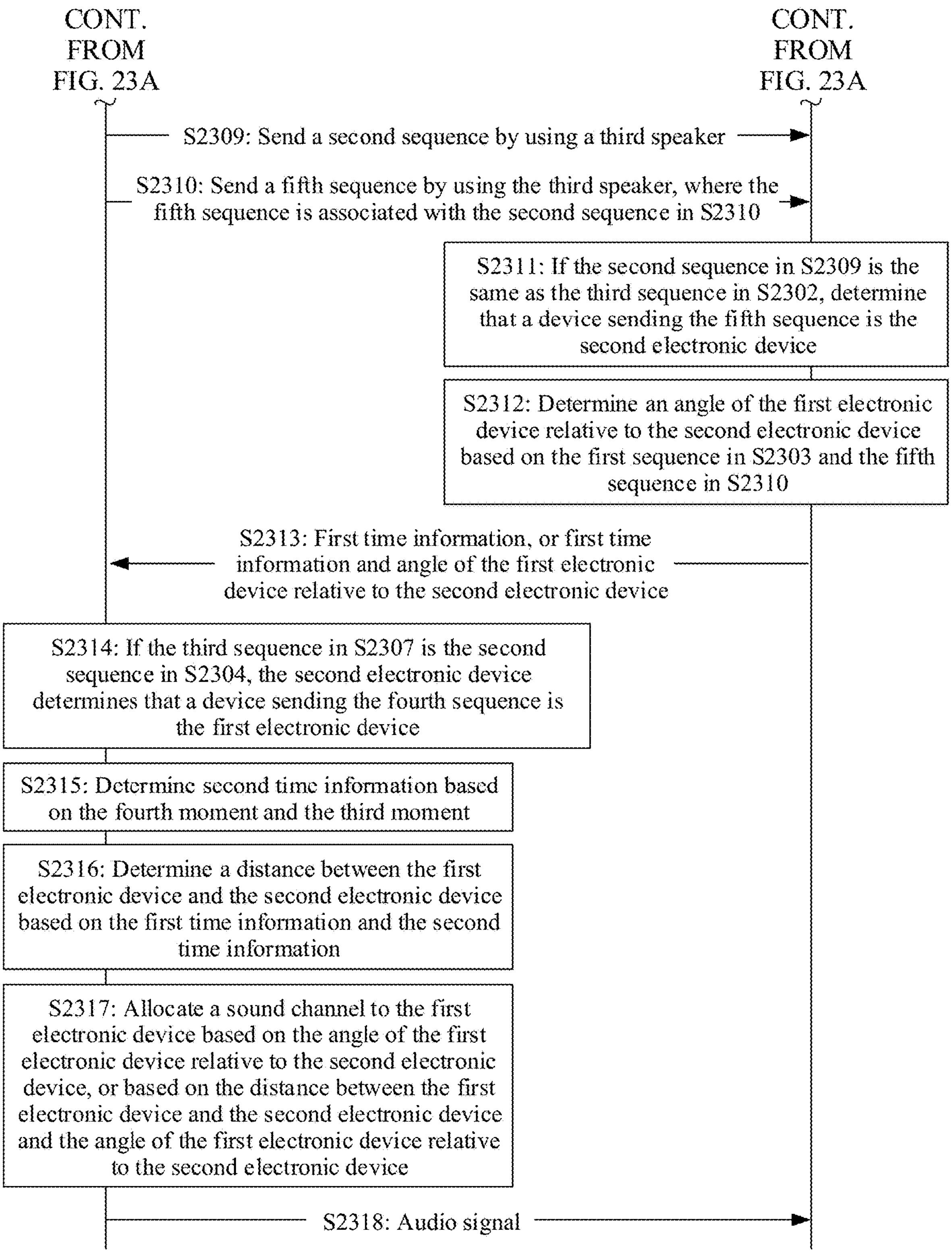

It should be noted that, the second electronic device may determine the orientation of the first electronic device relative to the second electronic device, or the first electronic device may determine the orientation of the second electronic device relative to the first electronic device. In addition, the first electronic device may also determine orientation information of the second electronic device relative to the first electronic device, the first electronic device sends the orientation information of the second electronic device relative to the first electronic device to the second electronic device, and the second electronic device may determine the orientation of the first electronic device relative to the second electronic device based on the orientation information of the second electronic device relative to the first electronic device. Specifically, in the method 700 and the method 1600, the first electronic device may also determine the orientation of the second electronic device relative to the first electronic device. In the foregoing method 2100, the second electronic device may determine the orientation of the first electronic device relative to the second electronic device. The following provides a description with reference to a method 2300. The first electronic device may also determine orientation information of the second electronic device relative to the first electronic device, the first electronic device sends the orientation information of the second electronic device relative to the first electronic device to the second electronic device, and the second electronic device may determine the orientation of the first electronic device relative to the second electronic device based on the orientation information of the second electronic device relative to the first electronic device. The following provides a description with reference to the method 2300 shown in FIG. 23A and FIG. 23B. For example, in the method 2300, a first electronic device may be a sound box, and a second electronic device may be a large screen. As shown in FIG. 23A and FIG. 23B, the method 2300 includes the following steps.

S2301: The first electronic device broadcasts a third Bluetooth signal, and the second electronic device receives the third Bluetooth signal broadcast by the first electronic device.

Optionally, after being powered on, the first electronic device may broadcast the first Bluetooth signal.

Optionally, the first Bluetooth signal includes an identifier of the first electronic device. Optionally, the identifier of the first electronic device may be a Bluetooth MAC address of the first electronic device, and the Bluetooth MAC address of the first electronic device is used to uniquely identify the first electronic device.

Optionally, after receiving the third Bluetooth signal broadcast by the first electronic device, the second electronic device may establish a Bluetooth channel with the first electronic device. Optionally, the Bluetooth channel established between the second electronic device and the first electronic device may not be confirmed by a user. Therefore, the Bluetooth channel existing between the second electronic device and the first electronic device may be understood as an insecure Bluetooth channel. Optionally, the Bluetooth channel established between the second electronic device and the first electronic device may be confirmed by a user. Therefore, the Bluetooth channel existing between the second electronic device and the first electronic device may be understood as a secure Bluetooth channel.

S2302: The second electronic device sends a third sequence to the first electronic device, and the first electronic device receives the third sequence from the second electronic device.

Optionally, S2302 includes: The second electronic device may send the third sequence to the first electronic device by using a Wi-Fi channel, and the first electronic device receives the third sequence from the second electronic device by using the Wi-Fi channel. In this case, the third Bluetooth signal sent by the first electronic device in S2301 may be replaced with a Wi-Fi signal.

Optionally, S2302 includes: The second electronic device may send the third sequence to the first electronic device by using a cellular channel, and the first electronic device receives the third sequence from the second electronic device by using the cellular channel. In this case, the third Bluetooth signal sent by the first electronic device in S2301 may be replaced with a cellular signal.

Optionally, S2302 includes: The second electronic device may send the third sequence to the first electronic device by using a ZigBee channel, and the first electronic device receives the third sequence from the second electronic device by using the ZigBee channel. In this case, the third Bluetooth signal sent by the first electronic device in S2301 may be replaced with a ZigBee signal.

Based on S2301, optionally, S2302 includes: The second electronic device sends the third sequence to the first electronic device by using the Bluetooth channel, and the first electronic device receives the third sequence from the second electronic device by using the Bluetooth channel. Optionally, the Bluetooth channel may be a secure Bluetooth channel or an insecure Bluetooth channel.

Optionally, if the non-secure Bluetooth channel is established between the second electronic device and the first electronic device, the second electronic device may send the third sequence to the first electronic device by using the non-secure Bluetooth channel, and the first electronic device receives the third sequence from the second electronic device by using the non-secure Bluetooth channel. If the secure Bluetooth channel is established between the second electronic device and the first electronic device, the second electronic device may send the third sequence to the first electronic device by using the secure Bluetooth channel, and the first electronic device receives the third sequence from the second electronic device by using the secure Bluetooth channel.

If the second electronic device sends the third sequence to the first electronic device by using the Bluetooth channel, S2302 may be triggered in either of the following two manners.

Manner 1: The second electronic device receives a first operation instruction, and performs S2302 in response to the first operation instruction. Optionally, after receiving the third Bluetooth signal and receiving the first operation instruction input by the user, the second electronic device performs S2302. In other words, after finding the first electronic device and receiving the first operation instruction input by the user, the second electronic device may perform S2302. If the electronic device in FIG. 8 is the second electronic device, the first operation instruction input by the user is that the user clicks "one-click networking" of the second electronic device. The "one-click networking" in FIG. 8 may be replaced with "networking", or may be replaced with "allocating a sound channel" in a stereo surround sound scenario formed by a plurality of sound boxes, or certainly may be replaced with other existing content. This is not limited in this embodiment of this application. For example, the "one-click networking" shown in FIG. 8 may be an option in "setting".

Manner 2: In S2301, the second electronic device receives the third Bluetooth signal broadcast by the first electronic device, and triggers the second electronic device to send the third sequence to the first electronic device in S2302. In other words, after receiving the third Bluetooth signal broadcast by the first electronic device, the second electronic device triggers the second electronic device to send the third sequence to the first electronic device that broadcasts the third Bluetooth signal.

It should be noted that, if the second electronic device sends the third sequence to the first electronic device by using another channel, a trigger manner for triggering the second electronic device to send the third sequence to the first electronic device is similar to a trigger manner for triggering the second electronic device to send the third sequence to the first electronic device by using a Bluetooth channel. To avoid repetition, details are not described.

For example, the third sequence may be a token, that is, the third sequence is a sequence allocated by the first electronic device to the second electronic device, and is also referred to as a token allocated by the first electronic device to the second electronic device. When sending a first sequence to the first electronic device, the second electronic device also needs to send the third sequence allocated by the first electronic device, so that the first electronic device can identify the second electronic device.

Optionally, a length of the third sequence is a preset value. For example, the preset value is 16 bits.

S2303: The second electronic device sends the first sequence by using a second speaker, the first electronic device receives the first sequence by using a first microphone at a second moment, and the second electronic device may receive a first sequence by using a second microphone at a third moment.

For descriptions of the first sequence in S2303, refer to the descriptions of S703. To avoid repetition, details are not described.

Optionally, the second electronic device may further send a fourth Bluetooth signal. The first electronic device determines, based on the fourth Bluetooth signal and the first sequence, whether the first electronic device and the second electronic device are in same space. If the first electronic device determines that the second electronic device and the first electronic device are in the same space, the first electronic device performs a subsequent step of the method; if the first electronic device determines that the second electronic device and the first electronic device are not in the same space, the first electronic device does not perform a subsequent step of the method.

The second electronic device may perform S2303 or S2304 after a preset time period after sending the third sequence in S2302.

S2304: The second electronic device sends a second sequence by using the second speaker, and the first electronic device receives the second sequence, where the first sequence is associated with the second sequence, and the second sequence is the third sequence in S2302.

In other words, the second electronic device sends, to the first electronic device, the third sequence sent to the first electronic device again.

Optionally, in S2304, the first electronic device may receive the second sequence by using the first microphone or receive the first sequence by using a microphone other than the first microphone.

For the association relationship between the first sequence and the second sequence in S2303 and S2304, refer to the description in S704. To avoid repetition, details are not described.

The second electronic device may perform S2303 or S2304 after a preset time period after sending the third sequence in S2302.

S2305: If the second sequence is the same as the third sequence that is sent by the second electronic device to the first electronic device in S2302, the first electronic device determines that a device sending the first sequence is the second electronic device. In other words, the first sequence and the second sequence are sent by the second electronic device to the first electronic device, but not sent to another electronic device.

In other words, the first electronic device can learn of the association relationship between the first sequence and the second sequence. For example, in the method 700, the time domain resource for sending the first sequence is associated with the time domain resource for sending the second sequence, and/or the frequency domain resource for sending the first sequence is associated with the frequency domain resource for sending the second sequence. Therefore, if the second sequence is the same as the third sequence, the first electronic device may determine, based on the association relationship, that the device sending the first sequence associated with the second sequence is the second electronic device.

Optionally, if the second sequence is the third sequence that is sent by the second electronic device to the first electronic device in S2302, the first electronic device determines that a device sending the first sequence and the second sequence is the second electronic device. In this case, the first electronic device may perform S2306.

It should be noted that, after the second electronic device performs S2302, the first electronic device learns of the third sequence. In S2304, the second electronic device sends the third sequence to the first electronic device, and before the first electronic device parse the third sequence, the first electronic device cannot learn whether the sequence is the third sequence. Therefore, a sequence from the second electronic device may be defined as the second sequence, and the first electronic device needs to determine whether the second sequence is the same as the third sequence.

Optionally, if the first electronic device determines, in S2305, that the device sending the first sequence and the second sequence is the second electronic device, or that the first sequence and the second sequence are sent to the first electronic device, but not sent to another electronic device, the first electronic device may also determine that an unencrypted Bluetooth channel established between the second electronic device and the first electronic device after S2301 is secure, and the first electronic device and the second electronic device may transmit data by using the secure Bluetooth channel.

Optionally, if the first electronic device includes two microphones, the first electronic device may determine the angle of the second electronic device relative to the first electronic device based on a difference between sampling points of the first sequence in S2303 that is received by using the two microphones. For a specific determining principle, refer to the description in the method 700.

S2306: The first electronic device sends a fourth sequence by using a first speaker, the second electronic device receives the fourth sequence by using the second microphone at a fourth moment, and the first electronic device may receive the fourth sequence by using the first microphone at a first moment.

Optionally, S2302 may trigger S2306, that is, the first electronic device may send the fourth sequence after receiving the first sequence.

Optionally, S2303 may trigger S2306, that is, the first electronic device may send the fourth sequence after receiving the second sequence.

Optionally, the first electronic device sends the fourth sequence after the preset time period after receiving the first sequence or the second sequence.

In other words, in this embodiment of this application, there is no limitation on a trigger condition for triggering sending of the fourth sequence, and the first electronic device may also send the fourth sequence based on an implementation of the first electronic device.

Optionally, the first electronic device may notify the first electronic device of the fourth sequence in advance by using the Bluetooth channel. For example, after S2301, the first electronic device may establish a Bluetooth channel with the second electronic device. The first electronic device may notify the second electronic device of the fourth sequence by using the Bluetooth channel established after S2301. In other words, the first electronic device notifies the second electronic device that the first electronic device sends the fourth sequence.

Optionally, the second electronic device may notify the first electronic device of the fourth sequence in advance by using the Bluetooth channel. For example, after S2301, the first electronic device may establish a Bluetooth channel with the second electronic device. The second electronic device may notify the first electronic device of the fourth sequence by using the Bluetooth channel established after S2301. In other words, the second electronic device notifies the first electronic device to send the fourth sequence.

In other words, the second electronic device may perform a correlation operation based on the fourth sequence, to determine the fourth sequence from at least one sequence.

For example, the first electronic device sends the fourth sequence, and another electronic device also sends one sequence. The second electronic device receives two sequences. Because the second electronic device knows that the first electronic device sends the fourth sequence, the second electronic device performs the correlation operation on the received two sequences by using the fourth sequence, and the second electronic device determines that a sequence with a highest correlation is the fourth sequence sent by the first electronic device.

S2307: The first electronic device sends a third sequence to the second electronic device by using the first speaker, and the second electronic device receives the third sequence, where the fourth sequence is associated with the third sequence.

Optionally, that the fourth sequence is associated with the third sequence may be: A time domain resource for sending the third sequence by the first electronic device is associated with a time domain resource for sending the fourth sequence by the first electronic device, and/or a frequency domain resource for sending the third sequence by the first electronic device is associated with a frequency domain resource for sending the fourth sequence by the first electronic device. Specifically, for an association relationship between the third sequence and the fourth sequence, refer to the association relationship between the first sequence and the second sequence in the method 700. To avoid repetition, details are not described.

Optionally, in S2307, the second electronic device may receive the fourth sequence by using the second microphone or receive the fourth sequence by using a microphone other than the second microphone.

It may be understood that, after receiving the third sequence in S2302, the first electronic device sends the third sequence in S2302 to the second electronic device in S2307. However, before the second electronic device parse the third sequence in S2307, the third sequence sent in S2307 may also be defined as a sixth sequence. Therefore, in S2307, the receiving the third sequence by the second electronic device may be replaced with receiving the sixth sequence by the second electronic device.

S2308: The first electronic device determines first time information based on the second moment and the first moment.

Optionally, the first time information may indicate a difference obtained by subtracting the second moment from the first moment, or the first time information may indicate a difference obtained by subtracting the first moment from the second moment.

S2309: The second electronic device sends a second sequence to the first electronic device by using a third speaker, and the first electronic device receives the second sequence.

It should be noted that, for the second electronic device, after sending the third sequence to the first electronic device in S2302, the second electronic device sends one third sequence as the second sequence by using the second speaker in S2304, and sends one third sequence again by using the third speaker in S2309. For the first electronic device, in S2309, before the first electronic device parses the second sequence, the first electronic device cannot learn whether the sequence is the second sequence. Therefore, the second sequence from the second electronic device may also be defined as a seventh sequence.

S2310: The second electronic device sends a fifth sequence to the first electronic device by using the third speaker, and the first electronic device receives the fifth sequence, where the fifth sequence is associated with the second sequence in S2309.

Optionally, S2310 and S2303 may be simultaneously performed, that is, the second electronic device may send different sequences by using different speakers. In this case, after receiving the two sequences, the first electronic device may determine the angle of the second electronic device relative to the first electronic device based on a difference between sampling points of the two sequences.

Optionally, S2310 and S2303 may be sequentially performed. Optionally, S2303 may be performed before S2305. The second electronic device may send, to the first electronic device, a first time difference between sending the first sequence and sending the second sequence, or a time difference between sending the first sequence to the first electronic device by the second electronic device by using the second speaker and sending the second sequence by the second electronic device by using the third speaker may be preset, and the first electronic device can learn of the first time difference.

Optionally, the second electronic device may notify the first electronic device of the fifth sequence in advance by using the Bluetooth channel. For example, after S2301, the first electronic device may establish a Bluetooth channel with the second electronic device. The second electronic device may notify the first electronic device of the first sequence by using the Bluetooth channel established after S2301. In other words, the second electronic device notifies the first electronic device that the second electronic device sends the fifth sequence.

Optionally, the first electronic device may notify the second electronic device of the fifth sequence in advance by using the Bluetooth channel. For example, after S2301, the first electronic device may establish a Bluetooth channel with the second electronic device. The first electronic device may notify the second electronic device of the fifth sequence by using the Bluetooth channel established after S2301. In other words, the first electronic device notifies the second electronic device to send the fifth sequence.

In other words, the first electronic device may perform a correlation operation based on the fifth sequence, to determine the fifth sequence from at least one sequence. For example, the second electronic device sends the fifth sequence, and another electronic device also sends one sequence. The first electronic device receives two sequences. Because the first electronic device knows that the second electronic device sends the fifth sequence, the first electronic device performs the correlation operation on the received two sequences by using the fifth sequence, and the first electronic device determines that a sequence with a highest correlation is the fifth sequence sent by the second electronic device.

S2311: If the second sequence in S2309 is the same as the third sequence in S2302, the first electronic device determines that a device sending the fifth sequence is the second electronic device.

In other words, after the first electronic device determines that the device sending the fifth sequence is the second electronic device, the first electronic device may determine to measure the angle of the second electronic device relative to the first electronic device by using the fifth sequence.

It should be noted that S2310 and S2311 may be optional steps, that is, if the first electronic device includes the two microphones, the first electronic device may determine the angle of the second electronic device relative to the first electronic device based on the difference between the sampling points of the two microphones for the first sequence, and S2310 and S2311 may not exist. If S2310 and S2311 exist, the method 2300 further includes the following steps.

S2312: The first electronic device determines the angle of the first electronic device relative to the second electronic device based on the first sequence that is sent by the second electronic device by using the second speaker in S2303 and the fifth sequence that is sent by the second electronic device by using the third speaker in S2310.

Both the first sequence in S2303 and the fifth sequence in S2310 are known sequences, and the first electronic device may determine the angle of the second electronic device relative to the first electronic device by using a difference between sampling points of the first sequence and the fifth sequence that are sent by the two different speakers of the second electronic device. Optionally, if the first sequence in S2303 and the fifth sequence in S2310 are simultaneously sent, the first electronic device may determine the difference between the sampling points based on a time difference between receiving the first sequence and receiving the fifth sequence and a sampling rate, and determine the angle of the first electronic device relative to the second electronic device based on the difference between the sampling points. Optionally, if the first sequence in S2303 and the fifth sequence in S2310 are not simultaneously sent, the first electronic device may learn of the first time difference between sending the first sequence in S2303 by the second electronic device and sending the fifth sequence in S2310 by the second electronic device. The first electronic device determines a third time difference based on the first time difference between sending the first sequence in S2303 and sending the fifth sequence in S2310 by the second electronic device and a second time difference between receiving the first sequence in S2303 and receiving the fifth sequence in S2310 by the first electronic device, determines the difference between the sampling points based on the third time difference and the sampling rate, and determines the angle of the first electronic device relative to the second electronic device based on the difference between the sampling points. For example, the speaker 1 shown in FIG. 22 may be replaced with the second speaker, and the speaker 2 may be replaced with the third speaker. In FIG. 23A and FIG. 23B, the second electronic device includes the second speaker and the third speaker, and the first electronic device includes the microphone. For example, the first time difference between sending the first sequence in S2303 by the second electronic device and sending the fifth sequence in S2310 by the second electronic device is $\Delta t_1$, and the second time difference between receiving the first sequence in S2303 and receiving the fifth sequence in S2310 by the first electronic device is $\Delta t_2$. The third time difference is $\Delta t_2-\Delta t_1$. Then, the first electronic device determines the sampling point difference based on $\Delta t_2-\Delta t_1$ and the sampling rate. Based on a principle similar to that in FIG. 22, the first electronic device may determine the angle of the first electronic device relative to the second electronic device. To avoid repetition, details are not described.

S2313: The first electronic device sends the first time information to the second electronic device, or sends the first time information and the angle of the first electronic device relative to the second electronic device.

Optionally, if S2312 exists, the first electronic device may send, to the second electronic device, the first time information and the angle of the first electronic device relative to the second electronic device in S2313. If S2312 does not exist, the first time information is sent in S2313. Alternatively, if S2312 does not exist, but the first electronic device may determine the angle of the second electronic device relative to the first electronic device based on the first sequence in S2303, the first electronic device may send the first time information and the angle of the second electronic device relative to the first electronic device that is determined by the first electronic device based on the first sequence in S2303 to the second electronic device in S2313.

Optionally, the first electronic device may simultaneously or sequentially send, to the second electronic device, the first time information and the angle of the first electronic device relative to the second electronic device. For example, if the first electronic device first determines the angle of the first electronic device relative to the second electronic device, and then determines the first time information, the first electronic device first sends, to the second electronic device, the angle of the first electronic device relative to the second electronic device, and then sends the first time information.

Optionally, the first electronic device may send the first time information to the second electronic device by using the Bluetooth channel, or send, to the second electronic device, the first time information and the angle of the first electronic device relative to the second electronic device by using the Bluetooth channel.

It may be understood that the first electronic device may alternatively send the first time information to the second electronic device by using the Wi-Fi channel, the cellular channel, or the ZigBee channel, or send the first time information and the angle of the first electronic device relative to the second electronic device.

S2314: If the third sequence in S2307 is the second sequence in S2304, the second electronic device determines that a device sending the fourth sequence is the first electronic device.

Because the second sequence is the third sequence, S2310 may be replaced with the following: If the third sequence in S2307 is the third sequence in S2302, the second electronic device determines that a device sending the fourth sequence is the first electronic device.

Optionally, if the third sequence in S2307 received by the second electronic device is defined as the sixth sequence, S2314 may be replaced with the following: If the sixth sequence in S2307 is the same as the third sequence in S2302, the second electronic device determines that the device sending the fourth sequence is the first electronic device.

In other words, after the second electronic device determines that the device sending the fourth sequence is the first electronic device, the second electronic device needs to determine an orientation of the first electronic device. In other words, if the third sequence in S2307 is the same as the second sequence in S2304, the second electronic device needs to determine, based on the fourth sequence associated with the third sequence in S2307, the orientation of the first electronic device sending the fourth sequence.

It may be understood that S2307 and S2314 may be optional steps, that is, the first electronic device may not send the third sequence by using the first speaker, and the second electronic device considers by default that the second electronic device can uniquely determine the first electronic device. For example, if S2313 is performed before S2307, the second electronic device may determine, based on S2313, that the first time information or the first time information and the angle of the first electronic device relative to the second electronic device are sent by the first electronic device, and the second electronic device needs to determine the orientation of the first electronic device.

S2315: The second electronic device determines second time information based on the fourth moment and the third moment.

Optionally, if the third moment occurs before the fourth moment, the second time information may indicate a difference obtained by subtracting the third moment from the fourth moment.

S2316: The second electronic device determines the distance between the first electronic device and the second electronic device based on the first time information and the second time information.

Optionally, S2316 includes: The second electronic device determines the distance between the first electronic device and the second electronic device based on the first time information, the second time information, a distance between the second microphone and the second speaker of the second electronic device, and a distance between the first microphone and the first speaker of the first electronic device.

Optionally, the second electronic device may obtain the distance between the first microphone of the first electronic device and the first speaker from the first electronic device.

Optionally, the second electronic device may determine the identifier of the first electronic device based on the first Bluetooth signal, determine a type of the first electronic device based on the identifier of the first electronic device, and determine the distance between the first microphone and the first speaker of the first electronic device based on the type of the first electronic device.

Figure 24:
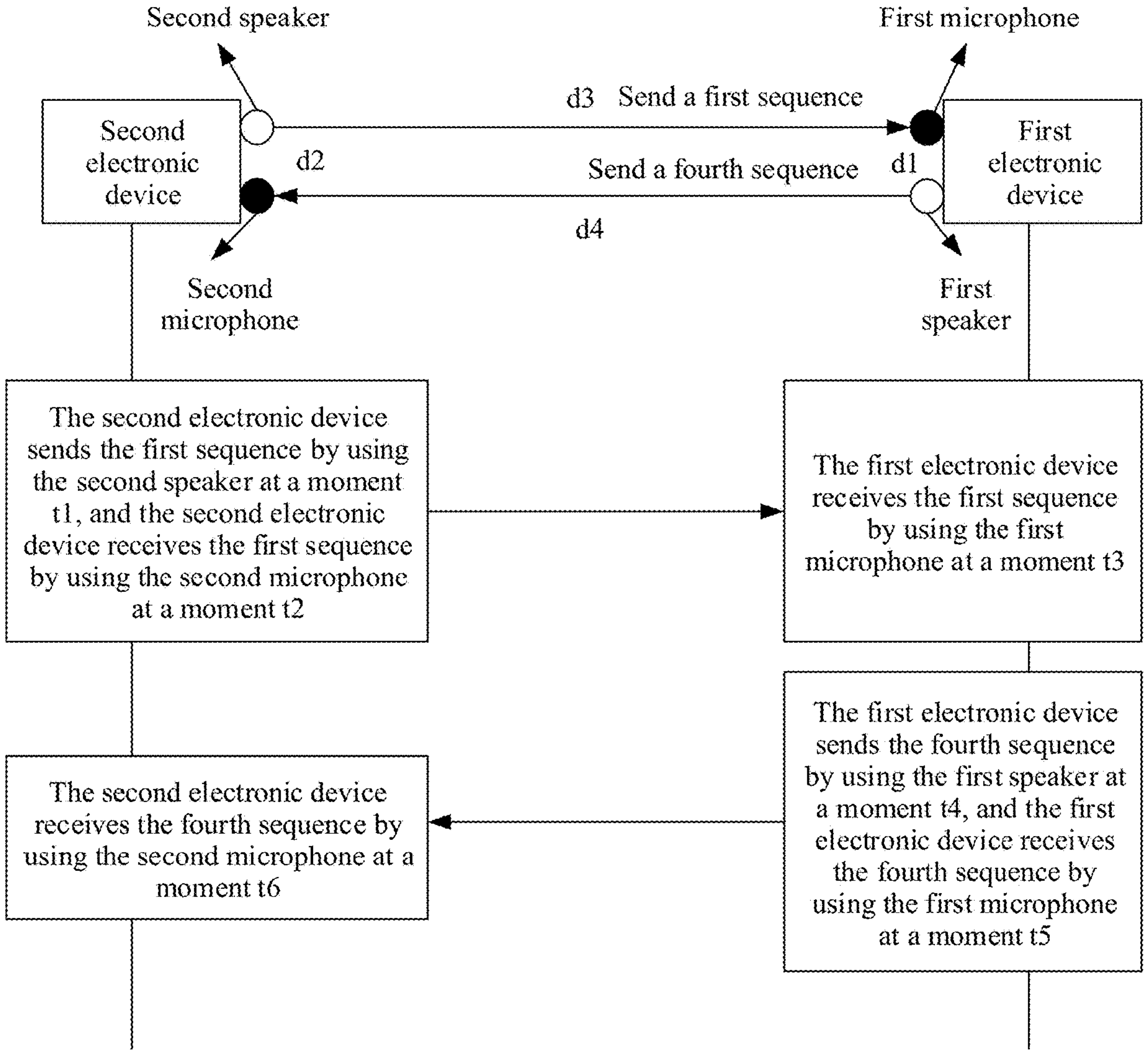
FIG. 24 is a schematic diagram of a principle of determining a distance between a first electronic device and a second electronic device according to an embodiment of this application.

With reference to FIG. 24, the following describes a principle in which the second electronic device determines the distance between the first electronic device and the second electronic device based on the first time information and the second time information. As shown in FIG. 24, the first electronic device includes the first microphone and the first speaker, the distance between the first microphone and the first speaker is d1, the second electronic device includes the second microphone and the second speaker, and the distance between the second microphone and the second speaker is d2. The second electronic device may learn of d1 and d2, that is, the second electronic device may learn of the distance between the first microphone and the first speaker of the first electronic device, and may further learn of the distance between the second microphone and the second speaker of the second electronic device. The first electronic device may send d1 to the second electronic device, or after receiving the first Bluetooth signal of the first electronic device, the second electronic device may determine the type of the first electronic device based on the identifier of the first electronic device in the first Bluetooth signal, and determine d1 based on the type of the first electronic device. A distance between the second speaker of the second electronic device to the first microphone of the first electronic device is d3 (unknown), a distance between the first speaker of the first electronic device to the second microphone of the second electronic device is d4 (unknown), d3 is approximately equal to d4. d3≈d4≈d, that is, d is the distance between the second electronic device and the first electronic device. A value of d is calculated below.

As shown in FIG. 24, if the first sequence and the fourth sequence are transmitted by using an ultrasonic signal, for step S2303, the second electronic device sends the first sequence by using the second speaker at a moment t1, and the second electronic device receives the first sequence by using the second microphone at a moment t2 (namely, the third moment), and the first electronic device receives the first sequence by using the first microphone at a moment t3 (that is, the second moment). For step S2306, the first electronic device sends the fourth sequence by using the first speaker at a moment t4, the first electronic device receives the fourth sequence by using the first microphone at a moment t5 (namely, the first moment), and the second electronic device receives the fourth sequence by using the second microphone at a moment t6 (namely, the fourth moment). v in the following formula is a sound speed.

$$d1 = (t5 - t4)v$$

$$d2 = (t2 - t1)v$$

$$d3 = (t3 - t1)v$$

$$d4 = (t6 - t4)v$$

$$d3 - d2 = (t3 - t1)v - (t2 - t1)v = (t3 - t2)v$$

$$d4 - d1 = (t6 - t4)v - (t5 - t4)v = (t6 - t5)v$$

$$2d = d3 + d4 = (t3 - t2)v + (t6 - t5)v + d1 + d2$$

$$d = ((t6 - t2) - (t5 - t3)v)/2 + (d1 + d2)/2$$

t6–t2 is a difference between the fourth moment and the third moment, and t5–t3 is a difference between the first moment and the second moment.

It may be understood that derivation of the formula is merely a method for determining the distance between the second electronic device and the first electronic device, and another formula may be obtained through transformation based on the formula. This is not limited in this embodiment of this application.

Optionally, in a stereoscopic surround sound scenario, the first electronic device may be an audio device, and the method 2300 may further include the following steps.

S2317: The second electronic device allocates a sound channel to the first electronic device based on the angle of the first electronic device relative to the second electronic device, or based on the distance between the first electronic device and the second electronic device and the angle of the first electronic device relative to the second electronic device.

It should be noted that there are some optional steps in the method 2300. For example, steps related to calculating the distance between the first electronic device and the second electronic device in the method 2300 are optional steps. For example, the method 2300 may not include S2306 to S2308, S2315, and S2316. S2313 does not include the first time information. In this case, the second electronic device may receive, in S2313, the angle of the first electronic device relative to the second electronic device, and in S2317, the second electronic device may allocate the sound channel to the first electronic device based on the angle of the first electronic device relative to the second electronic device.

Optionally, if there are a plurality of first electronic devices, the second electronic device may allocate a sound channel to each first electronic device based on an angle of each first electronic device relative to the second electronic device. For example, if the second electronic device is a large screen, and two first electronic devices are two sound boxes, the large screen may allocate sound channels to the two sound boxes based angles of the two sound boxes relative to the large screen. For example, if the large screen determines that a first sound box is 30 degrees to the left of the large screen, the large screen allocates a left sound channel to the first sound box; if the large screen determines that a second sound box is 45 degrees to the right of the large screen, the large screen allocates a right sound channel to the second sound box.

Optionally, if there are a plurality of first electronic devices, the second electronic device may determine, based on an angle of each first electronic device relative to the second electronic device, a difference relationship between an angle of one first electronic device relative to the second electronic device and an angle of another first electronic device relative to the second electronic device. For example, the second electronic device is a large screen, the plurality of first electronic devices are four sound boxes, and the large screen may allocate sound channels to the four sound boxes based on angles of the four sound boxes relative to the large screen. Specifically, the large screen determines, based on the angles of the four sound boxes relative to the large screen, whether the four sound boxes are in the left or in the right of the large screen. Then, the large screen sets a sound box with a larger angle in the left as a left sound channel, sets a sound box with a smaller angle in the left as left surround, sets a sound box with a larger angle in the right as a right sound channel, and sets a sound box with a smaller angle in the right as right surround. For example, the large screen determines that both a sound box 1 and a sound box 2 are in the left of the large screen, where an angle of the sound box 1 relative to the large screen is greater than an angle of the sound box 2 relative to the large screen. Therefore, the large screen may allocate the left sound channel to the sound box 1 and allocate the left surround to the sound box 2.

Optionally, if there are a plurality of first electronic devices, the second electronic device allocates a sound channel to each first electronic device based on a distance between each first electronic device and the second electronic device and an angle of each first electronic device relative to the second electronic device. The second electronic device may determine a location of each first electronic device relative to the second electronic device based on the angle of each first electronic device relative to the second electronic device and the distance between each first electronic device and the second electronic device. For example, the second electronic device may determine whether the first electronic device is in the left or the right of the second electronic device, and a relative distance relationship between any two first electronic devices and the second electronic device. For example, the second electronic device is a large screen, and four first electronic devices are four sound boxes, and the large screen may allocate sound channels to the four sound boxes based on distances from the four sound boxes to the large screen and angles of the four sound boxes relative to the large screen. Specifically, the large screen determines, based on the angles of the four sound boxes relative to the large screen, whether the four sound boxes are in the left or in the right of the large screen. Then, the large screen sets a closer sound box in the left as a left sound channel, sets a farther sound box in the left as left surround, sets a closer sound box in the right as a right sound channel, and sets a farther sound box in the right as right surround. S2318: The second electronic device sends an audio signal to the first electronic device based on the sound channel allocated to the first electronic device.

The first electronic device plays the audio signal from the second electronic device.

It may be understood that, in the stereoscopic surround sound scenario, after the first electronic device and the second electronic device perform the foregoing method 2300, for another audio device, namely a third electronic device, the second electronic device and the third electronic device may perform steps similar to the method 2300 again. A difference is that the second electronic device may send a sequence other than the third sequence to the third electronic device in S2302, that is, the second electronic device may control different audio devices to form the stereoscopic surround sound scenario, the second electronic device may allocate different sequences to the different audio devices, and the different audio devices may distinguish, based on the received sequences, whether the second electronic device needs to be separately networked with the audio devices, to form the stereoscopic surround sound scenario.

It should be noted that an order of the steps in the method 2300 is not limited, and an execution order of the steps may alternatively be determined based on internal logic, and is not related to a sequence number of each step. For example, if the first time information is sent in S2313, S2313 may be performed after S2308, and an order of any one of S2313 and S2309 to S2312 is not limited. After determining the angle of the second electronic device relative to the first electronic device, the first electronic device sends the angle of the second electronic device relative to the first electronic device to the second electronic device. For another example, an order of any one of S2315 and S2306 to S2314 is not limited.

It should also be noted that some steps in the method 2300 are optional steps. For example, S2309 to S2312 are optional steps, that is, the four steps may not exist in the method 2300. To be specific, the first electronic device may not determine the angle of the second electronic device relative to the first electronic device, and the second electronic device may determine the angle of the first electronic device relative to the second electronic device based on the fourth sequence in S2306. In this case, in S2313, the first electronic device does not send the angle of the second electronic device relative to the first electronic device.

It may be understood that the first sequence in S2303 and the second sequence in S2304 are a pair of sequences that have an association relationship. For example, the second electronic device sends the first sequence in S2303 at a first resource position, and the second electronic device sends the second sequence in S2304 at a second resource position. An interval between the first resource position and the second resource position is a preset interval. The second electronic device determines, based on a resource position of the received known first sequence and the preset interval, a resource position corresponding to the second sequence, parses a second sequence at the resource position, and determines whether the parsed second sequence is the third sequence in S2302. If the parsed second sequence is the third sequence, it indicates that the first sequence is sent by the second electronic device to the first electronic device, but not sent to another electronic device. The fourth sequence in S2306 and the third sequence in S2307 are a pair of sequences that have an association relationship. For example, the first electronic device sends the fourth sequence in S2306 at a third resource position, and sends the third sequence in S2307 at a fourth resource position. An interval between the third resource position and the fourth resource position is a preset interval. The second electronic device determines, based on a resource position of the received known fourth sequence and the preset interval, a resource position corresponding to the third sequence, parses a third sequence at the resource position, and determines whether the parsed third sequence is consistent with the third sequence in S2304. If the parsed third sequence is consistent with the third sequence, it indicates that the fourth sequence is sent by the first electronic device to the second electronic device, and the orientation of the second electronic device needs to be determined. The second sequence in S2309 and the fifth sequence in S2310 are a pair of sequences that have an association relationship. For example, the second electronic device sends the fifth sequence in S2310 at a fifth resource position, and the second electronic device sends the second sequence in S2309 at a sixth resource position. An interval between the fifth resource position and the sixth resource position is a preset interval. The second electronic device determines, based on a resource position of the received known fifth sequence and the preset interval, a resource position corresponding to the second sequence in S2309, parses a second sequence at the resource position, and determines whether the parsed second sequence is the third sequence in S2302. If the parsed second sequence is the third sequence, it indicates that the fifth sequence is sent by the second electronic device to the first electronic device, but not sent to another electronic device. The first electronic device may measure the angle of the second electronic device relative to the first electronic device by using the known first sequence and the known fifth sequence.

Figure 25:
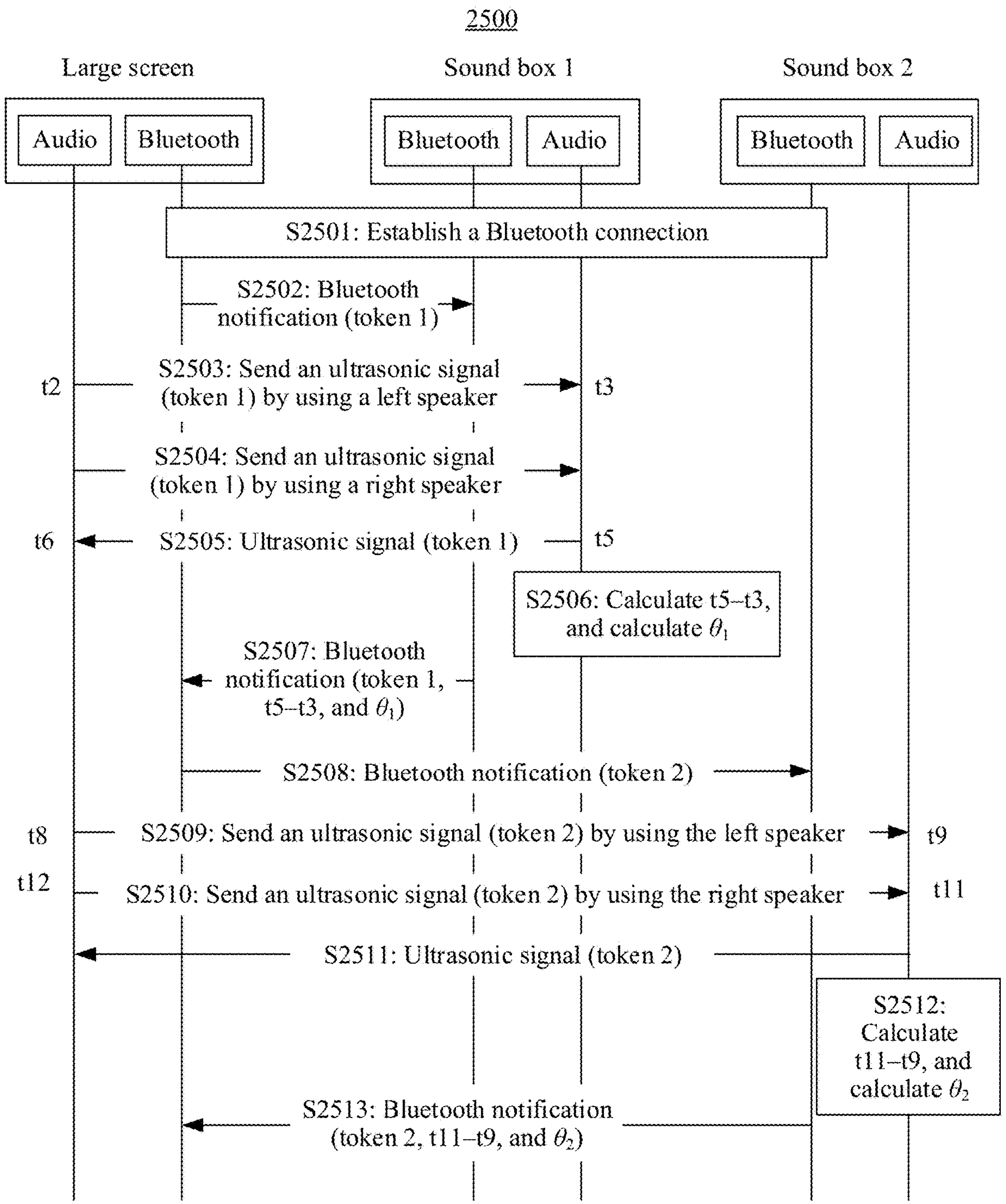
FIG. 25 is a schematic diagram of still another method for determining an orientation according to an embodiment of this application.

In some embodiments, this application further provides a method 2500 for determining orientation information shown in FIG. 25. A second electronic device may be a large screen, a first electronic device may be a sound box 1, and a third electronic device may be a sound box 2. As shown in FIG. 25, the method 2500 includes the following steps.

S2501: A Bluetooth module of the large screen may separately establish a Bluetooth connection to a Bluetooth module of the sound box 1, and establish a Bluetooth connection to a Bluetooth module of the sound box 2.

S2502: The Bluetooth module of the large screen sends a Bluetooth notification to the Bluetooth module of the sound box 1, where the Bluetooth notification includes a token 1.

S2503: An audio module of the large screen sends an ultrasonic signal by using a left speaker at a moment t1, and an audio module of the sound box 1 receives the ultrasonic signal at a moment t3, where the ultrasonic signal includes the token 1. In addition, the audio module of the large screen receives, at a moment t2, the ultrasonic signal sent by the left speaker of the large screen.

S2504: The audio module of the large screen sends an ultrasonic signal by using a right speaker, and the audio module of the sound box 1 receives the ultrasonic signal, where the ultrasonic signal includes the token 1.

S2505: The audio module of the sound box 1 sends an ultrasonic signal at a moment t4, and the audio module of the large screen receives the ultrasonic signal at a moment t6, where the ultrasonic signal includes the token 1. In addition, the audio module of the sound box 1 receives, at a moment t5, the ultrasonic signal sent by the audio module of audio 1.

S2506: The sound box 1 calculates t5−t3, and calculates an angle $\theta_1$ of the large screen relative to the sound box 1 based on the two ultrasonic signals in S2503 and S2504.

S2507: The sound box 1 sends t5−t3 and $\theta_1$ that are obtained through calculation, and the token 1 to the Bluetooth module of the large screen by using the Bluetooth module.

Optionally, in S2508, the sound box may not send the token 1, but send only t5−t3 and $\theta_1$.

Optionally, the large screen may calculate t6−t2, and calculate a distance between the large screen to the sound box 1 based on t5−t3 and t6−t2.

S2508: The Bluetooth module of the large screen sends a Bluetooth notification to the Bluetooth module of the sound box 2, where the Bluetooth notification includes a token 2.

S2509: An audio module of the large screen sends an ultrasonic signal by using the left speaker at a moment t7, and an audio module of the sound box 2 receives the ultrasonic signal at a moment t9, where the ultrasonic signal includes the token 2. In addition, the audio module of the large screen receives, at a moment t8, the ultrasonic signal sent by the left speaker of the large screen.

S2510: The audio module of the large screen sends an ultrasonic signal by using the right speaker, and the audio module of the sound box 2 receives the ultrasonic signal, where the ultrasonic signal includes the token 2.

S2511. The audio module of the sound box 2 sends an ultrasonic signal at a moment t10, and the audio module of the large screen receives the ultrasonic signal at a moment t12, where the ultrasonic signal includes the token 2. In addition, the audio module of the sound box 2 receives, at a moment t11, the ultrasonic signal sent by the audio module of the sound box 2.

S2512: The sound box 2 calculates t11−t9, and calculates an angle $\theta_2$ of the large screen relative to the sound box 2 based on the two ultrasonic signals in S2509 and S2510.

S2513: The sound box 2 sends t11−t9 and $\theta_2$ that are obtained through calculation, and the token 2 to the Bluetooth module of the large screen by using the Bluetooth module.

Optionally, in S2513, the sound box may not send the token 2, but send only t11−t9 and $\theta_2$.

Optionally, the large screen may calculate t12−t8, and calculate a distance between the large screen to the sound box 2 based on t11−t9 and t12−t8.

Further, the large screen may determine sound channels of both the sound box 1 and the sound box 2 based on the distance between the large screen to the sound box 1, the distance between the large screen to the sound box 2, $\theta_1$ and $\theta_2$.

It should also be noted that, in this embodiment of this application, the angle of the first electronic device relative to the second electronic device or the angle of the second electronic device relative to the first electronic device is a relative concept. If the angle of the first electronic device relative to the second electronic device is θ, the angle of the second electronic device relative to the first electronic device is 180−θ. If the angle of the second electronic device relative to the first electronic device is θ, the angle of the first electronic device relative to the second electronic device is 180−θ.

If no conflict occurs, the solutions in the foregoing embodiments may be combined for use.

It may be understood that, to implement the foregoing functions, each electronic device includes corresponding hardware and/or software modules for performing the functions. With reference to algorithm steps of examples described in embodiments disclosed in this specification, this application may be implemented in a form of hardware or a combination of hardware and computer software. Whether a function is performed by hardware or hardware driven by computer software depends on particular applications and design constraints of the technical solution. A person skilled in the art may use different methods to implement the described functions for each particular application with reference to embodiments, but it should not be considered that the implementation goes beyond the scope of this application.

In embodiments, the electronic device may be divided into functional modules based on the foregoing method examples. For example, each functional module, like a determining unit and a transmission unit, may be obtained through division based on each corresponding function, or two or more functions may be integrated into one processing module. The integrated module may be implemented in a form of hardware. It should be noted that module division in this embodiment is an example and is merely logical function division. In actual implementation, there may be another division manner.

It should be noted that all related content of the steps in the foregoing method embodiments may be cited in function description of corresponding functional modules. Details are not described herein.

The electronic device provided in embodiments is configured to perform the foregoing methods for determining the orientation information, and therefore can achieve the same effects as the foregoing implementation methods.

If an integrated unit is used, each electronic device may further include a processing module, a storage module, and a communication module. The processing module may be configured to control and manage an action of the electronic device. The storage module may be configured to support the electronic device in storing program code, data, and the like. The communication module may be configured to support communication between the electronic device and another device.

The processing module may be a processor or a controller. The processor may implement or execute various example logical blocks, modules, and circuits described with reference to content disclosed in this application. The processor may also be a combination for implementing computing functions, for example, a combination of one or more microprocessors, a combination of a digital signal processor (DSP) and a microprocessor. The storage module may be a memory. The communication module may be specifically a device, for example, a radio frequency circuit, a Bluetooth chip, or a Wi-Fi chip that interacts with another electronic device.

In an embodiment, when the processing module is a processor and the storage module is a memory, the electronic device in this embodiment may be a device with the structure shown in FIG. 1.

An embodiment further provides a computer storage medium. The computer storage medium stores computer instructions, and when the computer instructions are run on an electronic device, the electronic device is enabled to perform the foregoing related method steps to perform the methods for determining the orientation information in the foregoing embodiments.

An embodiment further provides a computer program product. When the computer program product runs on a computer, the computer is enabled to perform the foregoing related steps to perform the methods for determining the orientation information in the foregoing embodiments.

In addition, an embodiment of this application further provides an apparatus. The apparatus may be specifically a chip, a component, or a module. The apparatus may include a processor and a memory that are connected to each other. The memory is configured to store computer executable instructions. When the apparatus runs, the processor may execute the computer executable instructions stored in the memory, to enable the chip to perform the methods for determining the orientation information in the foregoing method embodiments.

The electronic device, the computer storage medium, the computer program product, or the chip provided in embodiments is configured to perform the corresponding method provided above. Therefore, for beneficial effects that can be achieved, refer to the beneficial effects of the corresponding method provided above. Details are not described herein again.

Based on descriptions about the foregoing implementations, a person skilled in the art may understand that, for a purpose of convenient and brief description, division into the foregoing functional modules is used as an example for illustration. In actual application, the foregoing functions may be allocated to different functional modules and implemented based on a requirement. In other words, an inner structure of an apparatus is divided into different functional modules to implement all or some of the functions described above.

In the several embodiments provided in this application, it should be understood that the disclosed apparatuses and methods may be implemented in other manners. For example, the described apparatus embodiment is only an example. For example, division into the modules or the units is only logical function division and may be other division in an actual implementation. For example, a plurality of units or components may be combined or integrated into another apparatus, or some characteristics may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, may be located in one place, or may be distributed on different places. Some or all of the units may be selected based on actual requirements to achieve the objectives of the solutions in embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art in the technical scope disclosed in this application shall fall within the protection scope of this application. Therefore, the protection scope of this application shall be subject to the protection scope of the claims.

What is claimed is:

1. A method for determining orientation information, the method comprising:

receiving, by a first electronic device, N sequences, wherein N is a positive integer greater than 1;

determining, by the first electronic device, a sequence with a best signal quality among the N sequences as a first sequence:

receiving, by the first electronic device, a second sequence, wherein the first sequence is associated with the second sequence;

determining, by the first electronic device, whether a device sending the first sequence is a second electronic device based on the second sequence; and based on determining that the device sending the first sequence is the second electronic device based on the second sequence, determining, by the first electronic device, orientation information of the second electronic device based on the first sequence.

2. The method according to claim 1, wherein the method further comprises:

sending, by the first electronic device, a third sequence to the second electronic device;

wherein the determining whether the device sending the first sequence is the second electronic device comprises:

based on the second sequence being the same as the third sequence, determining that the device sending the first sequence is the second electronic device; and based on the second sequence being different from the third sequence, determining that the device sending the first sequence is not the second electronic device.

3. The method according to claim 2, wherein the sending the third sequence to the second electronic device comprises:

receiving a first operation instruction; and sending the third sequence to the second electronic device in response to the first operation instruction.

4. The method according to claim 1, wherein the method further comprises:

obtaining, by the first electronic device, an identifier of the second electronic device;

wherein the determining whether the device sending the first sequence is the second electronic device comprises:

based on the second sequence being the identifier of the second electronic device, determining that the device sending the first sequence is the second electronic device; and based on the second sequence being not the identifier of the second electronic device, determining that the device sending the first sequence is not the second electronic device.

5. The method according to claim 1, wherein before the receiving the N sequences, the method further comprises:

receiving, by the first electronic device, a third sequence from the second electronic device;

wherein the determining whether the device sending the first sequence is the second electronic device comprises:

based on the second sequence being the same as the third sequence, determining that the device sending the first sequence is the second electronic device; and based on the second sequence being different from the third sequence, determining that the device sending the first sequence is not the second electronic device.

6. The method according to claim 5, wherein the method further comprises:

sending, by the first electronic device, a fourth sequence by using a first speaker; and receiving, by the first electronic device, the fourth sequence by using a first microphone at a first moment;

wherein the determining the orientation information of the second electronic device based on the first sequence comprises:

determining an angle of the second electronic device relative to the first electronic device based on the first sequence;

determining first time information based on a second moment at which the first sequence is received and the first moment, wherein the orientation information comprises the angle of the second electronic device relative to the first electronic device and the first time information; and sending the orientation information to the second electronic device.

7. The method according to claim 6, wherein the method further comprises:

sending, by the first electronic device, the third sequence by using the first speaker, wherein the fourth sequence is associated with the third sequence.

8. The method according to claim 6, wherein the method further comprises:

receiving, by the first electronic device, a fifth sequence; and receiving, by the first electronic device, the second sequence, wherein the fifth sequence is associated with the second sequence;

wherein the determining the angle of the second electronic device relative to the first electronic device based on the first sequence comprises:

based on the third sequence being the same as the second sequence, determining that the device sending the fifth sequence is the second electronic device; and determining the angle of the second electronic device relative to the first electronic device based on the first sequence and the fifth sequence.

9. The method according to claim 8, wherein that the first sequence is associated with the second sequence indicates that an interval between a time domain resource for receiving the first sequence and a time domain resource for receiving the second sequence is a first preset time domain interval, and/or an interval between a frequency domain resource for receiving the first sequence and a frequency domain resource for receiving the second sequence is a first preset frequency domain interval; and/or wherein that the third sequence is associated with the fourth sequence indicates that an interval between a time domain resource for sending the third sequence and a time domain resource for sending the fourth sequence is a second preset time domain interval, and/or an interval between a frequency domain resource for sending the third sequence and a frequency domain resource for sending the fourth sequence is a second preset frequency domain interval; and/or wherein that the fifth sequence is associated with the second sequence indicates that an interval between a time domain resource for receiving the fifth sequence and a time domain resource for receiving the second sequence is a third preset time domain interval, and/or an interval between a frequency domain resource for receiving the fifth sequence and a frequency domain resource for receiving the second sequence is a third preset frequency domain interval.

10. The method according claim 1, wherein the method further comprises:

determining, by the first electronic device, a sound channel of the second electronic device based on the orientation information of the second electronic device, wherein the second electronic device is a sound box; and sending, by the first electronic device, an audio signal to the second electronic device based on the sound channel of the second electronic device.

11. The method according to claim 10, wherein the method further comprises:

receiving, by the first electronic device, a first short-range wireless signal from the second electronic device; and determining, by the first electronic device based on the first short-range wireless signal and a first ultrasonic signal, whether the second electronic device and the first electronic device are in a same space, wherein the first ultrasonic signal is an ultrasonic signal for sending the first sequence;

wherein the determining the sound channel of the second electronic device based on the orientation information of the second electronic device comprises:

based on the second electronic device and the first electronic device being in the same space, determining the sound channel of the second electronic device based on the orientation information of the second electronic device.

12. A method for determining orientation information, the method comprising:

sending, by a second electronic device, a first sequence to a first electronic device; and sending, by the second electronic device, a second sequence to the first electronic device, wherein the first sequence is associated with the second sequence, the second sequence is used by the first electronic device to determine an electronic device sending the first sequence, and the first sequence is used by the first electronic device to determine orientation information of the second electronic device;

wherein the sending the first sequence to the first electronic device comprises:

sending a plurality of first sequences to the first electronic device by using a plurality of speakers, respectively, wherein the plurality of speakers are in one-to-one correspondence with the plurality of first sequences; and wherein the sending the second sequence to the first electronic device comprises:

sending a plurality of second sequences to the first electronic device by using the plurality of speakers, respectively, wherein the plurality of speakers are in one-to-one correspondence with the plurality of second sequences, wherein a given first sequence and a given second sequence that are sent by using a same speaker of the plurality of speakers are associated.

13. The method according to claim 12, wherein before the sending the second sequence to the first electronic device, the method further comprises:

receiving the second sequence from the first electronic device.

14. The method according to claim 12, wherein the sending the first sequence to the first electronic device comprises:

sending the first sequence by using a second speaker; and wherein the method further comprises:

receiving, by the second electronic device, the first sequence by using a second microphone at a third moment;

receiving, by the second electronic device, a fourth sequence at a fourth moment;

determining, by the second electronic device, second time information based on the third moment and the fourth moment;

receiving, by the second electronic device, the orientation information of the second electronic device from the first electronic device, wherein the orientation information of the second electronic device comprises an angle of the second electronic device relative to the first electronic device and first time information; and determining, by the second electronic device, a distance between the second electronic device and the first electronic device based on the first time information and the second time information.

15. The method according to claim 14, wherein the method further comprises:

determining, by the second electronic device, a sound channel of the first electronic device based on the distance between the second electronic device and the first electronic device and the angle of the second electronic device relative to the first electronic device, wherein the first electronic device is a sound box; and sending, by the second electronic device, an audio signal to the first electronic device based on the sound channel of the first electronic device.

16. The method according to claim 14, wherein the method further comprises:

receiving, by the second electronic device, a third sequence from the first electronic device, wherein the third sequence associated with the fourth sequence; and based on the third sequence being the same as the second sequence, determining that the electronic device sending the fourth sequence is the first electronic device.

17. The method according to claim 16, wherein that the first sequence is associated with the second sequence indicates that an interval between a time domain resource for sending the first sequence and a time domain resource for sending the second sequence is a first preset time domain interval, and/or an interval between a frequency domain resource for sending the first sequence and a frequency domain resource for sending the second sequence is a first preset frequency domain interval; and/or wherein that the third sequence is associated with the fourth sequence indicates that an interval between a time domain resource for receiving the third sequence and a time domain resource for receiving the fourth sequence is a second preset time domain interval, and/or an interval between a frequency domain resource for receiving the third sequence and a frequency domain resource for receiving the fourth sequence is a second preset frequency domain interval.

18. A non-transitory computer-readable storage medium, wherein the computer-readable storage medium stores computer instructions, and when the computer instructions are run on an electronic device, the electronic device is configured to implement operations comprising:

receiving N sequences, wherein N is a positive integer greater than 1;

determining a sequence with a best signal quality among the N sequences as a first sequence;

receiving a second sequence, wherein the first sequence is associated with the second sequence;

determining, based on the second sequence, whether a device sending the first sequence is a second electronic device; and based on determining that the device sending the first sequence is the second electronic device, determining orientation information of the second electronic device based on the first sequence.

19. The computer-readable storage medium according to claim 18, wherein the operations further comprise:

sending a third sequence to the second electronic device;

wherein the determining, based on the second sequence, whether the device sending the first sequence is the second electronic device comprises:

based on the second sequence being the same as the third sequence, determining that the device sending the first sequence is the second electronic device; and based on the second sequence being different from the third sequence, determining that the device sending the first sequence is not the second electronic device.

20. The computer-readable storage medium according to claim 19, wherein the sending the third sequence to the second electronic device comprises:

receiving a first operation instruction; and sending the third sequence to the second electronic device in response to the first operation instruction.

* * * * *